(12) United States Patent
Amitay et al.

(10) Patent No.: US 11,354,014 B1
(45) Date of Patent: Jun. 7, 2022

(54) MAP-BASED GRAPHICAL USER INTERFACE FOR MULTI-TYPE SOCIAL MEDIA GALLERIES

(71) Applicant: Snap Inc., Santa Monica, CA (US)

(72) Inventors: Daniel Amitay, New York City, NY (US); Jonathan Brody, Venice, CA (US); Jeffrey Arthur Johnson, Brooklyn, NY (US); Andrew Lin, Long Island City, NY (US); Walton Lin, New York, NY (US); John Rauser, Seattle, WA (US); Evan Spiegel, Venice, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 15/965,749

(22) Filed: Apr. 27, 2018

Related U.S. Application Data

(60) Provisional application No. 62/556,134, filed on Sep. 8, 2017, provisional application No. 62/552,958, filed
(Continued)

(51) Int. Cl.
*G06F 3/04817* (2022.01)
*G06F 16/9537* (2019.01)
*G06F 16/29* (2019.01)

(52) U.S. Cl.
CPC .......... *G06F 3/04817* (2013.01); *G06F 16/29* (2019.01); *G06F 16/9537* (2019.01)

(58) Field of Classification Search
CPC ................ G06Q 50/01; G06F 3/04817; G06F 16/9537; G06F 16/29
See application file for complete search history.

(56) References Cited

U.S. PATENT DOCUMENTS

| 666,223 A | 1/1901 | Shedlock |
|---|---|---|
| 4,581,634 A | 4/1986 | Williams |

(Continued)

FOREIGN PATENT DOCUMENTS

| CA | 2887596 A1 | 7/2015 |
|---|---|---|
| CN | 101127109 | 2/2008 |

(Continued)

OTHER PUBLICATIONS

"U.S. Appl. No. 15/628,408, Non Final Office Action dated Jan. 2, 19", 28 pgs.
(Continued)

*Primary Examiner* — Jennifer N Welch
*Assistant Examiner* — K C Chen
(74) *Attorney, Agent, or Firm* — Schwegman Lundberg & Woessner, P.A.

(57) ABSTRACT

A social media platform provides a map-based graphical user interface (GUI) with multiple geographically anchored icons that are selectable to trigger playback of respective galleries of ephemeral messages. Each of the plurality of location-based ephemeral galleries comprises media content contributed by multiple different users. The ephemeral galleries are compiled based on geotag data associated with respective ephemeral messages submitted by multiple users to be publicly viewable via the map-based GUI. Two or more different types of galleries are represented in the map-based GUI by different, visually distinct types of gallery icon.

17 Claims, 14 Drawing Sheets

Related U.S. Application Data on Aug. 31, 2017, provisional application No. 62/491,115, filed on Apr. 27, 2017.

(56) References Cited

U.S. PATENT DOCUMENTS

| | | |
|---|---|---|
| 4,975,690 A | 12/1990 | Torres |
| 5,072,412 A | 12/1991 | Henderson, Jr. et al. |
| 5,493,692 A | 2/1996 | Theimer et al. |
| 5,713,073 A | 1/1998 | Warsta |
| 5,754,939 A | 5/1998 | Herz et al. |
| 5,826,269 A | 10/1998 | Hussey |
| 5,855,008 A | 12/1998 | Goldhaber et al. |
| 5,880,731 A | 3/1999 | Liles et al. |
| 5,883,639 A | 3/1999 | Walton et al. |
| 5,999,932 A | 12/1999 | Paul |
| 6,012,098 A | 1/2000 | Bayeh et al. |
| 6,014,090 A | 1/2000 | Rosen et al. |
| 6,023,270 A | 2/2000 | Brush, II et al. |
| 6,029,141 A | 2/2000 | Bezos et al. |
| 6,038,295 A | 3/2000 | Mattes |
| 6,049,711 A | 4/2000 | Yehezkel et al. |
| 6,154,764 A | 11/2000 | Nitta et al. |
| 6,158,044 A | 12/2000 | Tibbetts |
| 6,167,435 A | 12/2000 | Druckenmiller et al. |
| 6,204,840 B1 | 3/2001 | Petelycky et al. |
| 6,205,432 B1 | 3/2001 | Gabbard et al. |
| 6,216,141 B1 | 4/2001 | Straub et al. |
| 6,223,165 B1 | 4/2001 | Lauffer |
| 6,233,318 B1 | 5/2001 | Picard et al. |
| 6,283,858 B1 | 9/2001 | Hayes, Jr. et al. |
| 6,285,381 B1 | 9/2001 | Sawano et al. |
| 6,285,987 B1 | 9/2001 | Roth et al. |
| 6,310,694 B1 | 10/2001 | Okimoto et al. |
| 6,317,789 B1 | 11/2001 | Rakavy et al. |
| 6,334,149 B1 | 12/2001 | Davis, Jr. et al. |
| 6,349,203 B1 | 2/2002 | Asaoka et al. |
| 6,353,170 B1 | 3/2002 | Eyzaguirre et al. |
| 6,374,292 B1 | 4/2002 | Srivastava et al. |
| 6,446,004 B1 | 9/2002 | Cao et al. |
| 6,449,657 B2 | 9/2002 | Stanbach et al. |
| 6,456,852 B2 | 9/2002 | Bar et al. |
| 6,473,794 B1 | 10/2002 | Guheen et al. |
| 6,484,196 B1 | 11/2002 | Maurille |
| 6,487,586 B2 | 11/2002 | Ogilvie et al. |
| 6,487,601 B1 | 11/2002 | Hubacher et al. |
| 6,523,008 B1 | 2/2003 | Avrunin |
| 6,542,749 B2 | 4/2003 | Tanaka et al. |
| 6,549,768 B1 | 4/2003 | Fraccaroli |
| 6,618,593 B1 | 9/2003 | Drutman et al. |
| 6,622,174 B1 | 9/2003 | Ukita et al. |
| 6,631,463 B1 | 10/2003 | Floyd et al. |
| 6,636,247 B1 | 10/2003 | Hamzy et al. |
| 6,636,855 B2 | 10/2003 | Holloway et al. |
| 6,643,684 B1 | 11/2003 | Malkin et al. |
| 6,658,095 B1 | 12/2003 | Yoakum et al. |
| 6,665,531 B1 | 12/2003 | Soderbacka et al. |
| 6,668,173 B2 | 12/2003 | Greene |
| 6,684,238 B1 | 1/2004 | Dutta |
| 6,684,257 B1 | 1/2004 | Gamut et al. |
| 6,698,020 B1 | 2/2004 | Zigmond et al. |
| 6,700,506 B1 | 3/2004 | Winkler |
| 6,701,347 B1 | 3/2004 | Ogilvie |
| 6,711,608 B1 | 3/2004 | Ogilvie |
| 6,720,860 B1 | 4/2004 | Narayanaswami |
| 6,724,403 B1 | 4/2004 | Santoro et al. |
| 6,757,713 B1 | 6/2004 | Ogilvie et al. |
| 6,772,195 B1 | 8/2004 | Hatlelid et al. |
| 6,832,222 B1 | 12/2004 | Zimowski |
| 6,834,195 B2 | 12/2004 | Brandenberg et al. |
| 6,836,792 B1 | 12/2004 | Chen |
| 6,839,411 B1 | 1/2005 | Saltanov et al. |
| 6,842,779 B1 | 1/2005 | Nishizawa |
| 6,898,626 B2 | 5/2005 | Ohashi |
| 6,959,324 B1 | 10/2005 | Kubik et al. |
| 6,970,088 B2 | 11/2005 | Kovach |
| 6,970,907 B1 | 11/2005 | Ullmann et al. |
| 6,980,909 B2 | 12/2005 | Root et al. |
| 6,981,040 B1 | 12/2005 | Konig et al. |
| 7,020,494 B2 | 3/2006 | Spriestersbach et al. |
| 7,027,124 B2 | 4/2006 | Foote et al. |
| 7,072,963 B2 | 7/2006 | Anderson et al. |
| 7,073,129 B1 | 7/2006 | Robarts et al. |
| 7,079,158 B2 | 7/2006 | Lambertsen |
| 7,085,571 B2 | 8/2006 | Kalhan et al. |
| 7,110,744 B2 | 9/2006 | Freeny, Jr. |
| 7,124,164 B1 | 10/2006 | Chemtob |
| 7,149,893 B1 | 12/2006 | Leonard et al. |
| 7,173,651 B1 | 2/2007 | Knowles |
| 7,188,143 B2 | 3/2007 | Szeto |
| 7,203,380 B2 | 4/2007 | Chiu et al. |
| 7,206,568 B2 | 4/2007 | Sudit |
| 7,227,937 B1 | 6/2007 | Yoakum et al. |
| 7,237,002 B1 | 6/2007 | Estrada et al. |
| 7,240,089 B2 | 7/2007 | Boudreau |
| 7,243,163 B1 | 7/2007 | Friend et al. |
| 7,269,426 B2 | 9/2007 | Kokkonen et al. |
| 7,278,168 B1 | 10/2007 | Chaudhury et al. |
| 7,280,123 B2 | 10/2007 | Bentley et al. |
| 7,280,658 B2 | 10/2007 | Amini et al. |
| 7,315,823 B2 | 1/2008 | Brondrup |
| 7,342,587 B2 | 3/2008 | Danzig et al. |
| 7,349,768 B2 | 3/2008 | Bruce et al. |
| 7,356,564 B2 | 4/2008 | Hartselle et al. |
| 7,376,715 B2 | 5/2008 | Cunningham et al. |
| 7,394,345 B1 | 7/2008 | Ehlinger et al. |
| 7,411,493 B2 | 8/2008 | Smith |
| 7,423,580 B2 | 9/2008 | Markhovsky et al. |
| 7,454,442 B2 | 11/2008 | Cobleigh et al. |
| 7,468,729 B1 | 12/2008 | Levinson |
| 7,478,402 B2 | 1/2009 | Christensen et al. |
| 7,496,347 B2 | 2/2009 | Puranik |
| 7,508,419 B2 | 3/2009 | Toyama et al. |
| 7,512,649 B2 | 3/2009 | Faybishenko et al. |
| 7,519,670 B2 | 4/2009 | Hagale et al. |
| 7,535,469 B2 | 5/2009 | Kim et al. |
| 7,535,890 B2 | 5/2009 | Rojas |
| 7,546,554 B2 | 6/2009 | Chiu et al. |
| 7,607,096 B2 | 10/2009 | Oreizy et al. |
| 7,627,828 B1 | 12/2009 | Collison et al. |
| 7,636,755 B2 | 12/2009 | Blattner et al. |
| 7,639,251 B2 | 12/2009 | Gu et al. |
| 7,639,943 B1 | 12/2009 | Kalajan |
| 7,650,231 B2 | 1/2010 | Gadler |
| 7,668,537 B2 | 2/2010 | DeVries |
| 7,689,649 B2 | 3/2010 | Heikes et al. |
| 7,703,140 B2 | 4/2010 | Nath et al. |
| 7,770,137 B2 | 8/2010 | Forbes et al. |
| 7,775,885 B2 | 8/2010 | Van Luchene et al. |
| 7,778,973 B2 | 8/2010 | Choi |
| 7,779,444 B2 | 8/2010 | Glad |
| 7,787,886 B2 | 8/2010 | Markhovsky et al. |
| 7,792,789 B2 | 9/2010 | Prahlad et al. |
| 7,796,946 B2 | 9/2010 | Eisenbach |
| 7,801,954 B2 | 9/2010 | Cadiz et al. |
| 7,818,336 B1 | 10/2010 | Amidon et al. |
| 7,856,360 B2 | 12/2010 | Kramer et al. |
| 7,859,551 B2 | 12/2010 | Bulman et al. |
| 7,885,931 B2 | 2/2011 | Seo et al. |
| 7,912,896 B2 | 3/2011 | Wolovitz et al. |
| 7,925,703 B2 | 4/2011 | Dinan et al. |
| 8,001,204 B2 | 8/2011 | Burtner et al. |
| 8,032,586 B2 | 10/2011 | Challenger et al. |
| 8,077,931 B1 | 12/2011 | Chatman et al. |
| 8,082,255 B1 | 12/2011 | Carlson, Jr. et al. |
| 8,088,044 B2 | 1/2012 | Tchao et al. |
| 8,090,351 B2 | 1/2012 | Klein |
| 8,095,878 B2 | 1/2012 | Bates et al. |
| 8,098,904 B2 | 1/2012 | Ioffe et al. |
| 8,099,109 B2 | 1/2012 | Altman et al. |
| 8,108,774 B2 | 1/2012 | Finn et al. |
| 8,112,716 B2 | 2/2012 | Kobayashi |
| 8,117,281 B2 | 2/2012 | Robinson et al. |
| 8,130,219 B2 | 3/2012 | Fleury et al. |
| 8,131,597 B2 | 3/2012 | Hudetz |

(56) References Cited

U.S. PATENT DOCUMENTS

| | | |
|---|---|---|
| 8,135,166 B2 | 3/2012 | Rhoads |
| 8,136,028 B1 | 3/2012 | Loeb et al. |
| 8,146,001 B1 | 3/2012 | Reese |
| 8,146,005 B2 | 3/2012 | Jones et al. |
| 8,151,191 B2 | 4/2012 | Nicol |
| 8,161,115 B2 | 4/2012 | Yamamoto |
| 8,161,417 B1 | 4/2012 | Lee |
| 8,169,505 B2 * | 5/2012 | Hoshi ............... H04N 1/00244 348/231.3 |
| 8,170,957 B2 | 5/2012 | Richard |
| 8,195,203 B1 | 6/2012 | Tseng |
| 8,195,748 B2 | 6/2012 | Hallyn |
| 8,199,747 B2 | 6/2012 | Rojas et al. |
| 8,208,943 B2 | 6/2012 | Petersen |
| 8,214,443 B2 | 7/2012 | Hamburg |
| 8,234,350 B1 | 7/2012 | Gu et al. |
| 8,238,947 B2 | 8/2012 | Lottin et al. |
| 8,244,593 B2 | 8/2012 | Klinger et al. |
| 8,276,092 B1 | 9/2012 | Narayanan et al. |
| 8,279,319 B2 | 10/2012 | Date |
| 8,280,406 B2 | 10/2012 | Ziskind et al. |
| 8,285,199 B2 | 10/2012 | Hsu et al. |
| 8,287,380 B2 | 10/2012 | Nguyen et al. |
| 8,301,159 B2 | 10/2012 | Hamynen et al. |
| 8,306,922 B1 | 11/2012 | Kunal et al. |
| 8,312,086 B2 | 11/2012 | Velusamy et al. |
| 8,312,097 B1 | 11/2012 | Siegel et al. |
| 8,326,315 B2 | 12/2012 | Phillips et al. |
| 8,326,327 B2 | 12/2012 | Hymel et al. |
| 8,332,475 B2 | 12/2012 | Rosen et al. |
| 8,352,546 B1 | 1/2013 | Dollard |
| 8,379,130 B2 | 2/2013 | Forutanpour et al. |
| 8,384,719 B2 | 2/2013 | Reville et al. |
| 8,385,950 B1 | 2/2013 | Wagner et al. |
| RE44,054 E | 3/2013 | Kim |
| 8,396,708 B2 | 3/2013 | Park et al. |
| 8,402,097 B2 | 3/2013 | Szeto |
| 8,405,773 B2 | 3/2013 | Hayashi et al. |
| 8,413,059 B2 | 4/2013 | Lee et al. |
| 8,418,067 B2 | 4/2013 | Cheng et al. |
| 8,423,409 B2 | 4/2013 | Rao |
| 8,425,322 B2 | 4/2013 | Gillo et al. |
| 8,457,367 B1 | 6/2013 | Sipe et al. |
| 8,458,601 B2 | 6/2013 | Castelli et al. |
| 8,462,198 B2 | 6/2013 | Lin et al. |
| 8,471,914 B2 | 6/2013 | Sakiyama et al. |
| 8,472,935 B1 | 6/2013 | Fujisaki |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,510,383 B2 | 8/2013 | Hurley et al. |
| 8,527,345 B2 | 9/2013 | Rothschild et al. |
| 8,554,627 B2 | 10/2013 | Svendsen et al. |
| 8,559,980 B2 | 10/2013 | Pujol |
| 8,560,612 B2 | 10/2013 | Kilmer et al. |
| 8,564,621 B2 | 10/2013 | Branson et al. |
| 8,564,710 B2 | 10/2013 | Nonaka et al. |
| 8,570,326 B2 | 10/2013 | Gorev |
| 8,570,907 B2 | 10/2013 | Garcia, Jr. et al. |
| 8,581,911 B2 | 11/2013 | Becker et al. |
| 8,594,680 B2 | 11/2013 | Ledlie et al. |
| 8,597,121 B2 | 12/2013 | del Valle |
| 8,601,051 B2 | 12/2013 | Wang |
| 8,601,379 B2 | 12/2013 | Marks et al. |
| 8,613,089 B1 | 12/2013 | Holloway et al. |
| 8,632,408 B2 | 1/2014 | Gillo et al. |
| 8,639,767 B1 | 1/2014 | Harris et al. |
| 8,648,865 B2 | 2/2014 | Dawson et al. |
| 8,655,389 B1 | 2/2014 | Jackson et al. |
| 8,659,548 B2 | 2/2014 | Hildreth |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,682,350 B2 | 3/2014 | Altman et al. |
| 8,683,354 B2 | 3/2014 | Khandelwal et al. |
| 8,692,830 B2 | 4/2014 | Nelson et al. |
| 8,700,012 B2 | 4/2014 | Ferren et al. |
| 8,718,333 B2 | 5/2014 | Wolf et al. |
| 8,724,622 B2 | 5/2014 | Rojas |
| 8,730,231 B2 | 5/2014 | Snoddy et al. |
| 8,732,168 B2 | 5/2014 | Johnson |
| 8,738,719 B2 | 5/2014 | Lee et al. |
| 8,744,523 B2 | 6/2014 | Fan et al. |
| 8,745,132 B2 | 6/2014 | Obradovich |
| 8,761,800 B2 | 6/2014 | Kuwahara |
| 8,768,876 B2 | 7/2014 | Shim et al. |
| 8,775,972 B2 | 7/2014 | Spiegel |
| 8,788,680 B1 | 7/2014 | Naik |
| 8,790,187 B2 | 7/2014 | Walker et al. |
| 8,797,415 B2 | 8/2014 | Arnold |
| 8,798,646 B1 | 8/2014 | Wang et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,856,349 B2 | 10/2014 | Jain et al. |
| 8,874,677 B2 | 10/2014 | Rosen et al. |
| 8,886,227 B2 | 11/2014 | Schmidt et al. |
| 8,887,035 B2 | 11/2014 | Mcdonald et al. |
| 8,890,926 B2 | 11/2014 | Tandon et al. |
| 8,892,999 B2 | 11/2014 | Nims et al. |
| 8,893,010 B1 | 11/2014 | Brin et al. |
| 8,909,679 B2 | 12/2014 | Root et al. |
| 8,909,714 B2 | 12/2014 | Agarwal et al. |
| 8,909,725 B1 | 12/2014 | Sehn |
| 8,914,752 B1 | 12/2014 | Spiegel |
| 8,924,250 B2 | 12/2014 | Bates et al. |
| 8,935,656 B2 | 1/2015 | Dandia et al. |
| 8,963,926 B2 | 2/2015 | Brown et al. |
| 8,972,357 B2 | 3/2015 | Shim et al. |
| 8,989,786 B2 | 3/2015 | Feghali |
| 8,995,433 B2 | 3/2015 | Rojas |
| 9,002,643 B2 | 4/2015 | Xu |
| 9,015,285 B1 | 4/2015 | Ebsen et al. |
| 9,020,745 B2 | 4/2015 | Johnston et al. |
| 9,040,574 B2 | 5/2015 | Wang et al. |
| 9,055,416 B2 | 6/2015 | Rosen et al. |
| 9,083,770 B1 | 7/2015 | Drose et al. |
| 9,086,776 B2 | 7/2015 | Ye et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,105,014 B2 | 8/2015 | Collet et al. |
| 9,113,301 B1 | 8/2015 | Spiegel et al. |
| 9,119,027 B2 | 8/2015 | Sharon et al. |
| 9,123,074 B2 | 9/2015 | Jacobs |
| 9,143,382 B2 | 9/2015 | Bhogal et al. |
| 9,143,681 B1 | 9/2015 | Ebsen et al. |
| 9,148,424 B1 | 9/2015 | Yang |
| 9,152,477 B1 | 10/2015 | Campbell et al. |
| 9,191,776 B2 | 11/2015 | Root et al. |
| 9,204,252 B2 | 12/2015 | Root |
| 9,224,220 B2 | 12/2015 | Toyoda et al. |
| 9,225,805 B2 | 12/2015 | Kujawa et al. |
| 9,225,897 B1 | 12/2015 | Sehn et al. |
| 9,237,202 B1 | 1/2016 | Sehn |
| 9,241,184 B2 | 1/2016 | Weerasinghe |
| 9,247,377 B2 | 1/2016 | Pai et al. |
| 9,256,860 B2 | 2/2016 | Herger et al. |
| 9,258,459 B2 | 2/2016 | Hartley |
| 9,264,463 B2 | 2/2016 | Rubinstein et al. |
| 9,276,886 B1 | 3/2016 | Samaranayake |
| 9,294,425 B1 | 3/2016 | Son |
| 9,298,257 B2 | 3/2016 | Hwang et al. |
| 9,314,692 B2 | 4/2016 | Konoplev et al. |
| 9,330,483 B2 | 5/2016 | Du et al. |
| 9,344,606 B2 | 5/2016 | Hartley et al. |
| 9,357,174 B2 | 5/2016 | Li et al. |
| 9,361,510 B2 | 6/2016 | Yao et al. |
| 9,369,422 B1 | 6/2016 | Ozog |
| 9,378,576 B2 | 6/2016 | Bouaziz et al. |
| 9,385,983 B1 | 7/2016 | Sehn |

(56) References Cited

U.S. PATENT DOCUMENTS

| | | |
|---|---|---|
| 9,392,308 B2 | 7/2016 | Ahmed et al. |
| 9,396,354 B1 | 7/2016 | Murphy et al. |
| 9,402,057 B2 | 7/2016 | Kaytaz et al. |
| 9,407,712 B1 | 8/2016 | Sehn |
| 9,407,816 B1 | 8/2016 | Sehn |
| 9,412,192 B2 | 8/2016 | Mandel et al. |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,460,541 B2 | 10/2016 | Li et al. |
| 9,482,882 B1 | 11/2016 | Hanover et al. |
| 9,482,883 B1 | 11/2016 | Meisenholder |
| 9,485,747 B1 | 11/2016 | Rodoper et al. |
| 9,489,661 B2 | 11/2016 | Evans et al. |
| 9,489,760 B2 | 11/2016 | Li et al. |
| 9,491,134 B2 | 11/2016 | Rosen et al. |
| 9,503,845 B2 | 11/2016 | Vincent |
| 9,508,197 B2 | 11/2016 | Quinn et al. |
| 9,532,171 B2 | 12/2016 | Allen et al. |
| 9,537,811 B2 | 1/2017 | Allen et al. |
| 9,544,257 B2 | 1/2017 | Ogundokun et al. |
| 9,560,006 B2 | 1/2017 | Prado et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,628,950 B1 | 4/2017 | Noeth et al. |
| 9,641,870 B1 | 5/2017 | Cormie et al. |
| 9,648,376 B2 | 5/2017 | Chang et al. |
| 9,652,896 B1 | 5/2017 | Jurgenson et al. |
| 9,659,244 B2 | 5/2017 | Anderton et al. |
| 9,693,191 B2 | 6/2017 | Sehn |
| 9,697,635 B2 | 7/2017 | Quinn et al. |
| 9,705,831 B2 | 7/2017 | Spiegel |
| 9,706,040 B2 | 7/2017 | Kadirvel et al. |
| 9,710,821 B2 | 7/2017 | Heath |
| 9,742,713 B2 | 8/2017 | Spiegel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,773,284 B2 | 9/2017 | Huang et al. |
| 9,785,796 B1 | 10/2017 | Murphy et al. |
| 9,792,714 B2 | 10/2017 | Li et al. |
| 9,824,463 B2 | 11/2017 | Ingrassia et al. |
| 9,825,898 B2 | 11/2017 | Sehn |
| 9,839,844 B2 | 12/2017 | Dunstan et al. |
| 9,854,219 B2 | 12/2017 | Sehn |
| 9,883,838 B2 | 2/2018 | Kaleal, III et al. |
| 9,894,476 B2 | 2/2018 | Fraccaroli |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,961,520 B2 | 5/2018 | Brooks et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,146,748 B1 | 12/2018 | Barndollar et al. |
| 10,155,168 B2 | 12/2018 | Blackstock et al. |
| 10,158,589 B2 | 12/2018 | Collet et al. |
| 10,178,507 B1 | 1/2019 | Roberts |
| 10,194,270 B2 | 1/2019 | Yokoyama et al. |
| 10,212,541 B1 | 2/2019 | Brody et al. |
| 10,237,692 B2 | 3/2019 | Shan et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,362,219 B2 | 7/2019 | Wilson et al. |
| 10,375,519 B2 | 8/2019 | Pai et al. |
| 10,382,378 B2 | 8/2019 | Garcia et al. |
| 10,432,498 B1 | 10/2019 | Mcclendon |
| 10,475,225 B2 | 11/2019 | Park et al. |
| 10,496,661 B2 | 12/2019 | Morgan et al. |
| 10,504,266 B2 | 12/2019 | Blattner et al. |
| 10,573,048 B2 | 2/2020 | Ni et al. |
| 10,657,701 B2 | 5/2020 | Osman et al. |
| 10,952,013 B1 | 3/2021 | Brody et al. |
| 10,963,529 B1 | 3/2021 | Amitay et al. |
| 2002/0035607 A1 | 3/2002 | Checkoway et al. |
| 2002/0047868 A1 | 4/2002 | Miyazawa |
| 2002/0059193 A1 | 5/2002 | Decime et al. |
| 2002/0067362 A1 | 6/2002 | Agostino Nocera et al. |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0122659 A1 | 9/2002 | McGrath et al. |
| 2002/0128047 A1 | 9/2002 | Gates |
| 2002/0144154 A1 | 10/2002 | Tomkow |
| 2002/0169644 A1 | 11/2002 | Greene |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell |
| 2003/0148773 A1 | 8/2003 | Spriestersbach et al. |
| 2003/0164856 A1 | 9/2003 | Prager et al. |
| 2003/0206171 A1 | 11/2003 | Kim et al. |
| 2003/0217106 A1 | 11/2003 | Adar et al. |
| 2003/0229607 A1 | 12/2003 | Zellweger et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0111467 A1 | 6/2004 | Willis |
| 2004/0158739 A1 | 8/2004 | Wakai et al. |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0144241 A1 | 6/2005 | Stata et al. |
| 2005/0162419 A1 | 7/2005 | Kim et al. |
| 2005/0020661 A1 | 9/2005 | Cordelli |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0280660 A1 | 12/2005 | Seo et al. |
| 2005/0288954 A1 | 12/2005 | McCarthy et al. |
| 2006/0026067 A1 | 2/2006 | Nicholas et al. |
| 2006/0031412 A1 | 2/2006 | Adams et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0145944 A1 | 7/2006 | Tarlton et al. |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2006/0294465 A1 | 12/2006 | Ronen et al. |
| 2007/0004426 A1 | 1/2007 | Pfleging et al. |
| 2007/0011270 A1 | 1/2007 | Klein et al. |
| 2007/0038715 A1 | 2/2007 | Collins et al. |
| 2007/0040931 A1 | 2/2007 | Nishizawa |
| 2007/0064899 A1 | 3/2007 | Boss et al. |
| 2007/0073517 A1 | 3/2007 | Panje |

(56) References Cited

U.S. PATENT DOCUMENTS

| | | |
|---|---|---|
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0113181 A1 | 5/2007 | Blattner et al. |
| 2007/0136228 A1 | 6/2007 | Petersen |
| 2007/0168863 A1 | 7/2007 | Blattner et al. |
| 2007/0092668 A1 | 8/2007 | Harris et al. |
| 2007/0176921 A1 | 8/2007 | Iwasaki et al. |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0218987 A1 | 9/2007 | Luchene et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |
| 2007/0258656 A1 | 11/2007 | Aarabi et al. |
| 2007/0281690 A1 | 12/2007 | Altman et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0049704 A1 | 2/2008 | Witteman et al. |
| 2008/0055269 A1 | 3/2008 | Lemay et al. |
| 2008/0062141 A1 | 3/2008 | Chandhri |
| 2008/0070593 A1 | 3/2008 | Altman et al. |
| 2008/0076505 A1 | 3/2008 | Ngyen et al. |
| 2008/0092233 A1 | 4/2008 | Tian et al. |
| 2008/0094387 A1 | 4/2008 | Chen |
| 2008/0097979 A1 | 4/2008 | Heidloff et al. |
| 2008/0104503 A1 | 5/2008 | Beall et al. |
| 2008/0109844 A1 | 5/2008 | Baldeschweiler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158222 A1 | 7/2008 | Li et al. |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0201638 A1 | 8/2008 | Nair |
| 2008/0207176 A1 | 8/2008 | Brackbill et al. |
| 2008/0208692 A1 | 8/2008 | Garaventi et al. |
| 2008/0209329 A1 | 8/2008 | Defranco et al. |
| 2008/0021421 A1 | 9/2008 | Rasanen et al. |
| 2008/0216092 A1 | 9/2008 | Serlet |
| 2008/0222108 A1 | 9/2008 | Prahlad et al. |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0309617 A1 | 12/2008 | Kong et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0013268 A1 | 1/2009 | Amit |
| 2009/0015703 A1 | 1/2009 | Kim et al. |
| 2009/0016617 A1 | 1/2009 | Bregman-Amitai et al. |
| 2009/0024956 A1 | 1/2009 | Kobayashi |
| 2009/0030774 A1 | 1/2009 | Rothschild et al. |
| 2009/0030884 A1 | 1/2009 | Pulfer et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0044113 A1 | 2/2009 | Jones et al. |
| 2009/0047972 A1 | 2/2009 | Neeraj |
| 2009/0055484 A1 | 2/2009 | Vuong et al. |
| 2009/0058822 A1 | 3/2009 | Chaudhri |
| 2009/0070688 A1 | 3/2009 | Gyorfi et al. |
| 2009/0079846 A1 | 3/2009 | Chou |
| 2009/0008971 A1 | 4/2009 | Wood et al. |
| 2009/0089678 A1 | 4/2009 | Sacco et al. |
| 2009/0093261 A1 | 4/2009 | Ziskind |
| 2009/0099925 A1 | 4/2009 | Mehta et al. |
| 2009/0100367 A1 | 4/2009 | Dargahi et al. |
| 2009/0106672 A1 | 4/2009 | Burstrom |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0144639 A1 | 6/2009 | Nims et al. |
| 2009/0148045 A1 | 6/2009 | Lee et al. |
| 2009/0150778 A1 | 6/2009 | Nicol |
| 2009/0153492 A1 | 6/2009 | Popp |
| 2009/0153552 A1 | 6/2009 | Fidaleo et al. |
| 2009/0157450 A1 | 6/2009 | Athsani et al. |
| 2009/0157752 A1 | 6/2009 | Gonzalez |
| 2009/0158170 A1 | 6/2009 | Narayanan et al. |
| 2009/0160970 A1 | 6/2009 | Fredlund et al. |
| 2009/0163182 A1 | 6/2009 | Gatti et al. |
| 2009/0164459 A1 | 6/2009 | Jennings et al. |
| 2009/0177299 A1 | 7/2009 | Van De Sluis |
| 2009/0177976 A1 | 7/2009 | Bokor et al. |
| 2009/0192900 A1 | 7/2009 | Collision |
| 2009/0199242 A1 | 8/2009 | Johnson et al. |
| 2009/0202114 A1 | 8/2009 | Morin et al. |
| 2009/0215469 A1 | 8/2009 | Fisher et al. |
| 2009/0228811 A1 | 9/2009 | Adams et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0254840 A1 | 10/2009 | Churchill et al. |
| 2009/0265604 A1 | 10/2009 | Howard et al. |
| 2009/0265647 A1 | 10/2009 | Martin et al. |
| 2009/0284551 A1 | 11/2009 | Stanton |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0300525 A1 | 12/2009 | Jolliff et al. |
| 2009/0303984 A1 | 12/2009 | Clark et al. |
| 2009/0319178 A1 | 12/2009 | Khosravy et al. |
| 2009/0319607 A1 | 12/2009 | Belz et al. |
| 2009/0327073 A1 | 12/2009 | Li |
| 2009/0328122 A1 | 12/2009 | Amento et al. |
| 2010/0011422 A1 | 1/2010 | Mason et al. |
| 2010/0023885 A1 | 1/2010 | Reville et al. |
| 2010/0058212 A1 | 3/2010 | Belitz et al. |
| 2010/0062794 A1 | 3/2010 | Han |
| 2010/0082427 A1 | 4/2010 | Burgener et al. |
| 2010/0082693 A1 | 4/2010 | Hugg et al. |
| 2010/0083140 A1 | 4/2010 | Dawson et al. |
| 2010/0083148 A1 | 4/2010 | Finn et al. |
| 2010/0100568 A1 | 4/2010 | Papin et al. |
| 2010/0100828 A1 | 4/2010 | Khandelwal et al. |
| 2010/0113065 A1 | 5/2010 | Narayan et al. |
| 2010/0115426 A1 | 5/2010 | Liu et al. |
| 2010/0121915 A1 | 5/2010 | Wang |
| 2010/0130233 A1 | 5/2010 | Parker |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0179953 A1 | 7/2010 | Kan et al. |
| 2010/0179991 A1 | 7/2010 | Lorch et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |

(56) References Cited

U.S. PATENT DOCUMENTS

| | | |
|---|---|---|
| 2010/0191631 A1 | 7/2010 | Weidmann |
| 2010/0197318 A1 | 8/2010 | Peterson et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0203968 A1 | 8/2010 | Gill et al. |
| 2010/0205242 A1 | 8/2010 | Marchioro, II et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0227682 A1 | 9/2010 | Reville et al. |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0262915 A1 | 10/2010 | Booking et al. |
| 2010/0273509 A1 | 10/2010 | Sweeney et al. |
| 2010/0274724 A1 | 10/2010 | Bible, Jr. et al. |
| 2010/0279713 A1 | 11/2010 | Dicke |
| 2010/0281045 A1 | 11/2010 | Dean |
| 2010/0290756 A1 | 11/2010 | Karaoguz et al. |
| 2010/0299060 A1 | 11/2010 | Snavely et al. |
| 2010/0306669 A1 | 12/2010 | Della Pasqua |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0047404 A1 | 2/2011 | Metzler et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066664 A1 | 3/2011 | Goldman et al. |
| 2011/0066743 A1 | 3/2011 | Hurley et al. |
| 2011/0083101 A1 | 4/2011 | Sharon et al. |
| 2011/0093780 A1 | 4/2011 | Dunn |
| 2011/0099507 A1 | 4/2011 | Nesladek et al. |
| 2011/0102630 A1 | 5/2011 | Rukes |
| 2011/0115798 A1 | 5/2011 | Nayar et al. |
| 2011/0119133 A1 | 5/2011 | Igelman et al. |
| 2011/0126096 A1 | 5/2011 | Ohashi et al. |
| 2011/0137881 A1 | 6/2011 | Cheng et al. |
| 2011/0145564 A1 | 6/2011 | Moshir et al. |
| 2011/0148864 A1 | 6/2011 | Lee et al. |
| 2011/0153759 A1 | 6/2011 | Rathod |
| 2011/0159890 A1 | 6/2011 | Fortescue et al. |
| 2011/0161076 A1 | 6/2011 | Davis et al. |
| 2011/0164163 A1 | 7/2011 | Bilbrey et al. |
| 2011/0167125 A1 | 7/2011 | Achlioptas |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0211764 A1 | 9/2011 | Krupka et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238762 A1 | 9/2011 | Soni et al. |
| 2011/0238763 A1 | 9/2011 | Shin et al. |
| 2011/0239136 A1 | 9/2011 | Goldman et al. |
| 2011/0239143 A1 | 9/2011 | Ye et al. |
| 2011/0246330 A1 | 10/2011 | Tikku et al. |
| 2011/0249891 A1 | 10/2011 | Li |
| 2011/0255736 A1 | 10/2011 | Thompson et al. |
| 2011/0002857 A1 | 11/2011 | Jin |
| 2011/0273575 A1 | 11/2011 | Lee |
| 2011/0282799 A1 | 11/2011 | Huston |
| 2011/0283188 A1 | 11/2011 | Farrenkopf |
| 2011/0286586 A1 | 11/2011 | Saylor et al. |
| 2011/0292051 A1 | 12/2011 | Nelson et al. |
| 2011/0300837 A1 | 12/2011 | Misiag |
| 2011/0314419 A1 | 12/2011 | Dunn et al. |
| 2011/0320373 A1 | 12/2011 | Lee et al. |
| 2012/0013770 A1 | 1/2012 | Stafford et al. |
| 2012/0015673 A1 | 1/2012 | Klassen et al. |
| 2012/0150978 A1 | 1/2012 | Monaco |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0059722 A1 | 3/2012 | Rao |
| 2012/0062805 A1 | 3/2012 | Candelore |
| 2012/0069028 A1 | 3/2012 | Bouguerra |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113106 A1 | 5/2012 | Choi et al. |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0130717 A1 | 5/2012 | Xu et al. |
| 2012/0131507 A1 | 5/2012 | Sparandara et al. |
| 2012/0131512 A1 | 5/2012 | Takeuchi et al. |
| 2012/0001651 A1 | 6/2012 | Lalancette et al. |
| 2012/0139830 A1 | 6/2012 | Hwang et al. |
| 2012/0141046 A1 | 6/2012 | Chen et al. |
| 2012/0143760 A1 | 6/2012 | Abulafia et al. |
| 2012/0144452 A1 | 6/2012 | Dyor et al. |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0209921 A1 | 8/2012 | Adafin et al. |
| 2012/0209924 A1 | 8/2012 | Evans et al. |
| 2012/0210244 A1 | 8/2012 | De Francisco Lopez et al. |
| 2012/0212632 A1 | 8/2012 | Mate et al. |
| 2012/0220264 A1 | 8/2012 | Kawabata |
| 2012/0221687 A1* | 8/2012 | Hunter .................. G06F 16/435 709/219 |
| 2012/0226748 A1 | 9/2012 | Bosworth et al. |
| 2012/0229506 A1 | 9/2012 | Nishikawa |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0254325 A1 | 10/2012 | Majeti et al. |
| 2012/0271883 A1 | 10/2012 | Montoya et al. |
| 2012/0278387 A1 | 11/2012 | Garcia et al. |
| 2012/0278692 A1 | 11/2012 | Shi |
| 2012/0290637 A1 | 11/2012 | Perantatos et al. |
| 2012/0290977 A1 | 11/2012 | Devecka |
| 2012/0299954 A1 | 11/2012 | Wada et al. |
| 2012/0302256 A1 | 11/2012 | Pai et al. |
| 2012/0304052 A1 | 11/2012 | Tanaka et al. |
| 2012/0304080 A1 | 11/2012 | Wormaid et al. |
| 2012/0307096 A1 | 12/2012 | Bray et al. |
| 2012/0307112 A1 | 12/2012 | Kunishige et al. |
| 2012/0315987 A1 | 12/2012 | Walling |
| 2012/0319904 A1 | 12/2012 | Lee et al. |
| 2012/0323933 A1 | 12/2012 | He et al. |
| 2012/0324018 A1 | 12/2012 | Metcalf et al. |
| 2013/0006759 A1 | 1/2013 | Srivastava et al. |
| 2013/0008238 A1 | 1/2013 | Hogeg et al. |
| 2013/0024757 A1 | 1/2013 | Doll et al. |

(56) References Cited

U.S. PATENT DOCUMENTS

| | | |
|---|---|---|
| 2013/0031180 A1 | 1/2013 | Abendroth et al. |
| 2013/0036165 A1 | 2/2013 | Tseng et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0073970 A1 | 3/2013 | Piantino et al. |
| 2013/0073984 A1 | 3/2013 | Lessin et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0103760 A1 | 4/2013 | Golding et al. |
| 2013/0103766 A1 | 4/2013 | Gupta |
| 2013/0104053 A1 | 4/2013 | Thornton et al. |
| 2013/0110631 A1 | 5/2013 | Mitchell et al. |
| 2013/0110885 A1 | 5/2013 | Brundrett, III |
| 2013/0111354 A1 | 5/2013 | Marra et al. |
| 2013/0111514 A1 | 5/2013 | Slavin et al. |
| 2013/0124091 A1 | 5/2013 | Matas et al. |
| 2013/0128059 A1 | 5/2013 | Kristensson |
| 2013/0129084 A1 | 5/2013 | Appleton |
| 2013/0129252 A1 | 5/2013 | Lauper |
| 2013/0132477 A1 | 5/2013 | Bosworth et al. |
| 2013/0141463 A1 | 6/2013 | Barnett et al. |
| 2013/0145286 A1 | 6/2013 | Feng et al. |
| 2013/0151988 A1 | 6/2013 | Sorin et al. |
| 2013/0152000 A1 | 6/2013 | Liu et al. |
| 2013/0155169 A1 | 6/2013 | Hoover et al. |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173729 A1 | 7/2013 | Starenky et al. |
| 2013/0174059 A1 | 7/2013 | Van Wie et al. |
| 2013/0179520 A1 | 7/2013 | Lee et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0201187 A1 | 8/2013 | Tong et al. |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0249948 A1 | 9/2013 | Reitan |
| 2013/0254900 A1 | 9/2013 | Sathish et al. |
| 2013/0257877 A1 | 10/2013 | Davis |
| 2013/0258040 A1 | 10/2013 | Kaytaz et al. |
| 2013/0260800 A1 | 10/2013 | Asakawa et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0311452 A1 | 11/2013 | Jacoby |
| 2013/0325964 A1 | 12/2013 | Berberat |
| 2013/0332068 A1 | 12/2013 | Kesar et al. |
| 2013/0339868 A1 | 12/2013 | Sharpe et al. |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0011576 A1 | 1/2014 | Barbalet et al. |
| 2014/0019264 A1 | 1/2014 | Wachman et al. |
| 2014/0032682 A1 | 1/2014 | Prado et al. |
| 2014/0043204 A1 | 2/2014 | Basnayake et al. |
| 2014/0043329 A1 | 2/2014 | Wang et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0055554 A1 | 2/2014 | Du et al. |
| 2014/0057660 A1 | 2/2014 | Wager |
| 2014/0082651 A1 | 3/2014 | Sharifi |
| 2014/0085293 A1 | 3/2014 | Konoplev et al. |
| 2014/0092130 A1 | 4/2014 | Anderson et al. |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0125678 A1 | 5/2014 | Wang et al. |
| 2014/0129343 A1 | 5/2014 | Finster et al. |
| 2014/0129953 A1 | 5/2014 | Spiegel |
| 2014/0143143 A1 | 5/2014 | Fasoli et al. |
| 2014/0143241 A1 | 5/2014 | Barello et al. |
| 2014/0149519 A1 | 5/2014 | Redfern et al. |
| 2014/0155102 A1 | 6/2014 | Cooper et al. |
| 2014/0157139 A1 | 6/2014 | Coroy et al. |
| 2014/0160149 A1 | 6/2014 | Blackstock et al. |
| 2014/0173424 A1 | 6/2014 | Hogeg et al. |
| 2014/0173457 A1 | 6/2014 | Wang et al. |
| 2014/0189592 A1 | 7/2014 | Benchenaa et al. |
| 2014/0199970 A1 | 7/2014 | Klotz |
| 2014/0201527 A1 | 7/2014 | Krivorot |
| 2014/0207679 A1 | 7/2014 | Cho |
| 2014/0214471 A1 | 7/2014 | Schreiner, III |
| 2014/0218394 A1 | 8/2014 | Hochmuth et al. |
| 2014/0221089 A1 | 8/2014 | Fortkort |
| 2014/0222564 A1 | 8/2014 | Kranendonk et al. |
| 2014/0223372 A1 | 8/2014 | Dostie et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280058 A1 | 9/2014 | St. Clair |
| 2014/0280537 A1 | 9/2014 | Pridmore et al. |
| 2014/0282096 A1 | 9/2014 | Rubinstein et al. |
| 2014/0287779 A1 | 9/2014 | O'keefe et al. |
| 2014/0289216 A1 | 9/2014 | Voellmer et al. |
| 2014/0289833 A1 | 9/2014 | Briceno |
| 2014/0306884 A1 | 10/2014 | Sano et al. |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2014/0359024 A1 | 12/2014 | Spiegel |
| 2014/0359032 A1 | 12/2014 | Spiegel et al. |
| 2014/0362091 A1 | 12/2014 | Bouaziz et al. |
| 2014/0372420 A1 | 12/2014 | Slep |
| 2014/0380195 A1 | 12/2014 | Graham et al. |
| 2015/0020086 A1 | 1/2015 | Chen et al. |
| 2015/0046278 A1 | 2/2015 | Pei et al. |
| 2015/0067880 A1 | 3/2015 | Ward et al. |
| 2015/0071619 A1 | 3/2015 | Brough |
| 2015/0086087 A1 | 3/2015 | Ricanek, Jr. et al. |
| 2015/0087263 A1 | 3/2015 | Branscomb et al. |
| 2015/0088464 A1 | 3/2015 | Yuen et al. |
| 2015/0088622 A1 | 3/2015 | Ganschow et al. |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0121251 A1 | 4/2015 | Kadirvel et al. |
| 2015/0123967 A1 | 5/2015 | Quinn et al. |
| 2015/0155007 A1 | 6/2015 | Barfield, Jr. et al. |
| 2015/0160832 A1 | 6/2015 | Walkin et al. |
| 2015/0169139 A1 | 6/2015 | Leva et al. |

(56) References Cited

U.S. PATENT DOCUMENTS

| | | |
|---|---|---|
| 2015/0169142 A1 | 6/2015 | Longo et al. |
| 2015/0169827 A1 | 6/2015 | Laborde |
| 2015/0169938 A1 | 6/2015 | Yao et al. |
| 2015/0172393 A1 | 6/2015 | Oplinger et al. |
| 2015/0172534 A1 | 6/2015 | Miyakawa et al. |
| 2015/0178260 A1 | 6/2015 | Brunson |
| 2015/0181380 A1 | 6/2015 | Altman et al. |
| 2015/0193522 A1 | 7/2015 | Choi et al. |
| 2015/0193585 A1 | 7/2015 | Sunna |
| 2015/0193819 A1 | 7/2015 | Chang |
| 2015/0195235 A1 | 7/2015 | Trussel et al. |
| 2015/0199082 A1 | 7/2015 | Scholler et al. |
| 2015/0201030 A1 | 7/2015 | Longo et al. |
| 2015/0206349 A1 | 7/2015 | Rosenthal et al. |
| 2015/0213604 A1 | 7/2015 | Li et al. |
| 2015/0220774 A1 | 8/2015 | Ebersman et al. |
| 2015/0222814 A1 | 8/2015 | Li et al. |
| 2015/0227602 A1 | 8/2015 | Ramu et al. |
| 2015/0232065 A1 | 8/2015 | Ricci et al. |
| 2015/0234942 A1 | 8/2015 | Harmon |
| 2015/0245168 A1 | 8/2015 | Martin |
| 2015/0261917 A1 | 9/2015 | Smith |
| 2015/0264432 A1 | 9/2015 | Cheng |
| 2015/0295866 A1 | 10/2015 | Collet et al. |
| 2015/0304806 A1 | 10/2015 | Vincent |
| 2015/0312184 A1 | 10/2015 | Langholz et al. |
| 2015/0334077 A1 | 11/2015 | Feldman |
| 2015/0347519 A1 | 12/2015 | Hornkvist et al. |
| 2015/0350136 A1 | 12/2015 | Flynn, III et al. |
| 2015/0350262 A1 | 12/2015 | Rainisto et al. |
| 2015/0365795 A1 | 12/2015 | Allen et al. |
| 2015/0369623 A1 | 12/2015 | Blumenberg et al. |
| 2015/0378502 A1 | 12/2015 | Hu et al. |
| 2016/0006927 A1 | 1/2016 | Sehn |
| 2016/0014063 A1 | 1/2016 | Hogeg et al. |
| 2016/0021153 A1 | 1/2016 | Hull et al. |
| 2016/0035111 A1 | 2/2016 | Ingrassia et al. |
| 2016/0045834 A1 | 2/2016 | Burns |
| 2016/0078095 A1 | 3/2016 | Man et al. |
| 2016/0085773 A1 | 3/2016 | Chang et al. |
| 2016/0085863 A1 | 3/2016 | Allen et al. |
| 2016/0086500 A1 | 3/2016 | Kaleal, III |
| 2016/0086670 A1 | 3/2016 | Gross et al. |
| 2016/0093078 A1 | 3/2016 | Davis et al. |
| 2016/0099901 A1 | 4/2016 | Allen et al. |
| 2016/0134840 A1 | 5/2016 | Mcculloch |
| 2016/0158600 A1 | 6/2016 | Rolley |
| 2016/0163084 A1 | 6/2016 | Corazza et al. |
| 2016/0164823 A1 | 6/2016 | Nordstrom et al. |
| 2016/0180887 A1 | 6/2016 | Sehn |
| 2016/0182422 A1 | 6/2016 | Sehn et al. |
| 2016/0182875 A1 | 6/2016 | Sehn |
| 2016/0188997 A1 | 6/2016 | Desnoyer et al. |
| 2016/0189310 A1 | 6/2016 | O'kane |
| 2016/0210500 A1 | 7/2016 | Feng et al. |
| 2016/0217292 A1 | 7/2016 | Faaborg et al. |
| 2016/0234060 A1 | 8/2016 | Pai et al. |
| 2016/0234149 A1 | 8/2016 | Tsuda et al. |
| 2016/0239248 A1 | 8/2016 | Sehn |
| 2016/0241504 A1 | 8/2016 | Raji et al. |
| 2016/0275721 A1 | 9/2016 | Park et al. |
| 2016/0277419 A1 | 9/2016 | Allen et al. |
| 2016/0286244 A1 | 9/2016 | Chang et al. |
| 2016/0292273 A1 | 10/2016 | Murphy et al. |
| 2016/0292905 A1 | 10/2016 | Nehmadi et al. |
| 2016/0294891 A1 | 10/2016 | Miller |
| 2016/0313957 A1 | 10/2016 | Ebert et al. |
| 2016/0321708 A1 | 11/2016 | Sehn |
| 2016/0343160 A1 | 11/2016 | Blattner et al. |
| 2016/0350297 A1 | 12/2016 | Riza |
| 2016/0359957 A1 | 12/2016 | Laliberte |
| 2016/0359987 A1 | 12/2016 | Laliberte |
| 2016/0359993 A1 | 12/2016 | Hendrickson et al. |
| 2016/0378278 A1 | 12/2016 | Sirpal |
| 2017/0006094 A1 | 1/2017 | Abou Mahmoud et al. |
| 2017/0010768 A1 | 1/2017 | Watson et al. |
| 2017/0027528 A1 | 2/2017 | Kaleal, III et al. |
| 2017/0034173 A1 | 2/2017 | Miller et al. |
| 2017/0039752 A1 | 2/2017 | Quinn et al. |
| 2017/0061308 A1 | 3/2017 | Chen et al. |
| 2017/0064240 A1 | 3/2017 | Mangat et al. |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0124116 A1 | 5/2017 | League |
| 2017/0126592 A1 | 5/2017 | El |
| 2017/0132649 A1 | 5/2017 | Oliva et al. |
| 2017/0161382 A1 | 6/2017 | Ouimet et al. |
| 2017/0199855 A1 | 7/2017 | Fishbeck |
| 2017/0235848 A1 | 8/2017 | Van Dusen et al. |
| 2017/0263029 A1 | 9/2017 | Yan et al. |
| 2017/0286752 A1 | 10/2017 | Gusarov et al. |
| 2017/0287006 A1 | 10/2017 | Azmoodeh et al. |
| 2017/0293673 A1 | 10/2017 | Purumala et al. |
| 2017/0295250 A1 | 10/2017 | Samaranayake et al. |
| 2017/0310934 A1 | 10/2017 | Du et al. |
| 2017/0312634 A1 | 11/2017 | Ledoux et al. |
| 2017/0324688 A1 | 11/2017 | Collet et al. |
| 2017/0336960 A1 | 11/2017 | Chaudhri et al. |
| 2017/0339006 A1 | 11/2017 | Austin et al. |
| 2017/0352179 A1 | 12/2017 | Hardee et al. |
| 2017/0353477 A1* | 12/2017 | Faigon .................. G06N 7/005 |
| 2017/0374003 A1 | 12/2017 | Allen et al. |
| 2017/0374508 A1 | 12/2017 | Davis et al. |
| 2018/0005420 A1 | 1/2018 | Bondich et al. |
| 2018/0024726 A1 | 1/2018 | Hviding |
| 2018/0025367 A1 | 1/2018 | Jain |
| 2018/0032212 A1 | 2/2018 | Choi et al. |
| 2018/0047200 A1 | 2/2018 | O'hara et al. |
| 2018/0060363 A1 | 3/2018 | Ko et al. |
| 2018/0068019 A1 | 3/2018 | Novikoff et al. |
| 2018/0088777 A1 | 3/2018 | Daze et al. |
| 2018/0091732 A1 | 3/2018 | Wilson et al. |
| 2018/0097762 A1 | 4/2018 | Garcia et al. |
| 2018/0113587 A1 | 4/2018 | Allen et al. |
| 2018/0115503 A1 | 4/2018 | Baldwin et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0057616 A1 | 2/2019 | Cohen et al. |
| 2019/0188920 A1 | 6/2019 | Mcphee et al. |
| 2019/0220932 A1 | 7/2019 | Amitay et al. |
| 2020/0117339 A1 | 4/2020 | Amitay et al. |
| 2020/0117340 A1 | 4/2020 | Amitay et al. |
| 2020/0120097 A1 | 4/2020 | Amitay et al. |
| 2020/0120170 A1 | 4/2020 | Amitay et al. |
| 2021/0243548 A1 | 8/2021 | Brody et al. |
| 2021/0286840 A1 | 9/2021 | Amitay et al. |
| 2021/0357104 A1 | 11/2021 | Amitay et al. |

FOREIGN PATENT DOCUMENTS

| | | |
|---|---|---|
| CN | 102664819 | 9/2012 |
| CN | 103116853 | 5/2013 |
| CN | 103124894 | 5/2013 |
| CN | 104616540 | 5/2015 |
| CN | 105893579 | 8/2016 |
| CN | 106157155 | 11/2016 |
| CN | 106530008 | 3/2017 |
| CN | 107210948 | 9/2017 |
| CN | 108885795 A | 11/2018 |
| CN | 109863532 A | 6/2019 |
| CN | 110168478 A | 8/2019 |
| CN | 110799937 A | 2/2020 |
| CN | 110800018 A | 2/2020 |
| CN | 110832538 A | 2/2020 |
| CN | 110945555 A | 3/2020 |
| CN | 111010882 A | 4/2020 |
| CN | 111343075 A | 6/2020 |
| CN | 111489264 A | 8/2020 |
| EP | 2051480 A1 | 4/2009 |
| EP | 2151797 A1 | 2/2010 |

(56) References Cited

FOREIGN PATENT DOCUMENTS

| | | |
|---|---|---|
| EP | 2184092 A2 | 5/2010 |
| GB | 2399928 A | 9/2004 |
| JP | 2001230801 A | 8/2001 |
| JP | 2014006881 A | 1/2014 |
| JP | 5497931 B2 | 3/2014 |
| JP | 2014191414 | 10/2014 |
| KR | 19990073076 A | 10/1999 |
| KR | 20010078417 A | 8/2001 |
| KR | 20040063436 A | 7/2004 |
| KR | 1020050036963 A | 4/2005 |
| KR | 20060124865 | 12/2006 |
| KR | 20110014224 | 2/2011 |
| KR | 20110054492 | 5/2011 |
| KR | 101060961 | 8/2011 |
| KR | 1020120070898 A | 7/2012 |
| KR | 20130075380 | 7/2013 |
| KR | 20130111868 | 10/2013 |
| KR | 20140015725 | 2/2014 |
| KR | 101445263 B1 | 9/2014 |
| KR | 101548880 | 9/2015 |
| KR | 20160001847 | 1/2016 |
| KR | 20160018954 | 2/2016 |
| KR | 101604654 | 3/2016 |
| KR | 20160028636 | 3/2016 |
| KR | 20160051536 | 5/2016 |
| KR | 101698031 | 1/2017 |
| KR | 20170025454 | 3/2017 |
| KR | 20170035657 | 3/2017 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001050703 A3 | 7/2001 |
| WO | WO-2003094072 A1 | 11/2003 |
| WO | WO-2004095308 A1 | 11/2004 |
| WO | WO-2006107182 A1 | 10/2006 |
| WO | WO-2006118755 A2 | 11/2006 |
| WO | WO-2007134402 A1 | 11/2007 |
| WO | WO-2009043020 A2 | 4/2009 |
| WO | WO-2011040821 A1 | 4/2011 |
| WO | WO-2011119407 A1 | 9/2011 |
| WO | 2012000107 | 1/2012 |
| WO | WO-2012139276 A1 | 10/2012 |
| WO | 2013008251 | 1/2013 |
| WO | WO-2013008238 | 1/2013 |
| WO | WO-2013027893 A1 | 2/2013 |
| WO | WO-2013045753 A1 | 4/2013 |
| WO | WO-2013152454 A1 | 10/2013 |
| WO | WO-2013166588 A1 | 11/2013 |
| WO | WO-2014031899 A1 | 2/2014 |
| WO | WO-2014068573 A1 | 5/2014 |
| WO | WO-2014115136 A1 | 7/2014 |
| WO | WO-2014194262 A2 | 12/2014 |
| WO | WO-2014194439 A1 | 12/2014 |
| WO | WO-2015192026 A1 | 12/2015 |
| WO | WO-2016044424 A1 | 3/2016 |
| WO | WO-2016054562 A1 | 4/2016 |
| WO | WO-2016065131 A1 | 4/2016 |
| WO | WO-2016090605 A1 | 6/2016 |
| WO | WO-2016100318 A2 | 6/2016 |
| WO | WO-2016100318 A3 | 6/2016 |
| WO | WO-2016100342 A1 | 6/2016 |
| WO | 2016/112299 | 7/2016 |
| WO | WO-2016149594 A1 | 9/2016 |
| WO | 2016179166 | 11/2016 |
| WO | 2016179235 | 11/2016 |
| WO | 2017176739 | 10/2017 |
| WO | 2017176992 | 10/2017 |
| WO | WO-2017173319 A1 | 10/2017 |
| WO | WO-2018005644 A1 | 1/2018 |
| WO | WO-2018006053 A1 | 1/2018 |
| WO | WO-2018081013 A1 | 5/2018 |
| WO | WO-2018102562 A1 | 6/2018 |
| WO | WO-2018129531 A1 | 7/2018 |
| WO | 2018200042 | 11/2018 |
| WO | 2018200043 | 11/2018 |
| WO | 2018201102 | 11/2018 |
| WO | 2018201104 | 11/2018 |
| WO | 2018201106 | 11/2018 |
| WO | 2018201107 | 11/2018 |
| WO | 2018201108 | 11/2018 |
| WO | 2018201109 | 11/2018 |
| WO | WO-2019089613 A1 | 5/2019 |

OTHER PUBLICATIONS

Petovello, Mark, "How does a GNSS receiver estimate velocity?", [Online] Retrieved from the internet http: insidegnss.com wp-content uploads Jan. 2018 marapr15-SOLUTIONS.pdf., (Mar.-Apr. 2015), 3 pgs.
"International Application Serial No. PCT US2018 030044, International Search Report dated Jun. 26, 2018", 2 pgs.
"International Application Serial No. PCT US2018 030044, Written Opinion dated Jun. 26, 2018", 6 pgs.
"International Application Serial No. PCT US2018 030045, International Search Report dated Jul. 3, 2018", 2 pgs.
"International Application Serial No. PCT US2018 030045, Written Opinion dated Jul. 3, 2018", 6 pgs.
"International Application Serial No. PCT US2018 030046, International Search Report dated Jul. 6, 2018", 2 pgs.
"International Application Serial No. PCT US2018 030046, Written Opinion dated Jul. 6, 2018", 6 pgs.
"International Application Serial No. PCT US2018 030039, International Search Report dated Jul. 11, 2018", 2 pgs.
"International Application Serial No. PCT US2018 030039, Written Opinion dated Jul. 11, 2018", 4 pgs.
"International Application Serial No. PCT US2018 030041, International Search Report dated Jul. 11, 2018", 2 pgs.
"International Application Serial No. PCT US2018 030041, Written Opinion dated Jul. 11, 2018", 3 pgs.
"International Application Serial No. PCT US2018 000113, International Search Report dated Jul. 13, 2018", 2 pgs.
"International Application Serial No. PCT US2018 000113, Written Opinion dated Jul. 13, 2018", 4 pgs.
"International Application Serial No. PCT US2018 000112, International Search Report dated Jul. 20, 2018", 2 pgs.
"International Application Serial No. PCT US2018 000112, Written Opinion dated Jul. 20, 2018", 4 pgs.
"International Application Serial No. PCT US2018 030043, International Search Report dated Jul. 23, 2018", 2 pgs.
"International Application Serial No. PCT US2018 030043, Written Opinion dated Jul. 23, 2018", 5 pgs.
Castelluccia, Claude, "EphPub: Toward robust Ephemeral Publishing", 19th IEEE International Conference on Network Protocols (ICNP), (Oct. 17, 2011), 18 pgs.
Fajman, "An Extensible Message Format for Message Disposition Notifications", Request for Comments: 2298, National Institutes of Health, (Mar. 1998), 28 pgs.
Leyden, John, "This SMS will self-destruct in 40 seconds", URL: http: www.theregister.co.uk 2005 12 12 stealthtext, (Dec. 12, 2005), 1 pg.
Melanson, Mike, "This text message will self destruct in 60 seconds", URL: http: readwrite.com 2011 02 11 this_text_message_will_self_destruct_in_60_seconds, (Feb. 18, 2015), 4 pgs.
Sawers, Paul, "Snapchat for iOS Lets You Send Photos to Friends and Set How long They're Visible For", URL: https: thenextweb.com apps 2012 05 07 snapchat-for-ios-lets-you-send-photos-to-friends-and-set-how-long-theyre-visible-for , (May 7, 2012), 5 pgs.
Shein, Esther, "Ephemeral Data", Communications of the ACM, vol. 56, No. 9, (Sep. 2013), 20-22.
Vaas, Lisa, "StealthText, Should You Choose to Accept It", URL: http: www.eweek.com print c a MessagingandCollaboration StealthTextShouldYouChoosetoAcceptIt, (Dec. 13, 2005), 2 pgs.
U.S. Appl. No. 15/965,811, filed Apr. 27, 2018, Map-Based Graphical User Interface Indicating Geospatial Activity Metrics.
U.S. Appl. No. 15/965,466, filed Apr. 27, 2018, Friend Location Sharing Mechanism for Social Media Platforms.

(56) References Cited

OTHER PUBLICATIONS

U.S. Appl. No. 15/628,408, filed Jun. 20, 2017, Location-Based Virtual Avatars.
U.S. Appl. No. 15/901,387, filed Feb. 21, 2018, Live Location Sharing Using Virtual Avatars.
U.S. Appl. No. 15/965,361, filed Apr. 27, 2018, Map-Based Graphical User Interface for Ephemeral Social Media Content.
U.S. Appl. No. 15/965,775, filed Apr. 27, 2018, Map-Based Graphical User Interface Indicating Geospatial Activity Metrics.
U.S. Appl. No. 15/965,754, filed Apr. 27, 2018, Location-Based Search Mechanism in a Graphical User Interface.
U.S. Appl. No. 15/965,744, filed Apr. 27, 2018, Regional-Level Representation of User Location on a Social Media Platform.
U.S. Appl. No. 15/965,756, filed Apr. 27, 2018, Location-Based Social Media Search Mechanism With Dynamically Variable Search Period.
U.S. Appl. No. 15/965,764, filed Apr. 27, 2018, Location Privacy Management on Map-Based Social Media Platforms.
"A Whole New Story", URL: https://www.snap.com/en-US/news/, (2017), 13 pgs.
"Adding a watermark to your photos", eBay, URL: http://pages.ebay.com/help/sell/pictures.html, (accessed May 24, 2017), 4 pgs.
"BlogStomp", URL: http://stompsoftware.com/blogstomp, (accessed May 24, 2017), 12 pgs.
"Cup Magic Starbucks Holiday Red Cups come to life with AR app", URL: http://www.blastradius.com/work/cup-magic, (2016), 7 pgs.
"Daily App: InstaPlace (iOS/Android): Give Pictures a Sense of Place", TechPP, URL: http://techpp.com/2013/02/15/instaplace-app-review, (2013), 13 pgs.
"InstaPlace Photo App Tell The Whole Story", URL: https://youtu.be/uF_gFkg1hBM, (Nov. 8, 2013), 113 pgs.
"International Application Serial No. PCT/US2015/037251, International Search Report dated Sep. 29, 2015", 2 pgs.
"Introducing Snapchat Stories", URL: https://www.youtube.com/watch?v=88Cu3yN-LIM, (Oct. 3, 2013), 92 pgs.
"Macy's Believe-o-Magic", URL: https://www.youtube.com/watch?v=xvzRXy3J0Z0, (Nov. 7, 2011), 102 pgs.
"Macys Introduces Augmented Reality Experience in Stores across Country as Part of Its 2011 Believe Campaign", URL: https://www.businesswire.com/news/home/20111102006759/en/Macys-Introduces-Augmented-Reality-Experience-Stores-Country, (Nov. 2, 2011), 6 pgs.
"Starbucks Cup Magic", URL: https://www.youtube.com/watch?v=RWwQXi9RG0w, (Nov. 8, 2011), 87 pgs.
"Starbucks Cup Magic for Valentine's Day", URL: https://www.youtube.com/watch?v=8nvqOzjq10w, (Feb. 6, 2012), 88 pgs.
"Starbucks Holiday Red Cups Come to Life, Signaling the Return of the Merriest Season", URL: http://www.businesswire.com/news/home/20111115005744/en/2479513/Starbucks-Holiday-Red-Cups-Life-Signaling-Return, (Nov. 15, 2011), 5 pgs.
Carthy, Roi, "Dear All Photo Apps: Mobli Just Won Filters", URL: https://techcrunch.com/2011/09/08/mobli-filters, (Sep. 8, 2011), 10 pgs.
Dillet, Romain, "Zenly proves that location sharing isn't dead", URL: https://techcrunch.com/2016/05/19/zenly-solomoyolo/, (accessed Jun. 27, 2018), 6 pgs.
Janthong, Isaranu, "Android App Review Thailand", URL: http://www.android-free-app-review.com/2013/01/instaplace-android-google-play-store.html, (Jan. 23, 2013), 9 pgs.
MacLeod, Duncan, "Macys Believe-o-Magic App", URL: http://theinspirationroom.com/daily/2011/macys-believe-o-magic-app, (Nov. 14, 2011), 10 pgs.
MacLeod, Duncan, "Starbucks Cup Magic Lets Merry", URL: http://theinspirationroom.com/daily/2011/starbucks-cup-magic, (Nov. 12, 2011), 8 pgs.
Notopoulos, Katie, "A Guide To The New Snapchat Filters And Big Fonts", URL: https://www.buzzfeed.com/katienotopoulos/a-guide-to-the-new-snapchat-filters-and-big-fonts?utm_term=.bkQ9qVZWe#.nv58YXpkV, (Dec. 22, 2013), 13 pgs.

Panzarino, Matthew, "Snapchat Adds Filters, A Replay Function And For Whatever Reason, Time, Temperature And Speed Overlays", URL: https://techcrunch.com/2013/12/20/snapchat-adds-filters-new-font-and-for-some-reason-time-temperature-and-speed-overlays/, (Dec. 20, 2013), 12 pgs.
Tripathi, Rohit, "Watermark Images in PHP And Save File on Server", URL: http://code.rohitink.com/2012/12/28/watermark-images-in-php-and-save-file-on-server, (Dec. 28, 2012), 4 pgs.
"U.S. Appl. No. 15/628,408, Final Office Action dated Jun. 10, 2019", 44 pgs.
"U.S. Appl. No. 15/628,408, Non Final Office Action dated Oct. 30, 2019", 45 pgs.
"U.S. Appl. No. 15/628,408, Response filed Apr. 2, 2019 to Non Final Office Action dated Jan. 2, 2019", 15 pgs.
"U.S. Appl. No. 15/628,408, Response filed Aug. 12, 2019 to Final Office Action dated Jun. 10, 2019", 12 pgs.
"U.S. Appl. No. 15/628,408, Supplemental Amendment filed Apr. 4, 2019 to Non Final Office Action dated Jan. 2, 2019", 12 pgs.
"U.S. Appl. No. 15/901,387, Non Final Office Action dated Oct. 30, 2019", 40 pgs.
"U.S. Appl. No. 15/965,744, Amendment and Response filed Nov. 12, 2019 to Non Final Office Action dated Jun. 12, 2019", 10 pgs.
"U.S. Appl. No. 15/965,744, Non Final Office Action dated Jun. 12, 2019", 18 pgs.
"U.S. Appl. No. 15/965,775, Non Final Office Action dated Jul. 29, 2019", 8 pgs.
"U.S. Appl. No. 15/965,775, Response filed Oct. 29, 2019 to Non Final Office Action dated Jul. 29, 2019", 10 pgs.
"U.S. Appl. No. 15/965,811, Non Final Office Action dated Aug. 8, 2019", 15 pgs.
"U.S. Appl. No. 15/965,811, Response filed Nov. 8, 2019 to Non Final Office Action dated Aug. 8, 2019", 14 pgs.
"U.S. Appl. No. 16/232,824, Non Final Office Action dated Oct. 21, 2019", 18 pgs.
"U.S. Appl. No. 16/365,300, Non Final Office Action dated Oct. 30, 2019", 40 pgs.
"International Application Serial No. PCT/US2018/000112, International Preliminary Report on Patentability dated Nov. 7, 2019", 6 pgs.
"International Application Serial No. PCT/US2018/030039, International Preliminary Report on Patentability dated Nov. 7, 2019", 6 pgs.
"International Application Serial No. PCT/US2018/030041, International Preliminary Report on Patentability dated Nov. 7, 2019", 5 pgs.
"International Application Serial No. PCT/US2018/030043, International Preliminary Report on Patentability dated Nov. 7, 2019", 7 pgs.
"International Application Serial No. PCT/US2018/030044, International Preliminary Report on Patentability dated Nov. 7, 2019", 8 pgs.
"International Application Serial No. PCT/US2018/030045, International Preliminary Report on Patentability dated Nov. 7, 2019", 8 pgs.
"International Application Serial No. PCT/US2018/030046, International Preliminary Report on Patentability dated Nov. 7, 2019", 8 pgs.
"International Application Serial No. PCT/US2018/000113, International Preliminary Report on Patentability dated Nov. 7, 2019", 6 pgs.
"Introducing Google Latitude", Google UK, [Online] Retrieved from the Internet: <URL: https://www.youtube.com/watch?v=;XecGMKqiA5A>, [Retrieved on: Oct. 23, 2019], (Feb. 3, 2009), 1 pg.
Finn, Greg, "Miss Google Latitude? Google Plus With Location Sharing Is Now A Suitable Alternative", Cypress North, [Online] Retrieved from the Internet: <URL: https://cypressnorth.com/social-media/miss-google-latttude-google-location-sharing-now-suitable-alternative/>, [Retrieved on: Oct. 24, 2019], (Nov. 27, 2013), 10 pgs.
Lapenna, Joe, "The Official Google Blog. Check in with Google Latitude", Google Blog, [Online] Retrieved from the Internet: <https://web.archive.org/web/20110201201006/https://googleblog.

(56) References Cited

OTHER PUBLICATIONS blogspot.com/2011/02/check-in-with-google-latitude.html>,[Retrieved on: Oct. 23, 2019], (Feb. 1, 2011), 6 pgs.

Neis, Pascal, "The OpenStreetMap Contributors Map aka Who's around me?", [Online] Retrieved from the Internet, by the examiner on Jun. 5, 2019: <URL: https://neis-one.org/2013/01/oooc/>, (Jan. 6, 2013), 7 pgs.

Sulleyman, Aatif, "Google Maps Could Let Strangers Track Your Real-Time Location For Days At A Time", The Independent, [Online] Retrieved from the Internet by the examiner on Jun. 5, 2019: <URL: https://www.independent.co.uk/life-style/gadgets-and-tech/news/google-maps-track-location-real-time-days-privacy-security-stalk-gps-days-a7645721.htm>, (Mar. 23, 2017), 5 pgs.

Zibreg, "How to share your real time location on Google Maps", idownloadblog.com, [Online] Retrieved from the Internet: <URL: https://www.idownloadblog.com/2017/04/12/how-to-share-location-google-maps/>, [Retrieved on: Oct. 23, 2019], (Apr. 12, 2017), 23 pgs.

U.S. Appl. No. 16/365,300, filed Mar. 26, 2019, Location-Based Virtual Avatars.

U.S. Appl. No. 16/232,824, filed Dec. 26, 2018, Clustered User Icons in Map-Based Social Media Interfaces.

"U.S. Appl. No. 15/628,408, Response filed Jan. 30, 2020 to Non Final Office Action dated Oct. 30, 2019", 17 pgs.

"U.S. Appl. No. 15/965,744, Examiner Interview Summary dated Feb. 21, 2020", 3 pgs.

"U.S. Appl. No. 15/965,744, Final Office Action dated Feb. 6, 2020", 19 pgs.

"U.S. Appl. No. 15/965,764, Non Final Office Action dated Jan. 2, 2020", 18 pgs.

"U.S. Appl. No. 15/965,775, Final Office Action dated Jan. 30, 2020", 10 pgs.

"U.S. Appl. No. 15/965,811, Final Office Action dated Feb. 12, 2020", 16 pgs.

"U.S. Appl. No. 16/232,824, Response filed Feb. 21, 2020 to Non Final Office Action dated Oct. 21, 2019".

"U.S. Appl. No. 16/365,300, Response filed Jan. 30, 2020 to Non Final Office Action dated Oct. 30, 2019", 16 pgs.

"European Application Serial No. 18789872.1, Extended European Search Report dated Jan. 2, 2020", 8 pgs.

"European Application Serial No. 18790189.7, Extended European Search Report dated Jan. 2, 2020", 7 pgs.

"European Application Serial No. 18790319.0, Extended European Search Report dated Feb. 12, 2020", 6 pgs.

"European Application Serial No. 18791363.7, Extended European Search Report dated Jan. 2, 2020", 8 pgs.

"European Application Serial No. 18791925.3, Extended European Search Report dated Jan. 2, 2020", 6 pgs.

"European Application Serial No. 19206610.8, Extended European Search Report dated Feb. 12, 2020", 6 pgs.

"The One Million Tweet Map: Using Maptimize to Visualize Tweets in a World Map | PowerPoint Presentation", fppt.com, [Online] Retrieved form the Internet: <URL: https://web.archive.org/web/20121103231906/http://www.freepower-point-templates.com/articles/the-one-million-tweet-mapusing-maptimize-to-visualize-tweets-in-a-world-map/>, (Nov. 3, 2012), 6 pgs.

"U.S. Appl. No. 12/471,811, Advisory Action dated Mar. 28, 2012", 6 pgs.

"U.S. Appl. No. 12/471,811, Examiner Interview Summary dated Feb. 2, 2012", 3 pgs.

"U.S. Appl. No. 12/471,811, Examiner Interview Summary dated Apr. 18, 2011", 3 pgs.

"U.S. Appl. No. 12/471,811, Examiner Interview Summary dated May 27, 2014", 2 pgs.

"U.S. Appl. No. 12/471,811, Final Office Action dated Dec. 23, 2011", 20 pgs.

"U.S. Appl. No. 12/471,811, Non Final Office Action dated Jan. 13, 2011", 15 pgs.

"U.S. Appl. No. 12/471,811, Non Final Office Action dated Jun. 28, 2011", 26 pgs.

"U.S. Appl. No. 12/471,811, Non Final Office Action dated Oct. 24, 2014", 21 pgs.

"U.S. Appl. No. 12/471,811, Notice of Allowance dated Apr. 1, 2015", 6 pgs.

"U.S. Appl. No. 12/471,811, Response filed Jan. 26, 2015 to Non Final Office Action dated Oct. 24, 2014", 18 pgs.

"U.S. Appl. No. 12/471,811, Response filed Feb. 23, 2012 to Final Office Action dated Dec. 23, 2011", 12 pgs.

"U.S. Appl. No. 12/471,811, Response filed Mar. 28, 2012 to Advisory Action dated Mar. 28, 2012", 14 pgs.

"U.S. Appl. No. 12/471,811, Response filed Apr. 13, 2011 to Non Final Office Action dated Jan. 13, 2011", 5 pgs.

"U.S. Appl. No. 12/471,811, Response filed Sep. 28, 2011 to Non Final Office Action dated Jun. 28, 2011", 19 pgs.

"U.S. Appl. No. 13/979,974, Corrected Notice of Allowability dated Nov. 19, 2018", 2 pgs.

"U.S. Appl. No. 13/979,974, Examiner Interview Summary dated Jun. 29, 2017", 3 pgs.

"U.S. Appl. No. 13/979,974, Examiner Interview Summary dated Sep. 15, 2017", 3 pgs.

"U.S. Appl. No. 13/979,974, Final Office Action dated Apr. 25, 2018", 18 pgs.

"U.S. Appl. No. 13/979,974, Final Office Action dated Jun. 9, 2017", 20 pgs.

"U.S. Appl. No. 13/979,974, Final Office Action dated Oct. 12, 2016", 13 pgs.

"U.S. Appl. No. 13/979,974, Non Final Office Action dated Feb. 22, 2017", 17 pgs.

"U.S. Appl. No. 13/979,974, Non Final Office Action dated Apr. 27, 2016", 16 pgs.

"U.S. Appl. No. 13/979,974, Non Final Office Action dated Oct. 3, 2017", 17 pgs.

"U.S. Appl. No. 13/979,974, Notice of Allowance dated Aug. 10, 2018", 9 pgs.

"U.S. Appl. No. 13/979,974, Response filed Jan. 3, 2018 to Non Final Office Action dated Oct. 3, 2017", 8 pgs.

"U.S. Appl. No. 13/979,974, Response filed May 22, 2017 to Non Final Office Action dated Feb. 22, 2017", 10 pgs.

"U.S. Appl. No. 13/979,974, Response filed Jul. 25, 2018 to Final Office Action dated Apr. 25, 2018", 10 pgs.

"U.S. Appl. No. 13/979,974, Response filed Jul. 26, 2016 to Non Final Office Action dated Apr. 27, 2016", 8 pgs.

"U.S. Appl. No. 13/979,974, Response filed Sep. 11, 2017 to Final Office Action dated Jun. 9, 2017", 8 pgs.

"U.S. Appl. No. 13/979,974, Response filed Jan. 12, 2017 to Non Final Office Action dated Apr. 27, 2016", 8 pgs.

"U.S. Appl. No. 14/753,200, Non Final Office Action dated Oct. 11, 2016", 6 pgs.

"U.S. Appl. No. 14/753,200, Notice of Allowance dated Apr. 27, 2017", 7 pgs.

"U.S. Appl. No. 14/753,200, Response filed Feb. 13, 2017 to Non Final Office Action dated Oct. 11, 2016", 9 pgs.

"U.S. Appl. No. 15/086,749, Final Office Action dated Oct. 31, 2017", 15 pgs.

"U.S. Appl. No. 15/086,749, Final Office Action dated Dec. 31, 2018", 14 pgs.

"U.S. Appl. No. 15/086,749, Non Final Office Action dated Mar. 13, 2017", 12 pgs.

"U.S. Appl. No. 15/086,749, Non Final Office Action dated Apr. 30, 2018", 14 pgs.

"U.S. Appl. No. 15/086,749, Notice of Allowance dated Feb. 26, 2019", 7 pgs.

"U.S. Appl. No. 15/086,749, Response filed Feb. 11, 2019 to Final Office Action dated Dec. 31, 2018", 10 pgs.

"U.S. Appl. No. 15/086,749, Response filed Apr. 2, 2018 to Final Office Action dated Oct. 31, 2017", 14 pgs.

"U.S. Appl. No. 15/086,749, Response filed Aug. 29, 2018 to Non Final Office Action dated Apr. 30, 2018", 12 pgs.

"U.S. Appl. No. 15/199,472, Final Office Action dated Mar. 1, 2018", 31 pgs.

"U.S. Appl. No. 15/199,472, Final Office Action dated Nov. 15, 2018", 37 pgs.

(56) References Cited

OTHER PUBLICATIONS

"U.S. Appl. No. 15/199,472, Non Final Office Action dated Jul. 25, 2017", 30 pgs.

"U.S. Appl. No. 15/199,472, Non Final Office Action dated Sep. 21, 2018", 33 pgs.

"U.S. Appl. No. 15/199,472, Notice of Allowance dated Mar. 18, 2019", 23 pgs.

"U.S. Appl. No. 15/199,472, Response filed Jan. 15, 2019 to Final Office Action dated Nov. 15, 2018", 14 pgs.

"U.S. Appl. No. 15/199,472, Response filed Jan. 25, 2018 to Non Final Office Action dated Jul. 25, 2017", 13 pgs.

"U.S. Appl. No. 15/199,472, Response filed Aug. 31, 2018 to Final Office Action dated Mar. 1, 2018", 14 pgs.

"U.S. Appl. No. 15/199,472, Response filed Oct. 17, 2018 to Non Final Office Action dated Sep. 31, 2018", 11 pgs.

"U.S. Appl. No. 15/365,046, Non Final Office Action dated Dec. 20, 2018", 36 pgs.

"U.S. Appl. No. 15/365,046, Response filed Mar. 20, 2019 to Non Final Office Action dated Dec. 20, 2018", 20 pgs.

"U.S. Appl. No. 15/369,499, Examiner Interview Summary dated Sep. 21, 2020", 3 pgs.

"U.S. Appl. No. 15/369,499, Final Office Action dated Jan. 31, 2019", 22 pgs.

"U.S. Appl. No. 15/369,499, Final Office Action dated Jun. 15, 2020", 17 pgs.

"U.S. Appl. No. 15/369,499, Final Office Action dated Oct. 1, 2019", 17 pgs.

"U.S. Appl. No. 15/369,499, Non Final Office Action dated Mar. 2, 2020", 17 pgs.

"U.S. Appl. No. 15/369,499, Non Final Office Action dated Jun. 17, 2019", 17 pgs.

"U.S. Appl. No. 15/369,499, Non Final Office Action dated Aug. 15, 2018", 22 pgs.

"U.S. Appl. No. 15/369,499, Response filed Feb. 3, 2020 to Final Office Action dated Oct. 1, 2019", 10 pgs.

"U.S. Appl. No. 15/369,499, Response filed Mar. 14, 2019 to Final Office Action dated Jan. 31, 2019", 12 pgs.

"U.S. Appl. No. 15/369,499, Response filed Jun. 2, 2020 to Non Final Office Action dated Mar. 2, 2020", 9 pgs.

"U.S. Appl. No. 15/369,499, Response filed Sep. 15, 2020 to Final Office Action dated Jun. 15, 2020", 10 pgs.

"U.S. Appl. No. 15/369,499, Response filed Nov. 15, 2018 to Non Final Office Action dated Aug. 15, 2018", 10 pgs.

"U.S. Appl. No. 15/369,499, Response filed Sep. 10, 2019 to Non-Final Office Action dated Jun. 17, 2019", 9 pgs.

"U.S. Appl. No. 15/583,142, Jan. 28, 2019 to Response Filed Non Final Office Action dated Oct. 25, 2018", 19 pgs.

"U.S. Appl. No. 15/583,142, Final Office Action dated Mar. 22, 2019", 11 pgs.

"U.S. Appl. No. 15/583,142, Non Final Office Action dated Oct. 25, 2018", 14 pgs.

"U.S. Appl. No. 15/628,408, Final Office Action dated Apr. 13, 2020", 45 pgs.

"U.S. Appl. No. 15/628,408, Notice of Allowance dated Sep. 29, 2020", 13 pgs.

"U.S. Appl. No. 15/628,408, Response filed Jul. 13, 2020 to Final Office Action dated Apr. 13, 2020", 20 pgs.

"U.S. Appl. No. 15/661,953, Examiner Interview Summary dated Nov. 13, 2018", 3 pgs.

"U.S. Appl. No. 15/661,953, Non Final Office Action dated Mar. 26, 2018", 6 pgs.

"U.S. Appl. No. 15/661,953, Notice of Allowance dated Aug. 10, 2018", 7 pgs.

"U.S. Appl. No. 15/661,953, PTO Response to Rule 312 Communication dated Oct. 30, 2018", 2 pgs.

"U.S. Appl. No. 15/661,953, PTO Response to Rule 312 Communication dated Nov. 7, 2018", 2 pgs.

"U.S. Appl. No. 15/661,953, Response Filed Jun. 26, 2018 to Non Final Office Action dated Mar. 26, 2018", 13 pgs.

"U.S. Appl. No. 15/859,101, Examiner Interview Summary dated Sep. 18, 2018", 3 pgs.

"U.S. Appl. No. 15/859,101, Non Final Office Action dated Jun. 15, 2018", 10 pgs.

"U.S. Appl. No. 15/859,101, Notice of Allowance dated Oct. 4, 18", 9 pgs.

"U.S. Appl. No. 15/859,101, Response filed Sep. 17, 2018 to Non Final Office Action dated Jun. 15, 2018", 17 pgs.

"U.S. Appl. No. 15/965,361, Non Final Office Action dated Jun. 22, 2020", 35 pgs.

"U.S. Appl. No. 15/965,744, Response filed Jun. 8, 2020 to Final Office Action dated Feb. 6, 2020", 11 pgs.

"U.S. Appl. No. 15/965,754, Final Office Action dated Jul. 17, 2020", 14 pgs.

"U.S. Appl. No. 15/965,754, Non Final Office Action dated Mar. 30, 2020", 13 pgs.

"U.S. Appl. No. 15/965,754, Response filed Jun. 30, 2020 to Non Final Office Action dated Mar. 30, 2020", 12 pgs.

"U.S. Appl. No. 15/965,754, Response filed Oct. 19, 2020 to Final Office Action dated Jul. 17, 2020", 14 pgs.

"U.S. Appl. No. 15/965,756, Non Final Office Action dated Jun. 24, 2020", 16 pgs.

"U.S. Appl. No. 15/965,756, Response filed Sep. 24, 2020 to Non Final Office Action dated Jun. 24, 2020", 11 pgs.

"U.S. Appl. No. 15/965,764, Examiner Interview Summary dated Aug. 6, 2020", 3 pgs.

"U.S. Appl. No. 15/965,764, Final Office Action dated May 14, 2020", 18 pgs.

"U.S. Appl. No. 15/965,764, Response filed Apr. 2, 2020 to Non Final Office Action dated Jan. 2, 2020", 11 pgs.

"U.S. Appl. No. 15/965,764, Response filed Oct. 14, 2020 to Final Office Action dated May 14, 2020", 11 pgs.

"U.S. Appl. No. 15/965,775, Non Final Office Action dated Jun. 19, 2020", 12 pgs.

"U.S. Appl. No. 15/965,775, Non Final Office Action dated Oct. 16, 2020", 11 pgs.

"U.S. Appl. No. 15/965,775, Response filed Jun. 1, 2020 to Final Office Action dated Jan. 30, 2020", 10 pgs.

"U.S. Appl. No. 15/965,775, Response filed Jul. 7, 2020 to Non Final Office Action dated Jun. 19, 2020", 9 pgs.

"U.S. Appl. No. 15/965,811, Non Final Office Action dated Jun. 26, 2020", 20 pgs.

"U.S. Appl. No. 15/965,811, Response filed Jun. 12, 2020 to Final Office Action dated Feb. 12, 2020", 13 pgs.

"U.S. Appl. No. 16/115,259, Final Office Action dated Jul. 22, 2020", 20 pgs.

"U.S. Appl. No. 16/115,259, Final Office Action dated Dec. 16, 2019", 23 pgs.

"U.S. Appl. No. 16/115,259, Non Final Office Action dated Apr. 9, 2020", 18 pgs.

"U.S. Appl. No. 16/115,259, Non Final Office Action dated Jul. 30, 2019", 21 pgs.

"U.S. Appl. No. 16/115,259, Preliminary Amendment filed Oct. 18, 2018 t", 6 pgs.

"U.S. Appl. No. 16/115,259, Response filed Mar. 13, 2020 to Final Office Action dated Dec. 16, 2019", 9 pgs.

"U.S. Appl. No. 16/115,259, Response filed Jul. 9, 2020 to Non Final Office Action dated Apr. 9, 2020", 8 pgs.

"U.S. Appl. No. 16/115,259, Response filed Oct. 30, 2019 to Non Final Office Action dated Jul. 30, 2019", 9 pgs.

"U.S. Appl. No. 16/193,938, Preliminary Amendment filed Nov. 27, 2018", 7 pgs.

"U.S. Appl. No. 16/232,824, Examiner Interview Summary dated Jul. 24, 2020", 3 pgs.

"U.S. Appl. No. 16/232,824, Final Office Action dated Apr. 30, 2020", 19 pgs.

"U.S. Appl. No. 16/232,824, Response filed Jul. 15, 2020 to Final Office Action dated Apr. 30, 2020", 11 pgs.

"U.S. Appl. No. 16/245,660, Final Office Action dated Feb. 6, 2020", 12 pgs.

"U.S. Appl. No. 16/245,660, Non Final Office Action dated Jun. 27, 2019", 11 pgs.

(56) References Cited

OTHER PUBLICATIONS

"U.S. Appl. No. 16/245,660, Notice of Allowance dated Jul. 8, 2020", 8 pgs.
"U.S. Appl. No. 16/245,660, Response filed Jun. 8, 2020 to Final Office Action dated Feb. 6, 2020", 16 pgs.
"U.S. Appl. No. 16/245,660, Response filed Nov. 6, 2019 to Non Final Office Action dated Jun. 27, 2019", 11 pgs.
"U.S. Appl. No. 16/365,300, Final Office Action dated May 13, 2020", 44 pgs.
"U.S. Appl. No. 16/365,300, Non Final Office Action dated Sep. 28, 2020", 40 pgs.
"U.S. Appl. No. 16/365,300, Response filed Aug. 13, 2020 to Final Office Action dated May 13, 2020", 16 pgs.
"European Application Serial No. 19206595.1, Extended European Search Report dated Mar. 31, 2020", 6 pgs.
"European Application Serial No. 17776809.0, Extended European Search Report dated Feb. 27, 2019", 7 pgs.
"European Application Serial No. 18789872.1, Communication Pursuant to Article 94(3) EPC dated Aug. 11, 2020", 6 pgs.
"European Application Serial No. 18790189.7, Communication Pursuant to Article 94(3) EPC dated Jul. 30, 2020", 9 pgs.
"European Application Serial No. 18790189.7, Response Filed Jul. 14, 2020 to Extended European Search Report dated Jan. 2, 2020", 21 pgs.
"European Application Serial No. 18790319.0, Response filed Aug. 27, 2020 to Extended European Search Report dated Feb. 12, 2020", 19 pgs.
"European Application Serial No. 18791363.7, Communication Pursuant to Article 94(3) EPC dated Aug. 11, 2020", 9 pgs.
"European Application Serial No. 18791363.7, Response filed Jul. 14, 2020 to Extended European Search Report dated Jan. 2, 2020", 31 pgs.
"European Application Serial No. 18791925.3, Response Filed Jul. 27, 2020 to Extended European Search Report dated Jan. 2, 2020", 19 pgs.
"European Application Serial No. 19206610.8, Response filed Sep. 23, 2020 to Extended European Search Report dated Feb. 12, 2020", 109 pgs.
"International Application Serial No. PCT/CA2013/000454, International Preliminary Report on Patentability dated Nov. 20, 2014", 9 pgs.
"International Application Serial No. PCT/CA2013/000454, International Search Report dated Aug. 20, 2013", 3 pgs.
"International Application Serial No. PCT/CA2013/000454, Written Opinion dated Aug. 20, 2013", 7 pgs.
"International Application Serial No. PCT/US2017/025460, International Preliminary Report on Patentability dated Oct. 11, 2018", 9 pgs.
"International Application Serial No. PCT/US2017/025460, International Search Report dated Jun. 20, 2017", 2 pgs.
"International Application Serial No. PCT/US2017/025460, Written Opinion dated Jun. 20, 2017", 7 pgs.
"International Application Serial No. PCT/US2017/040447, International Preliminary Report on Patentability dated Jan. 10, 2019", 8 pgs.
"International Application Serial No. PCT/US2017/040447, International Search Report dated Oct. 2, 2017", 4 pgs.
"International Application Serial No. PCT/US2017/040447, Written Opinion dated Oct. 2, 2017", 6 pgs.
"International Application Serial No. PCT/US2017/057918, International Search Report dated Jan. 19, 2018", 3 pgs.
"International Application Serial No. PCT/US2017/057918, Written Opinion dated Jan. 19, 2018", 7 pgs.
"International Application Serial No. PCT/US2017/063981, International Search Report dated Mar. 22, 2018", 3 pgs.
"International Application Serial No. PCT/US2017/063981, Written Opinion dated Mar. 22, 2018", 8 pgs.
"List of IBM Patents or Patent Applications Treated as Related, Filed Herewith.", 2 pgs.

Broderick, Ryan, "Every thing You Need to Know About Japan's Amazing Photo Booths", [Online] Retrieved from the Internet: <URL: https://www.buzzfeed.com/ryanhatesthis/look-how-kawaii-i-am?utm_term=.kra5QwGNZ#.muYoVB7qJ>, (Jan. 22, 2016), 30 pgs.
Chan, Connie, "The Elements of Stickers", [Online] Retrieved from the Internet: <URL: https://a16z.com/2016/06/17/stickers/>, (Jun. 20, 2016), 15 pgs.
Collet, Jean Luc, et al., "Interactive avatar in messaging environment", U.S. Appl. No. 12/471,811, filed May 26, 2009, (May 26, 2009), 31 pgs.
Gundersen, Eric, "Foursquare Switches to MapBox Streets, Joins the OpenStreetMap Movement", [Online] Retrieved from the Internet: <URL: https://blog.mapbox.com/foursquare-switches-to-mapbox-streets-joins-the-openstreetmap-movement-29e6a17f4464>, (Mar. 6, 2012), 4 pgs.
Perez, Sarah, "Life 360, The Family Locator With More Users Than Foursquare, Raises A $10 Million Series B", [Online] Retrieved from the Internet: <URL: https://techcrunch.com/2013/07/10/life360-the-family-locator-with-more-users-than-foursquare-raises-10-million-series-b/>, (Jul. 10, 2013), 2 pgs.
Rhee, Chi-Hyoung, et al., "Cartoon-like Avatar Generation Using Facial Component Matching", International Journal of Multimedia and Ubiquitous Engineering, (Jul. 30, 2013), 69-78.
"U.S. Appl. No. 15/965,466, Non Final Office Action dated Nov. 20, 2020", 17 pgs.
"U.S. Appl. No. 15/965,466, Response filed Mar. 22, 2021 to Non Final Office Action dated Nov. 20, 2020", 13 pgs.
"U.S. Appl. No. 15/965,744, Non Final Office Action dated Feb. 1, 2021", 29 pgs.
"U.S. Appl. No. 15/965,754, Corrected Notice of Allowability dated Jan. 6, 2021", 2 pgs.
"U.S. Appl. No. 15/965,754, Corrected Notice of Allowability dated Mar. 1, 2021", 2 pgs.
"U.S. Appl. No. 15/965,754, Notice of Allowance dated Nov. 16, 2020", 7 pgs.
"U.S. Appl. No. 15/965,754, Supplemental Notice of Allowability dated Dec. 16, 2020", 2 pgs.
"U.S. Appl. No. 15/965,756, Non Final Office Action dated Jan. 13, 2021", 16 pgs.
"U.S. Appl. No. 15/965,764, Non Final Office Action dated Feb. 22, 2021", 18 pgs.
"U.S. Appl. No. 15/965,811, Response filed Mar. 16, 2021 to Non Final Office Action dated Oct. 16, 2020", 10 pgs.
"U.S. Appl. No. 15/965,811, Response filed Dec. 28, 2020 to Non Final Office Action dated Jun. 26, 2020", 13 pgs.
"U.S. Appl. No. 16/232,824, Non Final Office Action dated Feb. 19, 2021", 28 pgs.
"U.S. Appl. No. 16/245,660, Notice of Allowability dated Nov. 18, 2020", 2 pgs.
"U.S. Appl. No. 16/245,660, Notice of Allowance dated Nov. 3, 2020", 8 pgs.
"U.S. Appl. No. 16/365,300, Response filed Jan. 28, 2021 to Non Final Office Action dated Sep. 28, 2020", 17 pgs.
"European Application Serial No. 18789872.1, Response filed Feb. 18, 2021 to Communication Pursuant to Article 94(3) EPC dated Aug. 11, 2020", 15 pgs.
"European Application Serial No. 18790189.7, Response filed Feb. 9, 2021 to Communication Pursuant to Article 94(3) EPC dated Jul. 30, 2020", 11 pgs.
"European Application Serial No. 18791363,7,Response Filed Feb. 22, 2021 to Communication Pursuant to Article 94(3) EPC dated Aug. 11, 2020", 35 pgs.
"European Application Serial No. 19206595.1, Response filed Dec. 16, 2020 to Extended European Search Report dated Mar. 31, 2020", w/ English Claims, 43 pgs.
U.S. Appl. No. 17/131,598, filed Dec. 22, 2020, Map-Based Graphical User Interface for Ephemeral Social Media Content.
U.S. Appl. No. 17/241,201, filed Feb. 23, 2021, Location-Based Search Mechanism in a Graphical User Interface.
U.S. Appl. No. 15/859,101, filed Dec. 29, 2017, Selective Location-Based Identity Communication.

(56) References Cited

OTHER PUBLICATIONS

U.S. Appl. No. 17/248,841, filed Feb. 10, 2021, Selective Location-Based Identity Communication.
"U.S. Appl. No. 15/965,811, Final Office Action dated Apr. 14, 2021", 19 pgs.
"U.S. Appl. No. 16/365,300, Final Office Action dated Apr. 15, 2021", 31 pgs.
"U.S. Appl. No. 17/248,841, Preliminary Amendment filed Apr. 22, 2021", 7 pgs.
"European Application Serial No. 18791925.3, Communication Pursuant to Article 94(3) EPC dated May 11, 2021", 7 pgs.
"U.S. Appl. No. 15/965,756, Response filed May 13, 2021 to Non Final Office Action dated Jan. 13, 2021", 12 pgs.
"U.S. Appl. No. 15/965,466, Final Office Action dated May 18, 2021", 18 pgs.
"U.S. Appl. No. 15/965,764, Response filed May 24, 2021 to Non Final Office Action dated Feb. 22, 2021", 13 pgs.
"Korean Application Serial No. 10-2019-7034512, Notice of Preliminary Rejection dated May 17, 2021", With English translation, 15 pgs.
"U.S. Appl. No. 15/965,744, Response filed Jun. 1, 2021 to Non Final Office Action dated Feb. 1, 2021", 11 pgs.
"Korean Application Serial No. 10-2019-7034751, Notice of Preliminary Rejection dated May 21, 2021", With English translation, 18 pgs.
"Korean Application Serial No. 10-2019-7034596, Notice of Preliminary Rejection dated May 18, 2021", With English translation, 20 pgs.
"Korean Application Serial No. 10-2019-7034715, Notice of Preliminary Rejection dated May 21, 2021", With English translation, 15 pgs.
"Korean Application Serial No. 10-2019-7035443, Notice of Preliminary Rejection dated May 26, 2021", With English translation, 14 pgs.
"U.S. Appl. No. 17/131,598, Preliminary Amendment filed Jun. 8, 2021", 10 pages.
"Korean Application Serial No. 10-2019-7034899, Notice of Preliminary Rejection dated May 27, 2021", With English translation, 17 pgs.
"U.S. Appl. No. 15/965,764, Final Office Action dated Jun. 15, 2021", 19 pgs.
"European Application Serial No. 18789872.1, Summons to Attend Oral Proceedings dated Jun. 23, 2021", 9 pgs.
"Korean Application Serial No. 10-2019-7034598, Notice of Preliminary Rejection dated Jun. 3, 2021", With English translation, 10 pgs.
"U.S. Appl. No. 15/965,775, Final Office Action dated Jul. 6, 2021", 12 pgs.
"U.S. Appl. No. 15/628,408, Notice of Allowance dated Jul. 8, 2021", 11 pgs.
"European Application Serial No. 18790189.7, Summons to attend oral proceedings dated Jul. 8, 2021", 13 pgs.
"U.S. Appl. No. 16/365,300, Response filed Jul. 15, 2021 to Final Office Action dated Apr. 15, 2021", 11 pgs.
"U.S. Appl. No. 15/628,408, Corrected Notice of Allowability dated Jul. 21, 2021", 7 pgs.
"European Application Serial No. 19206610.8, Communication Pursuant to Article 94(3) EPC dated Jul. 21, 2021", 8 pgs.
"European Application Serial No. 18790319.0, Communication Pursuant to Article 94(3) EPC dated Jul. 21, 2021", 7 pgs.
"European Application Serial No. 19206595.1, Communication Pursuant to Article 94(3) EPC dated Jul. 22, 2021", 7 pgs.
"U.S. Appl. No. 15/965,744, Final Office Action dated Jul. 28, 2021", 29 pgs.
"U.S. Appl. No. 16/365,300, Non Final Office Action dated Aug. 3, 2021", 29 pgs.
"U.S. Appl. No. 15/965,756, Final Office Action dated Aug. 19, 2021", 17 pgs.
"U.S. Appl. No. 16/232,824, Response filed Aug. 19, 2021 to Non Final Office Action dated Feb. 19, 2021", 12 pgs.
"Korean Application Serial No. 10-2019-7034899, Response filed Aug. 11, 2021 to Notice of Preliminary Rejection dated May 27, 2021", With English claims, 26 pgs.
"European Application Serial No. 18789872.1, Summons to Attend Oral Proceedings dated Sep. 13, 2021", 9 pgs.
"U.S. Appl. No. 15/965,811, Response filed Sep. 14, 2021 to Final Office Action dated Apr. 14, 2021", 14 pgs.
"Chinese Application Serial No. 202010079763.5, Office Action dated Aug. 27, 2021", With English translation, 15 pgs.
"U.S. Appl. No. 15/965,811, Non Final Office Action dated Oct. 4, 2021", 20 pgs.
"U.S. Appl. No. 17/249,201, Preliminary Amendment filed Oct. 6, 2021", 9 pgs.
"U.S. Appl. No. 15/965,775, Response filed Oct. 6, 2021 to Final Office Action dated Jul. 6, 2021", 11 pgs.
"U.S. Appl. No. 15/965,466, Response filed Oct. 18, 2021 to Final Office Action dated May 18, 2021", 12 pgs.
"U.S. Appl. No. 15/628,408, Supplemental Notice of Allowability dated Oct. 21, 2021", 2 pgs.
"U.S. Appl. No. 16 232,824, Final Office Action dated Nov. 2, 2021", 25 pgs.
Wilmott, Clancy, "Playful Mapping in the Digital Age", Playful Mapping Collective, Institute of Network Cultures, Amsterdam, (2016), 158 pgs.
"U.S. Appl. No. 15/965,764, Response filed Nov. 15, 2021 to Final Office Action dated Jun. 15, 2021", 12 pgs.
"Korean Application Serial No. 10-2019-7034598, Response filed Sep. 3, 2021 to Notice of Preliminary Rejection dated Jun. 3, 2021", w English Claims, 27 pgs.
"Korean Application Serial No. 10-2019-7034512, Notice of Preliminary Rejection dated Nov. 2, 2021", With English translation, 8 pgs.
"U.S. Appl. No. 16/365,300, Examiner Interview Summary dated Nov. 29, 2021", 2 pgs.
"U.S. Appl. No. 15/965,744, Response filed Nov. 29, 2021 to Final Office Action dated Jul. 28, 2021", 13 pgs.
"U.S. Appl. No. 16/365,300, Response filed Dec. 2, 2021 to Non Final Office Action dated Aug. 3, 2021", 10 pgs.
"U.S. Appl. No. 15/965,466, Non Final Office Action dated Dec. 15, 2021", 15 pgs.
"Korean Application Serial No. 10-2019-7034899, Final Office Action dated Dec. 3, 2021", With English translation, 10 pgs.
"U.S. Appl. No. 15/965,756, Response filed Dec. 20, 2021 to Final Office Action dated Aug. 19, 2021", 13 pgs.
"U.S. Appl. No. 15/628,408, Non Final Office Action dated Feb. 4, 2022", 30 pgs.
"U.S. Appl. No. 15 965,811, Response filed Feb. 4, 2022 to Non Final Office Action dated Oct. 4, 2021", 14 pgs.
"U.S. Appl. No. 15/965,775, Notice of Allowance dated Feb. 22, 2022", 19 pgs.
"U.S. Appl. No. 15/965,744, Non Final Office Action dated Mar. 4, 2022", 31 pgs.
"U.S. Appl. No. 15 965,811, Notice of Allowance dated Mar. 9, 2022", 9 pgs.
"U.S. Appl. No. 15/965,764, Notice of Allowance dated Mar. 9, 2022", 8 pgs.
"U.S. Appl. No. 16 365,300, Final Office Action dated Mar. 25, 2022", 29 pgs.
"U.S. Appl. No. 15 965,811, Notice of Allowability dated Mar. 25, 2022", 10 pgs.
"Korean Application Serial No. 10-2019-7034598, Notice of Preliminary Rejection dated Jan. 10, 2022", w English translation, 13 pgs.
"Korean Application Serial No. 10-2019-7034512, Response Filed Jan. 3, 2022 to Notice of Preliminary Rejection dated Nov. 2, 2021", w English Claims, 18 pgs.
"Chinese Application Serial No. 202010079763.5, Response Filed Jan. 11, 2022 to Office Action dated Aug. 27, 2021", w English Claims, 13 pgs.
"European Application Serial No. 19206610.8, Response filed Jan. 26, 2022 to Communication Pursuant to Article 94(3) EPC dated Jul. 21, 2021", w English Claims, 23 pgs.

(56) References Cited

OTHER PUBLICATIONS

"European Application Serial No. 18790319.0, Response Filed Jan. 28, 2022 to Communication Pursuant to Article 94(3) EPC dated Jul. 21, 2021", w English Claims, 16 pgs.

"European Application Serial No. 19206595.1, Response filed Jan. 28, 2022 to Communication Pursuant to Article 94(3) EPC dated Jul. 22, 2021", w English Claims, 18 pgs.

"Korean Application Serial No. 10-2019-7034899, Response filed Jan. 5, 2022 to Office Action dated Dec. 3, 2021", w English Translation of Claims, 12 pgs.

"Korean Application Serial No. 10-2019-7034899, Office Action dated Jan. 24, 2022", w English Translation, 12 pgs.

"Korean Application Serial No. 10-2019-7034596, Notice of Preliminary Rejection dated Mar. 7, 2022", w English translation, 21 pgs.

"Korean Application Serial No. 10-2019-7034751, Final Office Action dated Mar. 7, 2022", w English translation, 11 pgs.

"Korean Application Serial No. 10-2019-7034715, Final Office Action dated Mar. 7, 2022", w English translation, 9 pgs.

"Korean Application Serial No. 10-2019-7034598, Response filed Mar. 10, 2022 to Notice of Preliminary Rejection dated Jan. 10, 2022", English Claims, 24 pgs.

"European Application Serial No. 18791363.7, Summons to attend oral proceedings dated Apr. 4, 2022", 11 pgs.

"Korean Application Serial No. 10-2019-7035443, Notice of Preliminary Rejection dated Apr. 11, 2022", w English translation, 8 pgs.

"U.S. Appl. No. 15/965,764, Corrected Notice of Allowability dated Mar. 30, 2022", 1 pg.

"U.S. Appl. No. 15/965,756, Non Final Office Action dated Mar. 31, 2022", 17 pgs.

"U.S. Appl. No. 15/965,175, Corrected Notice of Allowability dated Apr. 7, 2022", 3 pgs.

"U.S. Appl. No. 17/248,841, Notice of Allowance dated Apr. 7, 2022", 9 pgs.

"U.S. Appl. No. 15/965,764, Corrected Notice of Allowability dated Apr. 20, 2022", 2 pgs.

Birchall, Andrew Alexander, "The delivery of notifications that user perceives.", IP.com English Translation of CN 107210948 A filed Dec. 16, 2014, (2014), 28 pgs.

\* cited by examiner

MAP-BASED GRAPHICAL USER INTERFACE FOR MULTI-TYPE SOCIAL MEDIA GALLERIES

PRIORITY APPLICATIONS

This application is a non-provisional application which claims the benefit of priority to U.S. Provisional Application Ser. No. 62/556,134, filed Sep. 8, 2017; U.S. Provisional Application Ser. No. 62/552,958, filed Aug. 31, 2017; and U.S. Provisional Application Ser. No. 62/491,115, filed Apr. 27, 2017, the contents of which are incorporated herein by reference in their entireties.

BACKGROUND

Social media applications implement computer-mediated technologies allowing for the creating and sharing of content that communicates information, ideas, career interests and other forms of expression via virtual communities and networks. Social media platforms use web-based technologies, desktop computers and mobile technologies (e.g., smartphones and tablet computers) to create highly interactive platforms through which individuals, communities, and organizations can share, co-create, discuss, and modify user-generated content or pre-made content posted online.

Mobile electronic devices on which end-user social media applications can be executed typically provide geolocation services that determine the geographic location of the mobile electronic device, by extension indicating the geographic location of the associated user. Social media content posted by users is often geo-tagged based on the geolocation of a mobile electronic device (such as a mobile phone) by use of which the social media content is captured and/or posted to the social media platform. In other embodiments, social media content may explicitly be geo-tagged by a user using a computer device that does not have activated geolocation services and/or that is not a mobile device (such as a desktop personal computer (PC)).

This disclosure presents various features and functionalities for social media applications using user geolocation data and/or geo-tagged social media content.

BRIEF DESCRIPTION OF THE DRAWINGS

Some aspects of the disclosure are illustrated in the appended drawings. Note that the appended drawings illustrate example embodiments of the present disclosure and cannot be considered as limiting the scope of the disclosure.

Figure 1:
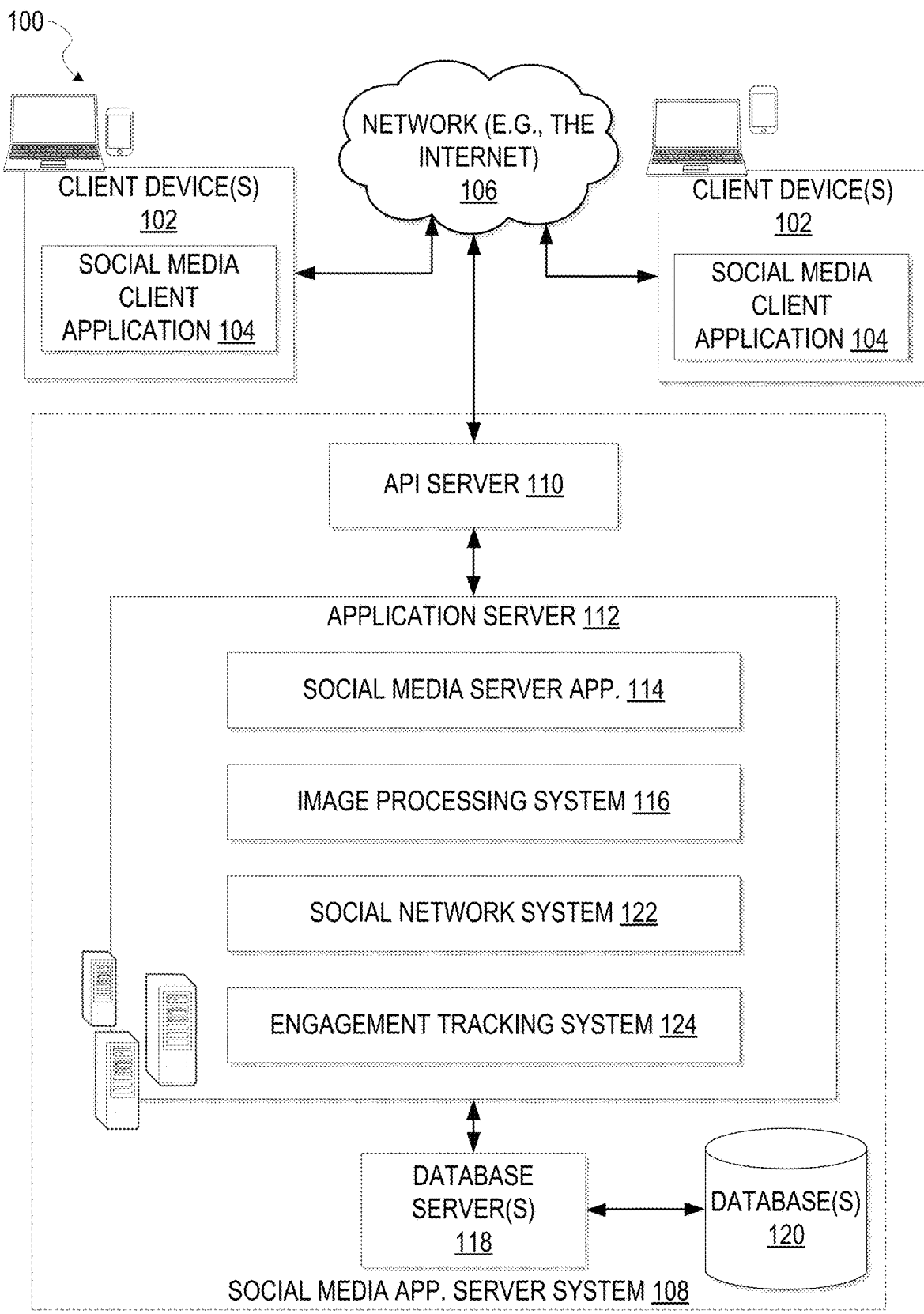
FIG. 1 is a block diagram showing an example social media platform system for exchanging, posting, and/or consuming social media data (e.g., messages and associated content) over a network.

The headings provided herein are merely for convenience and do not necessarily affect the scope or meaning of the terms used.

INTRODUCTION

This disclosure provides a map-based graphical user interface (map GUI) for a social media platform or application, in which different types of social media galleries of ephemeral content are represented at respective geographic locations on a map by visually distinct user-selectable user interface elements (further referred to as gallery icons or story icons). Such an interface is also referred to herein as a map GUI.

Note that a gallery of social media items as used herein means a collection of social media items that is represented as a unitary element, or is otherwise available for user- or operator-interaction as a unitary element.

In some embodiments, different types of gallery icons are distinguished by having user-selectable interface elements (e.g., a thumbnail) that are differently shaped. In one embodiment, for example, place icons that represent geo-anchored galleries for an operator-defined geographic area comprise rectangular thumbnails, while spike icons for ad hoc or spike galleries that represent relatively high-volume areas or relatively anomalous clusters of social media items comprise circular thumbnails.

In another example embodiment, different types of gallery icons are distinguished by text labels displayed in association with at least some of the types of gallery icons. For example, some types of gallery icons may in some embodiments be displayed with associated text labels, while other types of gallery icons are unlabeled. In a particular example embodiment, icons for spike or ad hoc galleries are unlabeled, while icons for one or more other types of galleries (e.g., place galleries and/or event galleries) include a text label.

Differently defined, a method according to this aspect of the disclosure provides for rendering a plurality of gallery icons in a map GUI such that one or more visual attributes of at least some of the gallery icons are different depending on the gallery type of the corresponding social media gallery. In some embodiments, the different types of social media galleries include geo-anchored galleries associated with a particular fixed geographical feature or area (e.g., place galleries/stories), and spike galleries compiled ad hoc by a gallery management system based on one or more attributes of underlying social media activity (e.g., based on a quantified level of anomaly or unusualness of a corresponding geo-temporal cluster of social media items). "Anomality" in this description means a measure that indicates how anomalous something is. Instead, or in addition, the different types of galleries may include curated galleries (whose social media items are curated by one or more human operators), and uncurated galleries (in which social media items are compiled in a wholly automated procedure).

As will be described in greater detail below, ephemeral social media content comprises social media items that are available for viewing via the social media application for only a limited period. For example, an ephemeral message (also referred to herein as a snap) submitted by a user to the social media application may be available for viewing by other users via the map GUI of the social media application for only a predefined period subsequent to submission. In one example embodiment, each ephemeral message or snap has an availability lifetime (also referred to herein as a gallery participation timer) of 24 hours after submission, after which the ephemeral message "disappears" and is no longer available for viewing by other users via the map GUI. Such ephemeral messages typically comprise photographic or video content, which may be submitted with or without augmentations made by the user to the underlying photo or video content.

Ephemeral messages submitted by multiple different users may be available on a map forming part of the map GUI based at least in part on respective geo-tag information of the ephemeral messages. In some embodiments, the map GUI may provide location-based access to one or more collections or galleries of ephemeral messages (also known as and referred to herein as a "stories"). In some example embodiments, a plurality of ephemeral messages submitted by different users are included in a common geo-anchored gallery or story based at least in part on respective geo-tagging information of the plurality of ephemeral messages. Such a location-based gallery or story is in some embodiments represented on the map GUI by a respective gallery icon displayed at a corresponding map location, the gallery icon being selectable by the user to trigger automated sequential display of the plurality of ephemeral messages in the gallery on the user device on which the map GUI is rendered.

In some embodiments, such a map GUI includes representations of at least approximate respective positions of a user's friends in a social network graph accessed by the social media application, with the social media application enabling the user to explore the world around friends' locations by use of the GUI. Thus, the map GUI can in some embodiments enable the user to explore uploaded social media content (e.g., individual photos or video clips/snaps, or social media galleries such as stories comprising respective collections of photos, messages, or snaps).

Figure 10:
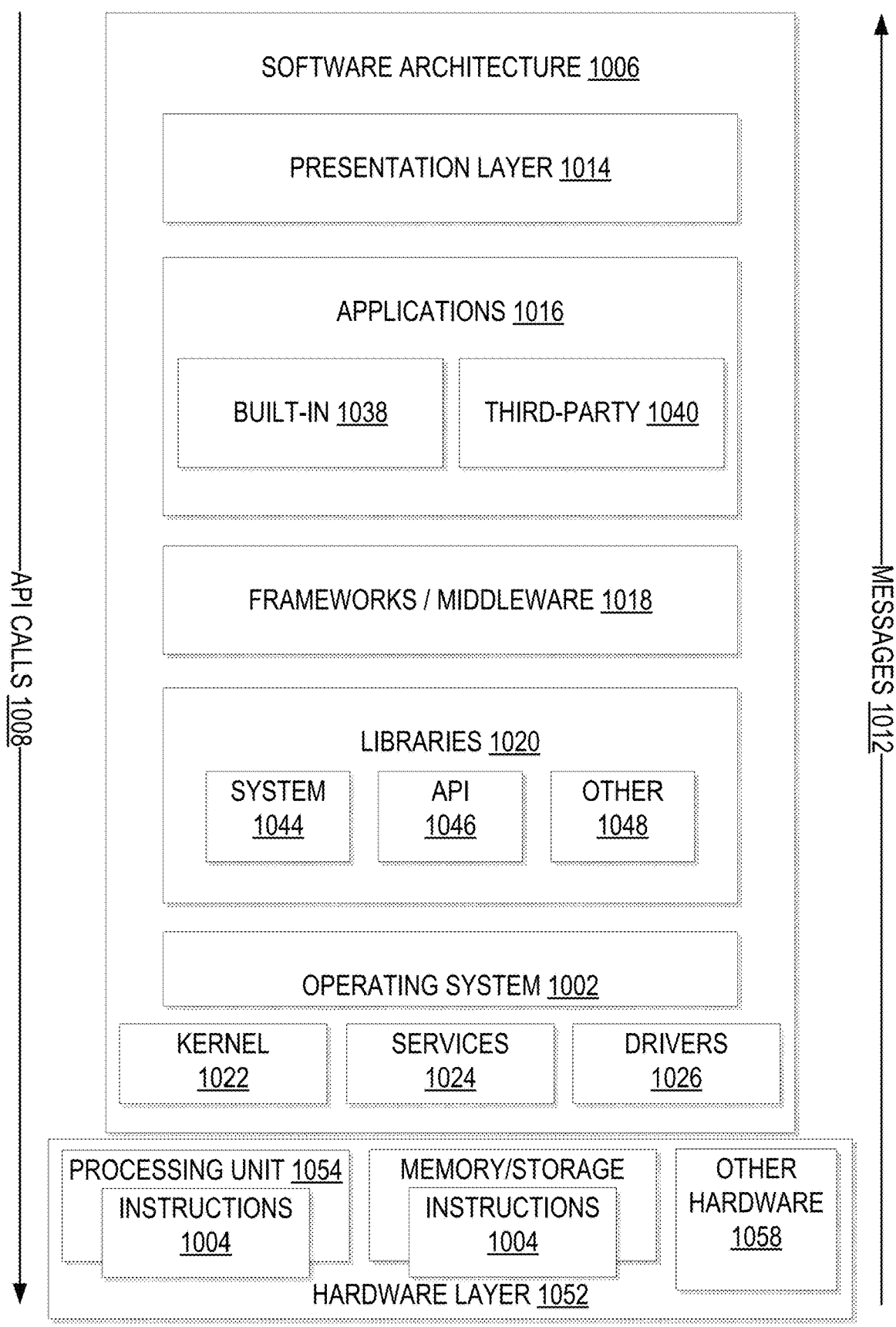
FIG. 10 is a block diagram illustrating a representative software architecture, which may be used in conjunction with various hardware architectures herein described.
Figure 11:
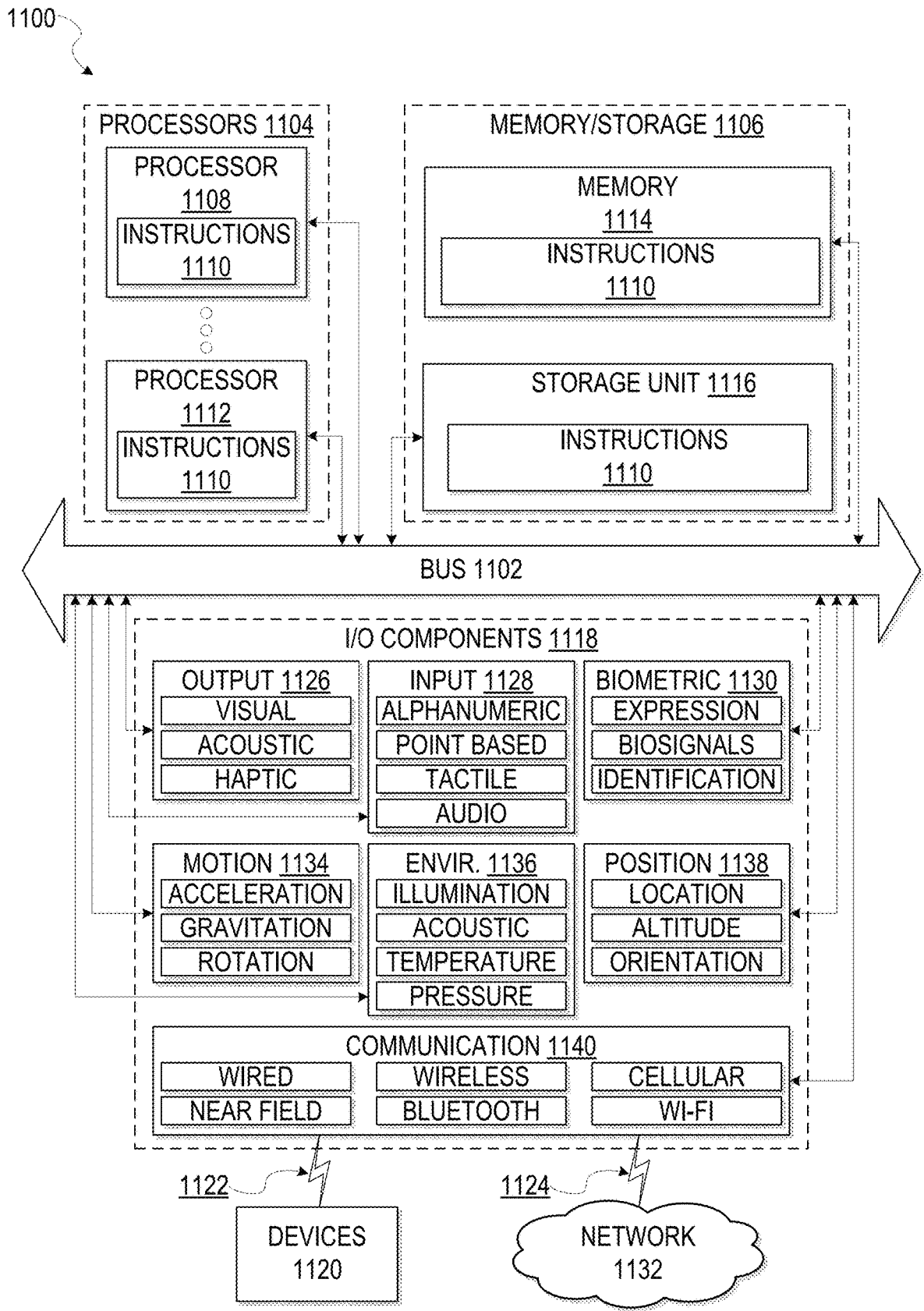
FIG. 11 is a block diagram illustrating components of a machine, according to some example embodiments, able to read instructions from a machine-readable medium (e.g., a machine-readable storage medium) and perform any one or more of the methodologies discussed herein.

Various aspects of the disclosure will be described below with reference to specific example embodiments. First, platform architecture and a technical background to implementation of the various embodiments will be described with reference to FIGS. 1-5. Thereafter, specific example embodiments are described with reference to FIGS. 6-9. FIGS. 10-11 finally describe aspects of software and hardware components that are in some instances used in the implementation of the described example embodiments.

DETAILED DESCRIPTION

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2017 SNAP, INC., All Rights Reserved.

The description that follows includes systems, methods, devices, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

System Architecture and Operating Environment

FIG. 1 is a block diagram showing an example social media platform system 100 for exchanging data (e.g., social media items or messages and associated content) over a network. In this description, items communicated from one user to one or more other users via a social media application or platform, as well as items uploaded or provided by users to a social media application or platform for availability to or consumption by other users via the social media application or platform, are referred to as messages. Thus, the term "messages" as used herein is not limited to communications from one user to specified recipient users, but includes messages made available for public consumption via the relevant social media platform.

The social media platform system 100 includes multiple client devices 102, each of which hosts a number of applications including a social media client application 104. Each social media client application 104 is communicatively coupled to other instances of the social media client application 104 and a social media application server system 108 via a network 106 (e.g., the Internet).

Accordingly, each social media client application 104 is able to communicate and exchange data with another social media client application 104 and with the social media application server system 108 via the network 106. The data exchanged between social media client applications 104, and between a social media client application 104 and the social media application server system 108, includes functions (e.g., commands to invoke functions) as well as payload data (e.g., text, audio, video or other multimedia data).

The social media application server system 108 provides server-side functionality via the network 106 to a particular social media client application 104. While certain functions of the social media platform system 100 are described herein as being performed by either a social media client application 104 or by the social media application server system 108, it will be appreciated that the location of certain functionality either within the social media client application 104 or the social media application server system 108 is a design choice. For example, it may be technically preferable to initially deploy certain technology and functionality within the social media application server system 108, but to later migrate this technology and functionality to the social media client application 104 where a client device 102 has sufficient processing capacity.

The social media application server system 108 supports various services and operations that are provided to the social media client application 104. Such operations include transmitting data to, receiving data from, and processing data generated by the social media client application 104. This data may include message content, client device information, geolocation information, media annotation and overlays, message content persistence conditions, social network information, and live event information, as examples. Data exchanges within the social media platform system 100 are invoked and controlled through functions available via user interfaces (UIs) of the social media client application 104.

Turning now specifically to the social media application server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the social media client application 104 in order to invoke functionality of the application server 112. The API server 110 exposes various functions supported by the application server 112, including account registration, login functionality, the sending of messages, via the application server 112, from a particular social media client application 104 to another social media client application 104, the sending of media files (e.g., images or video) from a social media client application 104 to the social media server application 114, and for possible access by another social media client application 104, the setting of a collection of media data (e.g., a story or gallery), the retrieval of a list of friends of a user of a client device 102, the retrieval of such collections, the retrieval of messages and content, the adding and deletion of friends to a social graph, the location of friends within a social graph, opening an application event (e.g., relating to the social media client application 104).

The application server 112 hosts a number of applications and subsystems, including a social media server application 114, an image processing system 116, and a social network system 122. The social media server application 114 implements a number of message processing technologies and functions, particularly related to the aggregation and other processing of content (e.g., textual and multimedia content) included in messages received from multiple instances of the social media client application 104. As will be described in further detail, the text and media content from multiple sources may be aggregated into collections of content (e.g., called stories or galleries). These collections are then made available, by the social media server application 114, to the social media client application 104. Other processor- and memory-intensive processing of data may also be performed server-side by the social media server application 114, in view of the hardware requirements for such processing.

The application server 112 also includes an image processing system 116 that is dedicated to performing various image processing operations, typically with respect to images or video received within the payload of a message at the social media server application 114.

The social network system 122 supports various social networking functions and services, and makes these functions and services available to the social media server application 114. To this end, the social network system 122 maintains and accesses an entity graph 304 (FIG. 3) within the database 120. Examples of functions and services supported by the social network system 122 include the identification of other users of the social media platform system 100 with whom a particular user has relationships or is "following," and also the identification of other attributes and interests of a particular user. In some embodiments, the social network system 122 includes an identification of other users whose location is available for viewing by a particular user via a map-based GUI displayable on a client device 102 using the corresponding social media client application 104.

The application server 112 is communicatively coupled to a database server 118, which facilitates access to a database 120 in which is stored data associated with messages processed by the social media server application 114.

Figure 2:
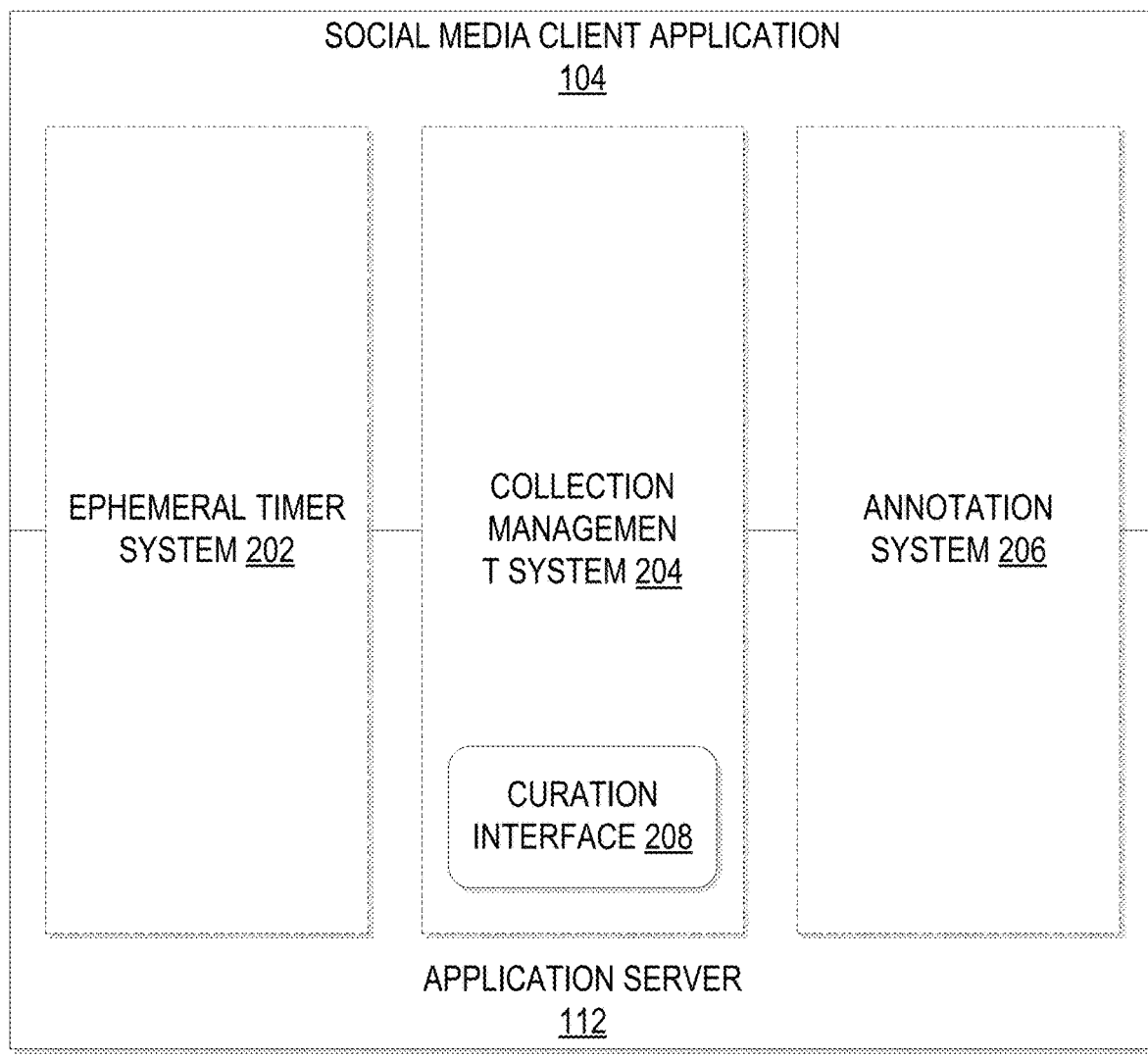
FIG. 2 is block diagram illustrating further details regarding a social media platform system, according to example embodiments.

FIG. 2 is block diagram illustrating further details regarding the social media platform system 100, according to example embodiments. Specifically, the social media platform system 100 is shown to comprise the social media client application 104 and the application server 112, which in turn embody a number of some subsystems, namely an ephemeral timer system 202, a collection management system 204 (also referred to as a gallery management system), and an annotation system 206.

The ephemeral timer system 202 is responsible for enforcing the temporary access to content permitted by the social media client application 104 and the social media server application 114. To this end, the ephemeral timer system 202 incorporates a number of timers that, based on duration and display parameters associated with a message, or collection/gallery of messages (e.g., a SNAPCHAT story), selectively display and enable access to messages and associated content via the social media client application 104. Further details regarding the operation of the ephemeral timer system 202 are provided below.

The collection management system 204 is responsible for managing collections of media (e.g., collections of text, image video, and audio data). In some examples, a collection of content (e.g., messages, including images, video, text, and audio) may be organized into an "event gallery" or an "event story." Such a collection may be made available for a specified time period, such as the duration of an event to which the content relates, or at expiry of a last message or snap in the gallery. For example, content relating to a music concert may be made available as a "story" for the duration of that music concert. The collection management system 204 may also be responsible for publishing an icon that provides notification of the existence of a particular collection to the user interface of the social media client application 104. As will be described in greater detail with reference to the specific example embodiments that follow, the collection management system 204 may also be responsible for compiling and managing multiple location-based social media galleries based at least in part on geotag data of social media items or messages uploaded to the social media platform by multiple users. Other types of collections or galleries that may be provided by the collection management system 204 include: a "place story" that collects ephemeral messages having geo-tag data indicating a location within a predefined associated geographical area; and an ad-hoc story or spike story that is dynamically surfaced on a map GUI as described herein based on underlying location-based social media activity, e.g., based on geo-temporal volume or anomality/unusualness of social media items submitted by users for public consumption (e.g., for inclusion in a "live story" or "our story").

The collection management system 204 furthermore includes a curation interface 208 that allows a human operator (e.g., a collection manager) to manage and curate a particular collection of content. For example, the curation interface 208 enables an event organizer to curate a collection of content relating to a specific event (e.g., delete inappropriate content or redundant messages). Instead, or in addition, the collection management system 204 employs machine vision (or image recognition technology), geo-tag data, and/or content rules to automatically compile and/or curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise augment, modify, or edit media content associated with a message. For example, the annotation system 206 provides functions related to the generation and publishing of media overlays for messages processed by the social media platform system 100. The annotation system 206 operatively supplies a media overlay (e.g., a SNAPCHAT filter) to the social media client application 104 based on a geolocation of the client device 102. In another example, the annotation system 206 operatively supplies a media overlay to the social media client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay can include text that can be overlaid on top of a photograph generated or taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
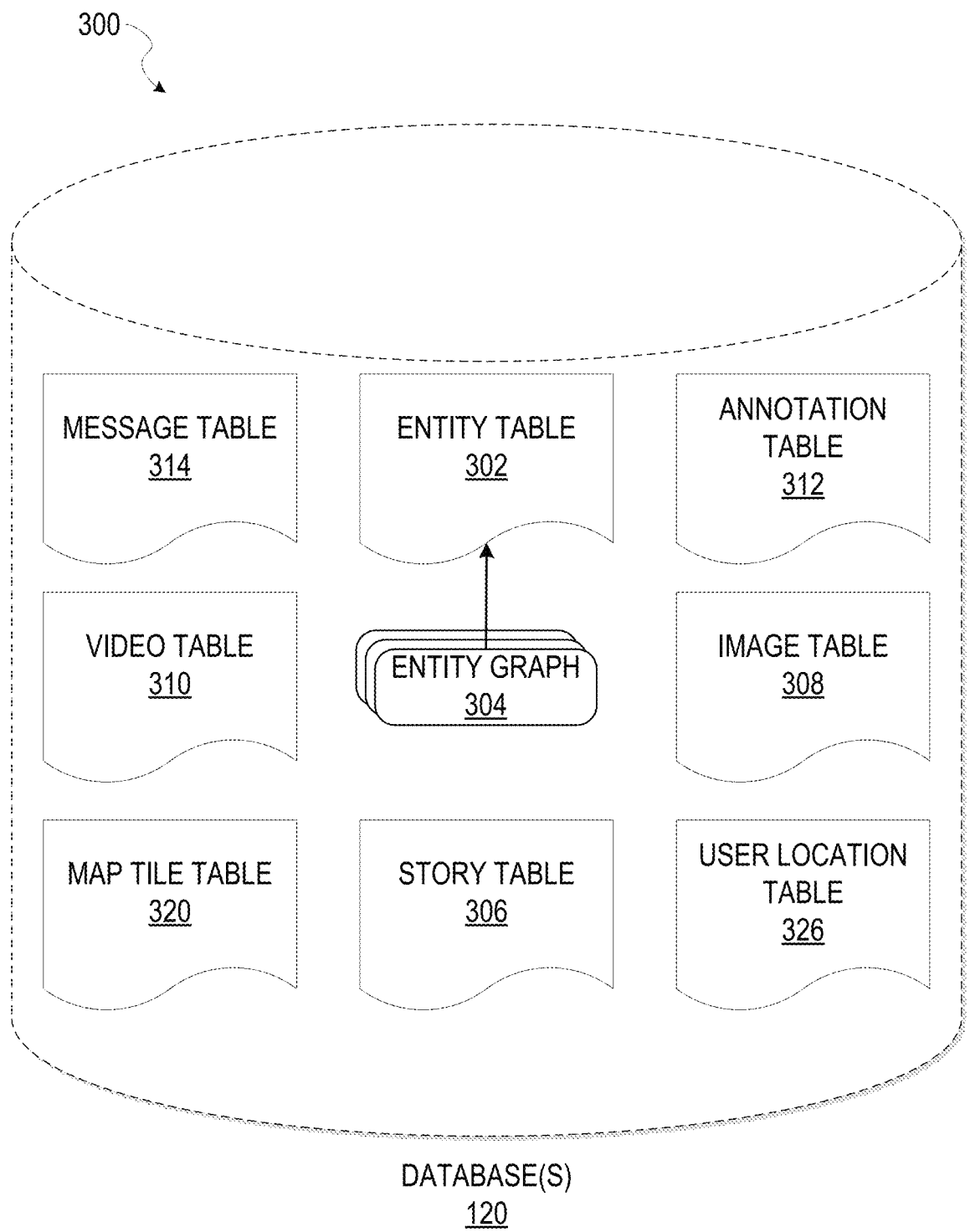
FIG. 3 is a schematic diagram illustrating data which may be stored in a database of a social media platform system, according to certain example embodiments.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a schematic diagram illustrating data 300 which may be stored in the database 120 of the social media application server system 108, according to certain example embodiments. While the content of the database 120 is shown to comprise a number of tables, it will be appreciated that the data 300 could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, etc. Regardless of type, any entity regarding which the social media application server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization), interest-based, or activity-based, merely for example.

The database 120 also stores annotation data, including in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including a user-selected filter from a gallery of filters presented to a sending user by the social media client application 104 when the sending user is composing a message. Other types of filters include geolocation filters (also known as geo-filters) which may be presented to a sending user based on geographic location. For example, geolocation filters specific to a neighborhood or special location may be presented within a user interface by the social media client application 104, based on geolocation information determined by a GPS unit of the client device 102. Another type of filter is a data filter, which may be selectively presented to a sending user by the social media client application 104, based on other inputs or information gathered by the client device 102 during the message creation process. Examples of data filters include a current temperature at a specific location, a current speed at which a sending user is traveling, battery life for a client device 102, or the current time.

Other annotation data that may be stored within the image table 308 is so-called "lens" data. A "lens" may be a real-time special effect and sound that may be added to an image or a video.

Yet further annotation data that may be stored within the annotation table 312 is user generated annotations or augmentations provided by the user to overlay an underlying photographic image or video. Such augmentation/annotations can include, for example, text annotations and drawing annotations or augmentations provided by the user, e.g., via a client device touchscreen.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a SNAPCHAT story or a gallery). The creation of a particular collection may be initiated by a particular user (e.g., each user for which a record is maintained in the entity table 302) A user may create a "personal story" in the form of a collection of content that has been created and sent/broadcast by that user. To this end, the user interface of the social media client application 104 may include an icon that is user-selectable to enable a sending user to add specific content to his or her personal story. In the context of this description, such messages and stories/galleries are understood to be for private consumption, being limited for viewing via the social media client application 104 to particular users identified by the submitting user or to users who are members of a social network of the submitting user. This is to be contrasted with social media items provided for public or non-private consumption via the social media client application 104, not being limited to a user-specific or user-specified subset of all users of the social media client application 104. An example of a publicly viewable collection or gallery is a "live story" or "Our Story,"

As mentioned, a collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the social media client application 104, to contribute content to a particular live story. The live story may be identified to the user by the social media client application 104, based on his or her location. The end result is a "live story" told from a community perspective. In accordance with some example embodiments of this disclosure, a submitting user can submit social media items or messages to a non-specific common live story. Such content is accessible to other users via a map-based graphical user interface, with such social media items or messages being accessible via the map GUI based on a respective location indicated by corresponding geotag data, either by forming part of a location-based gallery or story, or by using location-based search mechanisms forming part of the map GUI.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus). In some embodiments of the this disclosure, messages uploaded to a live story or our story generally, without the user specifying a particular location story in which the message is to be included, can automatically or semi-automatically be included in a location story based at least in part on geotag data of the message.

A map tile table 320 stores multiple map tiles that can be used for presenting a map in a map viewport of a map-based GUI according to some embodiments of this disclosure. In a particular example embodiment, each map view is composed of 9 or 16 map tiles stitched together. A plurality of sets of map tiles may be maintained for different map zoom levels. In some example embodiments, a superset of map tiles is maintained server-side, being forwarded to a requesting client device 102 for composing a map representation of specific requested areas.

User location table 326 stores current or most recent user location data for multiple users of the social media client application 104. The user location data may be based on location data received from respective client devices 102 associated with the respective users. Such user location data is in some example embodiments used to display in a map-based GUI to display respective locations of a plurality of users who form part of the social network of the requesting user and/or who have provided permission for the requesting user to view their location. Each such user may be represented on a map forming part of the map GUI by a respective user icon or bitmoji.

Figure 4:
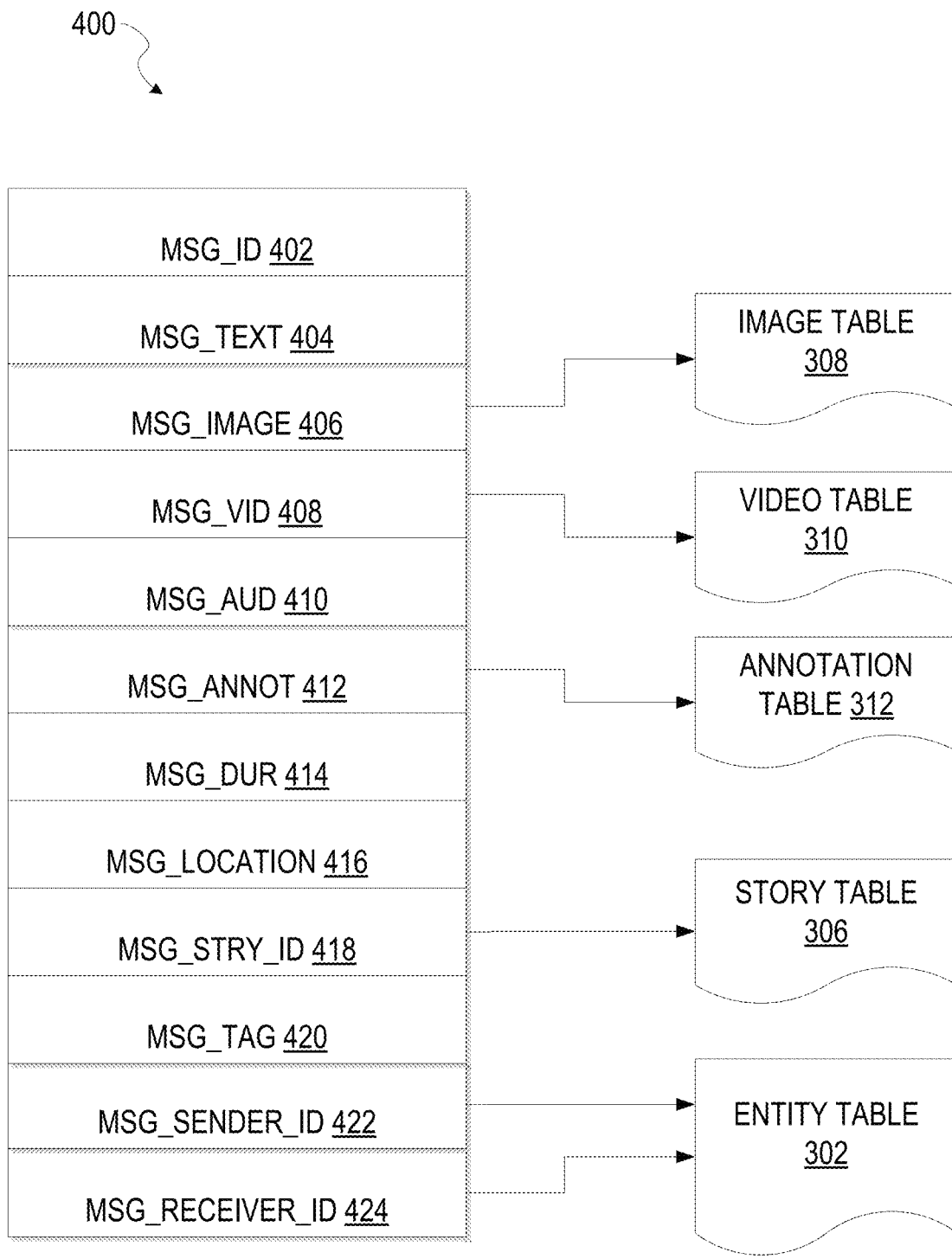
FIG. 4 is a schematic diagram illustrating a structure of a message, according to some embodiments, generated by a social media client application according to an example embodiment.

FIG. 4 is a schematic diagram illustrating a structure of a social media item or message 400, according to some in some embodiments, generated by one instance of the social media client application 104 for communication to a further instance of the social media client application 104 or to the social media server application 114. The content of a particular message 400 is used to populate the message table 314 stored within the database 120, accessible by the social media server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data, captured by a camera component of a client device 102 or retrieved from memory of a client device 102, and that is included in the message 400.

A message video payload 408: video data, captured by a camera component or retrieved from a memory component of the client device 102 and that is included in the message 400.

A message audio payload 410: audio data, captured by a microphone or retrieved from the memory component of the client device 102, and that is included in the new message 400.

A message annotations 412: annotation data (e.g., filters, stickers or other enhancements) that represents annotations to be applied to message image payload 406, message video payload 408, or message audio payload 410 of the message 400.

A display duration parameter 414: parameter value indicating, in seconds, the amount of time for which content of the message (e.g., the message image payload 406, message video payload 408, message audio payload 410) is to be presented or made accessible to a user via the social media client application 104. The display duration parameter 414 is also referred to herein as a display duration timer.

A message geolocation parameter 416: geolocation data or geotag data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent.

A message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
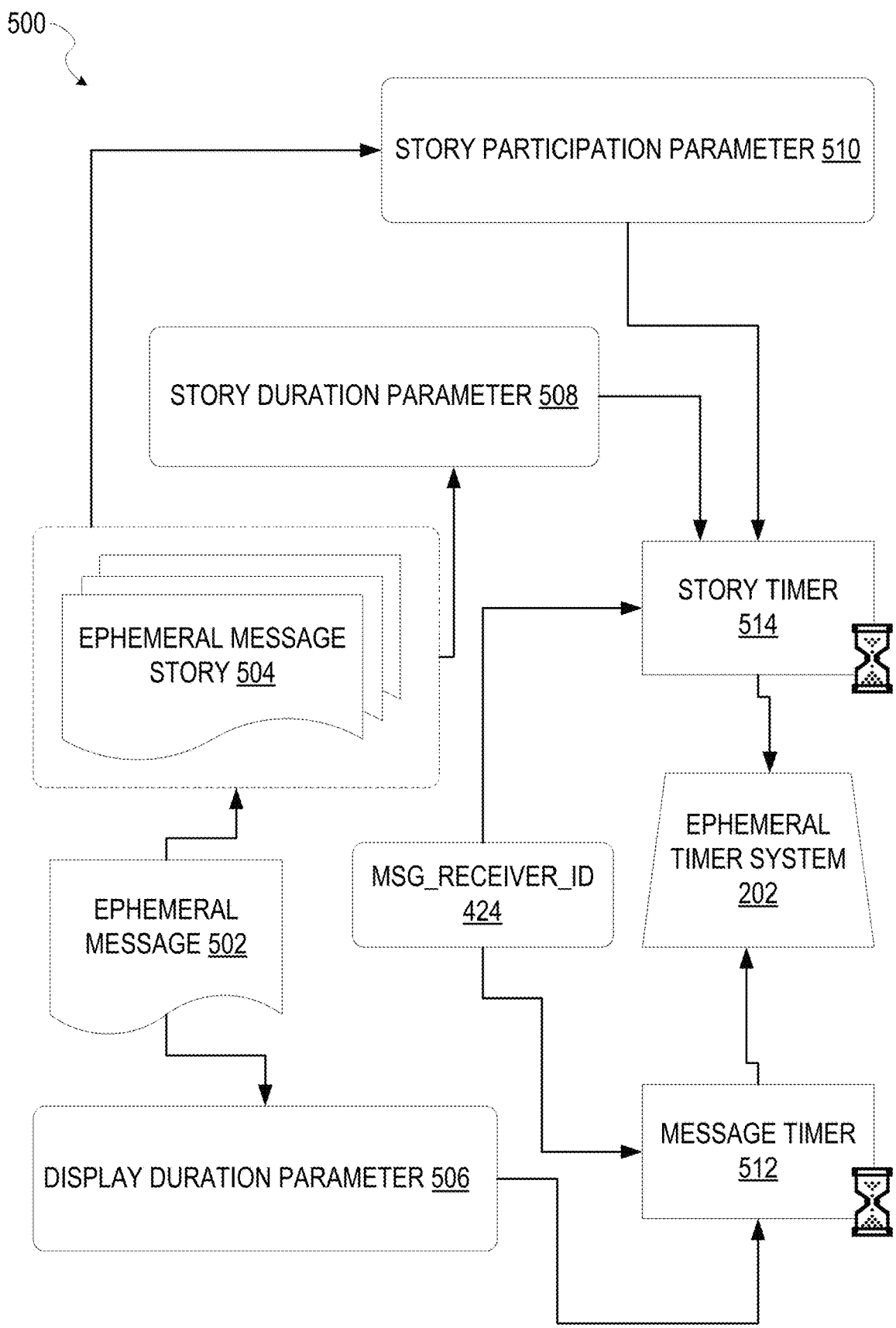
FIG. 5 is a schematic diagram illustrating an example access-limiting process, in terms of which access to content (e.g., an ephemeral message, and associated multimedia payload of data) or a content collection (e.g., an ephemeral message gallery or story) may be time-limited (e.g., made ephemeral).

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral).

An ephemeral message 502 is shown to be associated with a display duration parameter 506, the value of which determines an amount of time that the ephemeral message 502 will be displayed to a receiving user of the ephemeral message 502 by the social media client application 104. In one embodiment, where the social media client application 104 is a SNAPCHAT application client, an ephemeral message 502 is viewable by a receiving user for up to a maximum of 10 seconds, depending on the amount of time that the sending user specifies using the display duration parameter 506. In some embodiments, the system automatically attaches a default display duration parameter 506 to photographic or still-image messages, e.g., having a default display duration of 5 seconds. The display duration parameter 506 of video-based messages may automatically correspond to the duration of the underlying video, with an automatically enforced upper limit. Thus, in an example embodiment in which an upper limit of 10 seconds is enforced, a seven second video message will have a display duration parameter of seven seconds.

The display duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the display duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within a social media gallery in the form of an ephemeral message story 504 (e.g., a personal SNAPCHAT story, or an event story). The ephemeral message story 504 has a story duration parameter 508, a value of which determines a time-duration for which the ephemeral message story 504 is made available and is accessible to users of the social media platform system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504. In some embodiments, the story duration parameter 508 is determined based at least in part on respective story participation parameters 510 (or lifetimes) of one or more of the ephemeral messages 502 forming part of the particular story 504. In one example embodiment, the story duration parameter 508 corresponds to a story participation parameter 510 or lifetime of a last-posted one of the ephemeral messages 502 in the relevant ephemeral message story 504. In such case, the story 504 expires (e.g., by becoming unavailable for viewing via the social media platform) when the last-posted message 502 therein expires (e.g., when a story participation parameter 510 or message timer 512 of the last message 502 expires).

As alluded to above, each ephemeral message 502 within the ephemeral message story 504 has an associated story participation parameter 510 (also referred to herein as a gallery participation parameter or a gallery participation timer), a value of which determines the duration of time for which the ephemeral message 502 will be accessible within the context of the ephemeral message story 504. Accordingly, a particular ephemeral message 502 may "expire" and become inaccessible within the context of the ephemeral message story 504, prior to the ephemeral message story 504 itself expiring in terms of the story duration parameter 508.

The story duration parameter 508, story participation parameter 510, and message receiver identifier 424 each provide input to a story timer 514, which operationally determines, firstly, whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 in some embodiments operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time period specified by the story duration parameter 508. In a further embodiment, a certain ephemeral message 502 may expire, within the context of the ephemeral message story 504, based on a story participation parameter 510. Note that a respective display duration parameter 506 may still determine the duration of time for which a particular ephemeral message 502 is displayed to a receiving user upon replay of the message 502, even within the context of the ephemeral message story 504. Accordingly, the display duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

Note that in this disclosure, at least some ephemeral messages 502 may be submitted by a user to the social media application for general or public viewing via the map-based GUI without being included by the user in any particular event gallery and without being included in any location-based gallery represented by a respective gallery icon on the map GUI. Such messages 502 in some embodiments also have respective story participation parameters 510 for which the messages 502 are accessible via the map GUI as part of a collective Live Story or Our Story, as described with reference to specific example embodiments below. In a particular example embodiment, each ephemeral message 502 thus submitted for public or non-private view has a default gallery timer parameter or story participation parameter 510 of 24 hours. Such ephemeral messages 502 are thus viewable via the map GUI for only 24 hours after submission.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

Responsive to the ephemeral timer system 202 determining that an ephemeral message story 504 has expired (e.g., is no longer accessible), the ephemeral timer system 202 communicates with the social media platform system 100 (and, for example, specifically with the social media client application 104) to cause an indicium (e.g., an icon) associated with the relevant ephemeral message story 504 to no longer be displayed within a user interface of the social media client application 104. Similarly, when the ephemeral timer system 202 determines that the story participation parameter 510 for a particular ephemeral message 502 has expired, the ephemeral timer system 202 causes the social media client application 104 to no longer display an indicium (e.g., an icon or textual identification) associated with the ephemeral message 502.

Example Embodiments of Map GUI Functionality

First, various aspects and features of the disclosure will be described conceptually with respect to specific example embodiments discussed with reference to and illustrated in FIGS. 6A-7C.

Basic Map GUI Architecture

Figure 6A:
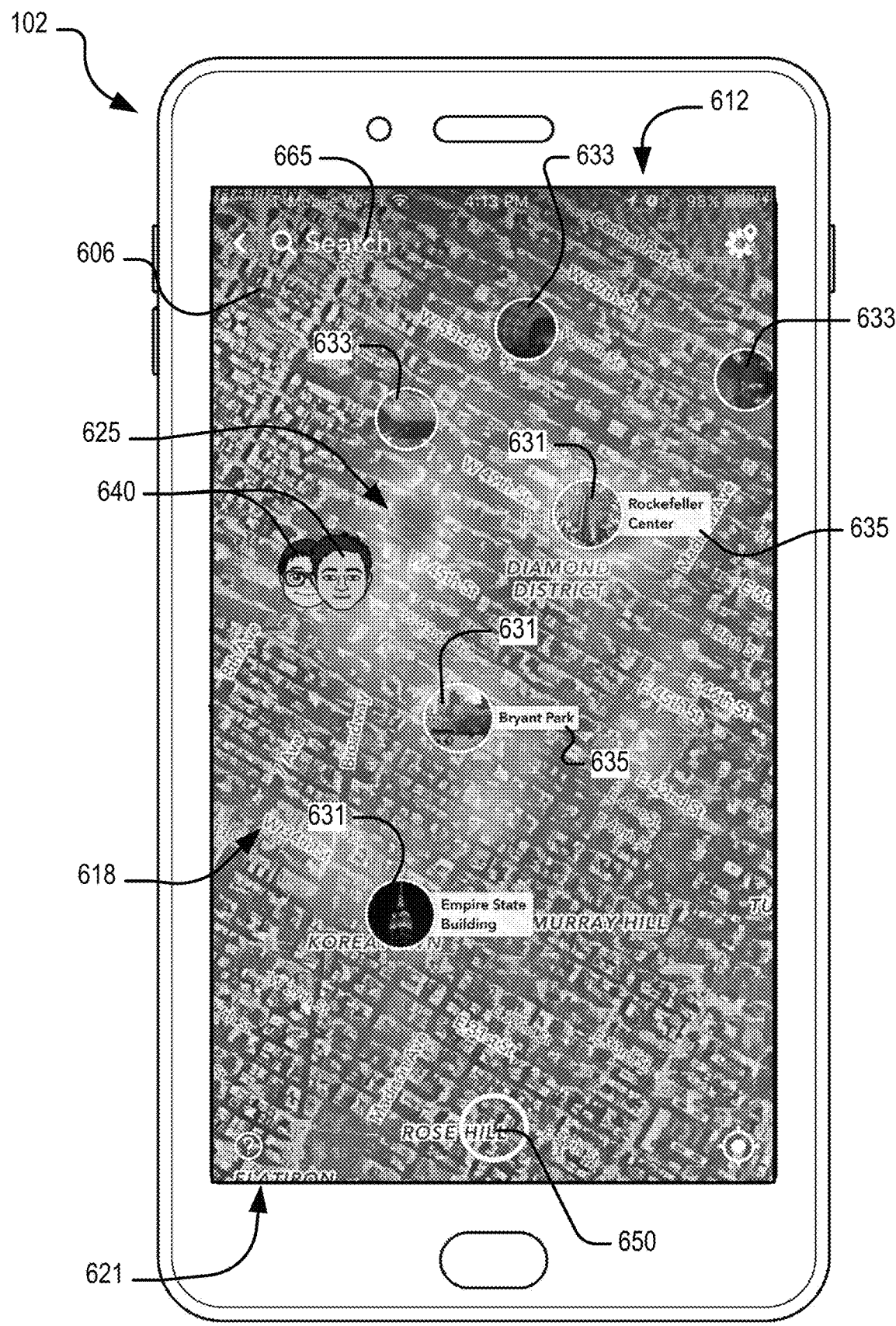
FIGS. 6A and 6B are respective schematic views of a client device providing a map-based graphical user interface (GUI) for a social media application, according to different respective example embodiments.

FIG. 6A shows an example embodiment of a map-based graphical user interface, further referred to as a map GUI 612, displayed on a client device 102 in the example form of a mobile phone. In this example embodiment, the map GUI 612 is generated on a display in the form of a touchscreen 606 capable of receiving haptic input. The map GUI 612 includes a map 618 showing an aerial or satellite representation of a particular geographical area. The map 618 is displayed within a map viewport 621 which, in this example embodiment, uses the full available area of the touchscreen 606. In other example embodiments, the map viewport 621 may be a bounded panel or window within a larger display screen. The map GUI 612 further comprises a plurality of user-selectable graphical user interface elements displayed at specific respective geographic locations on the map. Each such geo-anchored GUI element is in this example embodiment represented by a respective indicium or icon overlaid on the map 618. The different types of icons and their respective functionalities will be described in greater detail below. As will also be described briefly, the map GUI 612 may further include one or more informational overlays rendered over the underlying geographical map 618, in this example embodiment including a heatmap 625 representative of the geographical distribution of underlying social media activity on the social media platform provided by the relevant social media application. In this example embodiment, the social media platform to which the social media client application 104 executing on the mobile phone (e.g., client device 102) provides access is SnapChat™ provided by Snap Inc.

As mentioned, the map GUI 612 includes a number of different user-selectable icons or UI elements that indicate different geographically-based content or information. In this example embodiment, the map GUI 612 includes a plurality of different gallery icons (also referred to in this description as story icons or collection icons). Each story icon corresponds in location on the map 618 to a respective location-based social media gallery, in this example embodiment corresponding to a location-based story of ephemeral messages in the example form of so-called snaps, as discussed elsewhere herein. Each of these stories that are represented by a respective story icon on the map 618 consists of a respective set of snaps (respectively comprising augmented or unaugmented photographic or video content) that are grouped together based at least in part on respective geotag data associated with respective snaps.

In the example embodiment of FIG. 6A, the map GUI 612 includes two different types of gallery icons for two different respective types of location-based social media galleries, namely place icons 631 for place galleries/stories, and spike icons 633 for spike galleries/stories that are dynamically surfaced on the map GUI 612 based on one or more metrics of underlying social media activity relating to the submission of social media items/snaps to the social media platform with geotag data indicating the respectively associated geographical areas. Note that these different types of galleries are represented by different types of icons 631, 633. The differences between these different types of galleries and the corresponding visually distinct icons 631, 633 is discussed later herein. The map GUI 612 in this example embodiment further includes friend icons in the example form of bitmojis 640 that are displayed on the map GUI 612 based on the current or last known geographic location of respective friends of the user associated with the client device 102.

Message and/or Story Ephemerality

In this example embodiment, the social media items that are selectively playable by selection of the corresponding gallery icons 631, 633 in the map GUI 612 are ephemeral social media items or messages. As described previously, ephemeral content is social media content (e.g., augmented and/or unaugmented video clips, pictures, and/or other messages) that are available for viewing by social media users via the map GUI 612 for only a predetermined limited period, also referred to herein as a respective gallery participation parameter or timer. After expiry of a respective gallery participation parameter or timer for any ephemeral message or snap uploaded by a particular user, that ephemeral message or snap is no longer available for viewing by other users via the map GUI 612 generated on their respective client devices 102. Current examples of such ephemeral social media content include the respective snaps or messages included in so-called Stories in the SNAPCHAT or the INSTAGRAM social media applications.

Instead of, or in addition to, management of ephemerality on a per-snap level using respective gallery participation timers, availability of the ephemeral messages by the map GUI 612 can in some instances be managed collectively, e.g., on a per-story level (i.e., a per-gallery level). In such instances, each story can have a respective story duration parameter 508 (e.g., being based on a corresponding story timer 514—see FIG. 5), at the expiry of which availability of the corresponding story for viewing via map GUI 612 is terminated. In some embodiments, the story duration parameter 508 is calculated based on the story participation parameter 510 of one of the ephemeral messages included in the relevant story. For example, a story may in some embodiments expire when a last uploaded item within the story expires, responsive to which the corresponding story icon 631/633 is no longer displayed on the map GUI 612. In one example embodiment, the map GUI 612 may include one or more event icons (e.g., similar in appearance to the place icons 631 of FIG. 6A) corresponding to respective event stories, with the story duration parameter 508 of the event story being set to expire a predetermined period of time from the start or conclusion of the underlying event. At expiry of the story duration parameter 508, the corresponding gallery icon is removed from the map GUI 612, irrespective of individual timers associated with respective snaps included in the event story.

Story Playback

The user can select any one of the gallery icons 631, 633 by haptic contact with the touchscreen 606 at the onscreen location of the selected gallery icon 631/633. Responsive to such selection, automated sequential playback of the corresponding set of ephemeral messages or snaps in the selected story is performed by the client device 102 on the touchscreen 606. Such automated sequential reproduction of the selected story consists of:

displaying on the touchscreen 606 the content or media payload of a first one of the ephemeral messages for a corresponding display duration (e.g., a default value of five seconds for photo-based messages and a maximum value of 10 seconds for video-based snaps), in this example embodiment temporarily replacing the map GUI 612 on the touchscreen 606 with a full-screen replay of the relevant snap;

at expiry of the display duration, displaying the content of the next snap/message for its display duration; and thus progressing in sequence through all of the ephemeral messages in the selected story until all of the snaps in the story have been replayed or until the user selectively dismisses the playback sequence.

In some embodiments, not all of the snaps in a particular story/gallery are necessarily included in the replay sequence. For example, if there are many overlapping snaps (e.g., snaps showing substantially identical content), some of those snaps are automatically skipped to keep a continuous narrative and not repeat some sections of an event commonly captured by the different snaps. Instead, or in addition, the social media server application 114 can in some embodiments be programmed automatically to identify and curate overlapping or contemporaneous snaps based on timestamp information associated with respective snaps.

In this example embodiment, the snaps automatically collected together in a replayable spike story or place story are arranged automatically to be played back in chronological order based on respective timestamps (i.e., being played in sequence from oldest to newest or earliest posted to most recently posted). A benefit of such chronological playback is that viewing of the story provides a user with sequentially arranged views of events transpiring at the relevant location. In some instances, however, a human curator may choose to rearrange snaps out of chronological order, for example to improve the narrative flow of the story. In other embodiments, the snaps may be played in reverse chronological order, from newest to oldest.

It can thus be seen that the example map GUI 612 includes multiple location-based gallery icons in the example form of story icons 631, 633 that are user-selectable to trigger playback of respective collections of ephemeral social media items, in this example embodiment being respective ephemeral stories consisting of respective sets of ephemeral messages (also referred to in this description as snaps). In this example embodiment, each of the plurality of location-based stories represented by the respective story icons 631, 633 may comprise media content contributed by multiple different users.

Our Story and Publication of Ephemeral Messages to Our Story

The respective ephemeral stories are in this example embodiment compiled from ephemeral messages submitted by multiple users based at least in part on geotagging of the respective snaps. Note that the ephemeral messages made available for viewing via the map GUI 612 are in this example embodiment not limited to content provided by other users who are members of an in-application social network of the user on whose client device 102 the map GUI 612 is generated. Instead, the social media content to which the map GUI 612 allows access is in this example embodiment provided by snaps uploaded or submitted by any user to be publicly accessible via the map GUI 612.

Figure 7A:
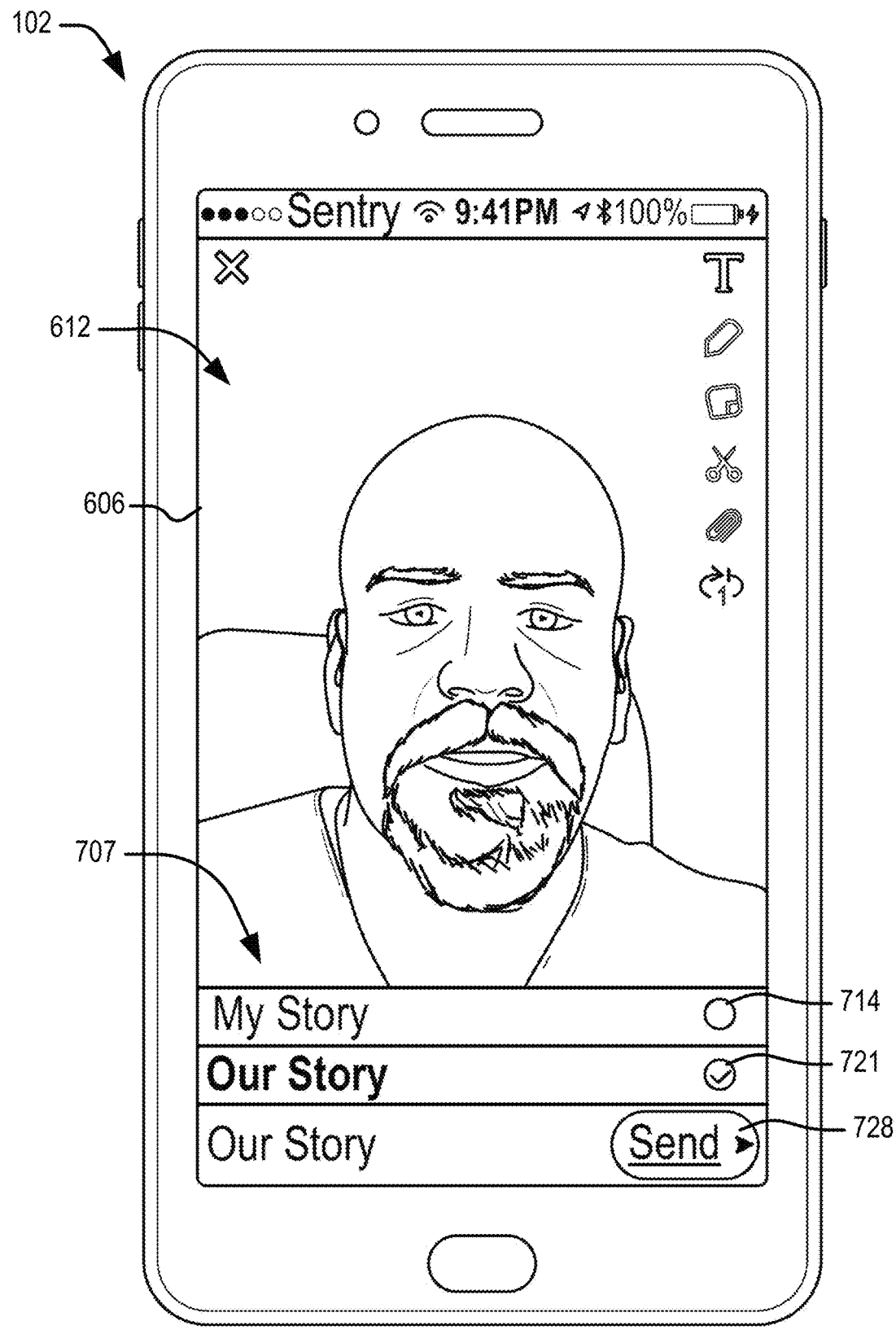
FIGS. 7A-7C are respective schematic views of a client device providing a destination selection interface forming part of a map-based graphical user interface for a social media application, according to some example embodiments.
Figure 7C:
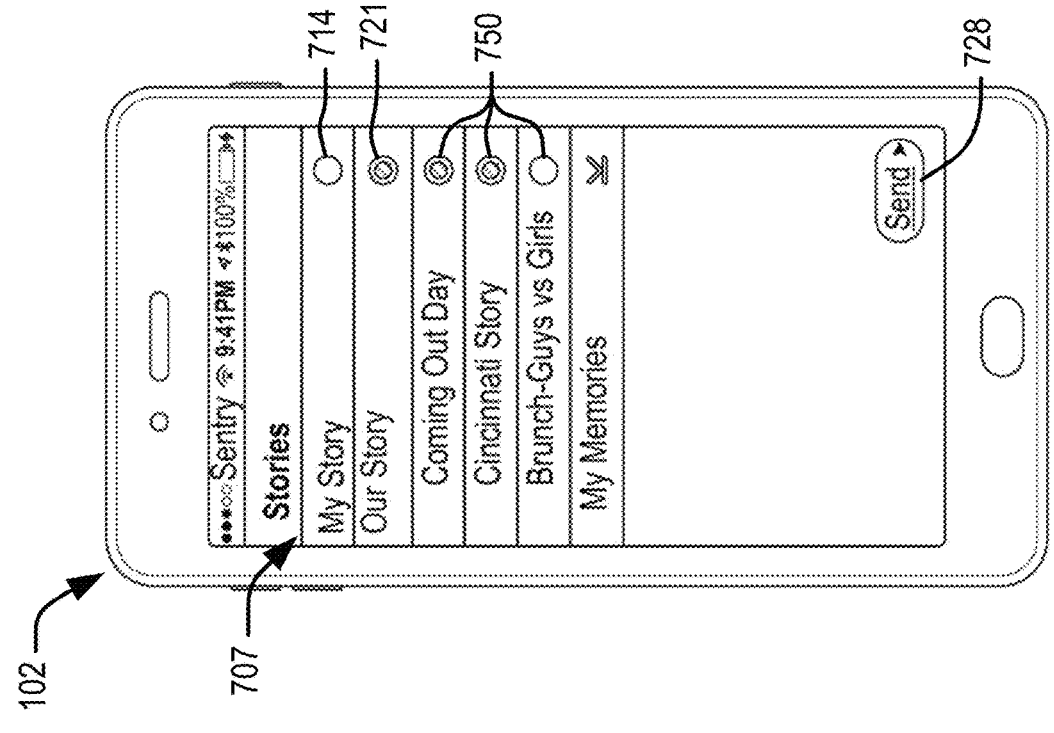
Figure 7B:
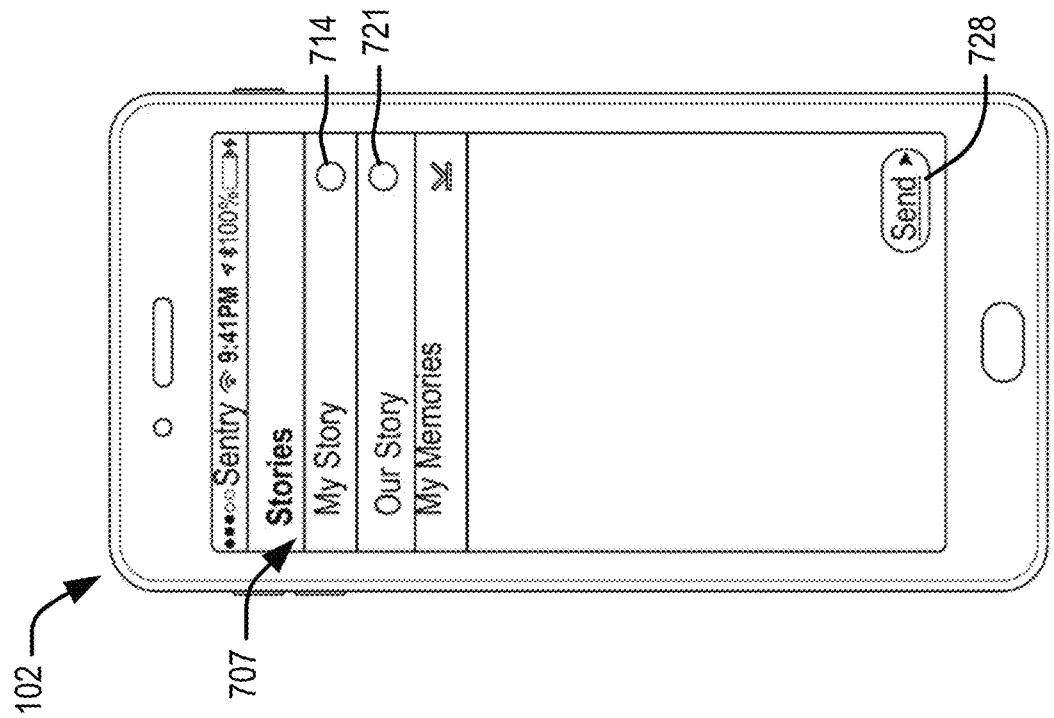

One aspect of the example map GUI 612 provides for the functionality for users to submit social media content that is publicly viewable via the map GUI 612. Turning briefly to FIGS. 7A-7C, therein is shown an example embodiment of a destination selection interface 707 forming part of the map GUI 612 to provide a mechanism that provides the user with a selectable option to make a snap publicly viewable via the map GUI 612 upon capturing of the snap.

In this example embodiment, snaps can be captured via the map GUI 612 while the map viewport 621 is displayed (as seen in FIG. 6A) by operation of a camera soft button 650 (FIG. 6A) forming part of the map GUI 612. After capturing of photo or video content by operation of the camera soft button 650, the captured media content is displayed on the touchscreen 606 (FIG. 7A) together with the destination selection interface 707. In this example embodiment, the user can select one or both destination options identified in FIG. 7A as "My Story" and "Our Story," represented in FIG. 7A by respective radio buttons 714, 721. By selecting the Our Story radio button 721 and thereafter selecting a "Send" soft button 728, the snap is submitted over the network 106 to the application server 112 with an indication that the snap is available for non-private publication via the map GUI 612. If the snap is not so marked by the user, for example being associated with selection of the My Story radio button 714 only, then the snap is not available for inclusion in any of the stories associated with the story icons 631, 633, and is not available for inclusion in search results of a location-based search via the map GUI 612, as described later herein. Snaps included only in the My Story gallery are available only to friends of the user (e.g., members of the uploading user's social network). The My Story gallery is a per-user, location-agnostic gallery of ephemeral messages available to friend users only, thus being a non-public or private gallery.

In other example embodiments described herein, the superset of ephemeral messages made available by multiple users for public viewing via the map GUI 612 is alternatively referred to as the "Live Story" or simply as a "Live" gallery. For the purposes of the description of example embodiments herein, Live and Our Story are thus to be read as being synonymous. In the present example embodiment, the compilation and/or surfacing of gallery icons 631, 633 and the rendering of the heatmap 625, are based exclusively on publicly available social media content provided by snaps uploaded to Our Story. Calculation of metrics or attributes of social media activity upon which one or more aspects of the map GUI 612 are based (e.g., an unusualness or anomaly metric indicating geo-temporal unusualness or anomaly of social media activity within respective geographical areas) is in this example embodiment likewise based exclusively on snaps uploaded to Our Story.

Visual Distinctions Between Story Icons for Different Story Types

Returning now to the visual distinctions or differences between the different types of gallery icons 631, 633, it will be noted that each gallery icon 631/633 in this example embodiment comprises a circular graphical user interface element bearing a thumbnail image provided by one of the snaps contained in the respective story. Each place icon 631, however, also includes an associated label 635 bearing a text indication of the associated place. In this example embodiment, the geographical labels 635 indicate the respective place stories surfaced in the geographic window presently displayed in the example map 618 as being the Rockefeller Center, Bryant Park, and the Empire State Building, respectively. These two different types of galleries (namely, place galleries and spike galleries) are thus in the example embodiment of FIG. 6A represented by two different respective types of icons 631, 633 (namely, labeled place icons 631 and unlabeled spike icons 633) that are visually distinct.

Figure 6B:
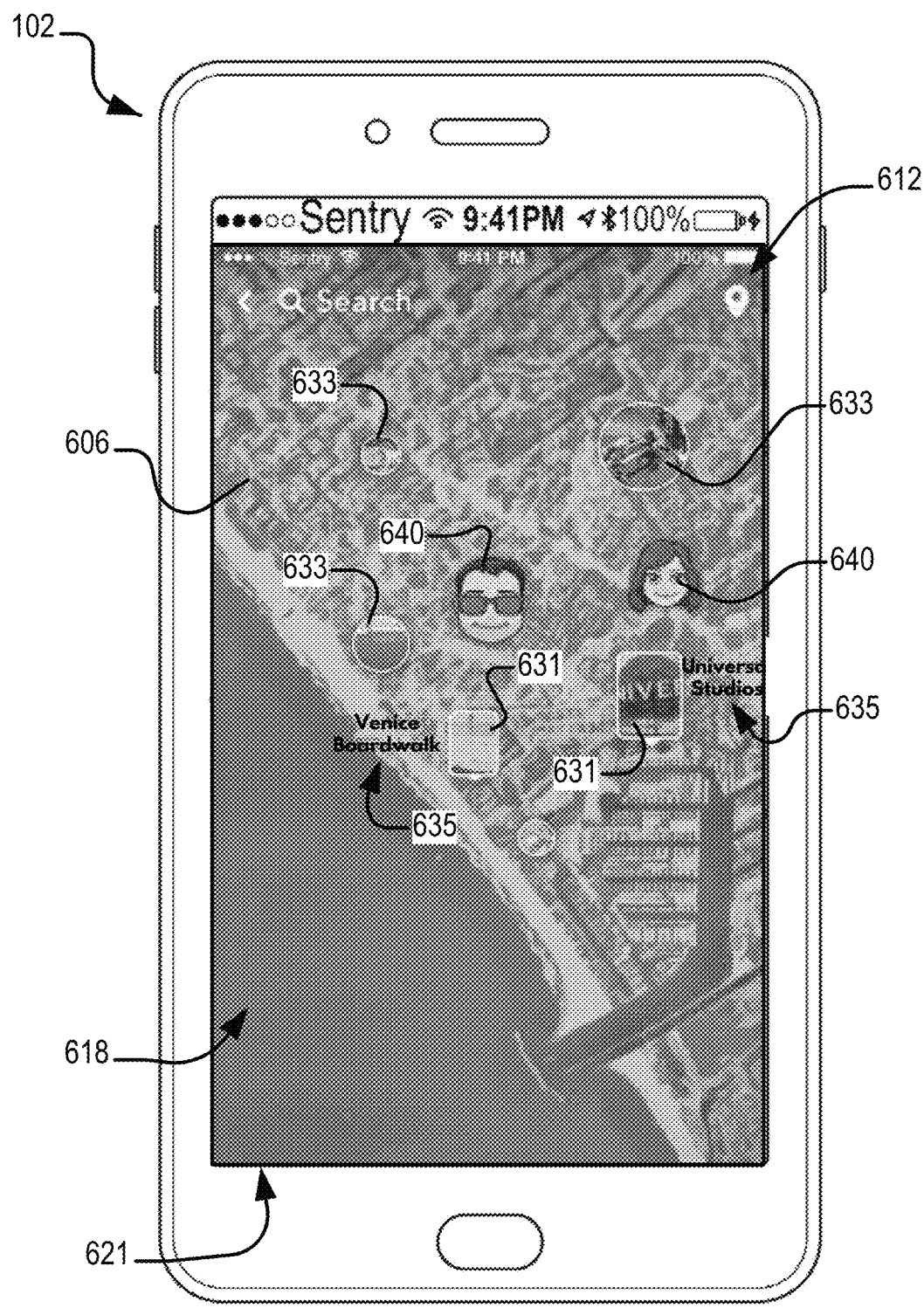

In other example embodiments, the visual distinctions between different types of story icons may be provided in a different manner. FIG. 6B, for example, shows another example embodiment of a map GUI 612 that is analogous to the example embodiment of FIG. 6A, a major difference being that the visual distinction between place icons 631 and spike icons 633 is provided at least in part by differently shaped thumbnail images. In the example of FIG. 6B, the thumbnails of the place icons 631 are rectangular, while the thumbnails of the spike icons 633 are circular. It will thus be understood that, in the example embodiment of FIG. 6B, the exemplified two different types of galleries are represented by two different types of icons 631, 633, which are differently shaped in that a user-selectable user interface element (e.g., the respective thumbnail) has different respective shapes in outline, here being rectangular and circular respectively.

The respective thumbnail images that are used for the spike icons 633 are in the example embodiments of FIGS. 6A and 6B automatically selected by the social media server application 114. In this instance, the thumbnail image for a spike icon 633 is automatically selected based on the posting time of the respective snaps forming part of the corresponding spike story, in this case being selected as a most recently posted snap in the relevant story. In other embodiments, automatic selection of the thumbnail image to be used in the spike icon 633 can be based on selecting the earliest posted ephemeral message/snap that is still available for viewing as part of the spike story. The thumbnail images for the place icons 631 (or for other curated stories, such as event stories) can in some embodiments likewise be selected automatically. In this embodiment, however, the thumbnail images for the place icons 631 can be selected from the snaps included in the corresponding story/gallery by a human operator via a content management interface forming part of the social media server application 114. Absent such an explicit designation of a particular snap to be used for the thumbnail image, thumbnail selection may refer to an automatic default selection as described previously.

Differences Between Different Story Types

Place Stories

Returning to FIG. 6A, the differences between the different types of social media galleries or stories accessible via respective story icons 631, 633 on the map GUI 612 will now be briefly discussed.

Place stories, represented by respective place icons 631, are social media galleries for defined locations or places, typically being places that consistently have relatively large activity volumes (e.g., Times Square, Universal Studios, etc). Note that, in this example embodiment, not all defined places are by default surfaced in the map GUI 612 by respective place icons 631. Instead, the geo-anchored place stories are surfaced based on the amount of activity (e.g., the raw number of uploaded snaps) captured within a defined geographic area associated with the relevant place, as indicated by associated geotag data. This ensures that places that regularly or always attract relatively large volumes of snaps are identified as such on the map 618.

Defined places for which place icons 631 may be surfaced in the map GUI 612 are in this example embodiment manually created by one or more human operators using a server-side gallery system or content management system management system (CMS) provided by the social media server application 114. In this example embodiment, each defined place has:

(a) an associated operator-defined polygon marking geographical boundaries that specify a particular geographical area for the place story;

(b) a thumbnail location or icon location that specifies the on-map position at which the place icon 631 for a gallery or story associated with that place is displayed in the map 618. Typically, the icon location lies within the associated polygon; and (c) a name by which the place is identified. In the example embodiment of FIG. 6A, this is the name that is displayed on the associated label 635 of the place icon 631.

In other embodiments, such places and associated place stories are automatically identified by historical snap volume. In some such embodiments, the defined places and their associated stories/galleries are created and curated automatically by server-side procedures.

In some instances, each place story includes all of the snaps having geo-tag information indicating a geographic location lying within the associated polygon. Selection of a particular place icon 631 (e.g., by clicking in a desktop application or by tapping on the touchscreen 606 in the example embodiment of FIG. 6A) in such cases plays all the snaps from within the corresponding polygon. In this example embodiment, the CMS provides functionality to operators or administrators to curate the collection of snaps associated with any operator-selected defined place (i.e., a particular geographical area defined by the corresponding polygon). The operator or one or more automated procedures can thus, for example, delete individual snaps from the place story, or can select individual snaps for inclusion in the place story.

When playing snaps responsive to selection of a place icon 631, the name of the place appears onscreen together with the replayed content or payload of the respective snaps. As mentioned, in this example embodiment, the snap represented by a corresponding thumbnail within the relevant place icon 631 is played first, then the rest in time order.

Spike Stories

The unlabeled circular spike icons 633 are automatically surfaced for geographical areas of unusually high activity, with the respective associated spike stories or ad hoc galleries including unexpired snaps within the associated geographical area. In the example embodiment of FIG. 6A, all ad hoc galleries associated with spike icons 633 are unmoderated, so that selecting a spike icon 633 triggers automated sequential replay of all of the snaps within a geographical area associated with the spike icon 633. In a particular example embodiment, the geographical area associated with the spike icon 633 includes all geographical points located within a predefined radius of the on-map location of the selected spike icon 633.

Thus, clicking or tapping on the spike icon 633 plays all the snaps in that cluster, showing the snap in the thumbnail first and then the rest of the snaps in time order. Note, again, that the snaps clustered under the common spike icon 633 are in this example uploaded by multiple different respective social media users to our story, and are uncurated by moderators. In other embodiments, the stories collected under such spike thumbnails may be curated.

Automated selection of spike icons 633 (and therefore of the associated social media gallery, collection, or story) for surfacing in the map GUI 612 is in this example embodiment based at least in part on calculation of respective anomaly or unusualness metric values for different geographical areas, as discussed elsewhere herein. Thus, a level of unusualness or anomaly of user activity in a particular geo-temporal space would in such instances increase the likelihood of a particular spike story being surfaced on the map by display of a corresponding spike icon 633. Instead, or in addition, human curators can also mark specific spike stories or clusters as "interesting," thereby boosting the interestingness or anomaly score of the respective spike.

Note that, in the example embodiment described with reference to FIG. 6A, different social media activity attributes or metrics are used for surfacing of the place icons 631 and the spike icons 633 respectively. As discussed, spike icons 633 are in this example embodiment surfaced based on anomaly metric values, while place icons 631 are surfaced based on raw snap volume. In other embodiments, surfacing of the place icons 631 may also be based at least in part on associated anomaly values. Note that in some embodiments, various aspects of social media surfacing as described herein (including heatmap calculation and generation, story surfacing, etc.) are based on attributes other than anomaly. For example, the heatmap 625 and story surfacing are in one embodiment based on raw activity levels.

Other Types of Stories or Ephemeral Social Media Galleries

Other embodiments can instead, or in addition, provide for social media gallery types different from the place stories and the spike stories described with reference to FIGS. 6A and 6B. Each such different type of gathering may be represented on the map 618 by a visually distinct type of icon or other user interface element.

One example embodiment provides for event galleries pertaining to particular events occurring at a specific location. Such events can include, for example, concerts, festivals, sports events, or the like. These event galleries are in one embodiment created and curated by human operators using the gallery management system of the social media server application 114.

Some embodiments provide for surfacing on the map 618 story icons or thumbnails with respect to non-public snaps, e.g., snaps or stories that are access-restricted based at least in part on a social network information. For example, individual stories uploaded by friend users may in some embodiments be represented on the map 618 by a respective icon on the thumbnail. For example, the My Story of friend users may in some embodiments be directly accessible via the map 618. Such story icons are in some embodiments indicated by a respective friend icon or bitmoji 640 located on the map 618 corresponding to the location at which the corresponding story was generated. In other embodiments, each such user story icon may be indicated on the map 618 by a circular thumbnail analogous to the previously described example story icons 631, 633 of FIG. 6A.

Snap Submission to User-Selected Location-Based Stories

Another feature of the disclosure enables users to submit publicly viewable snaps designated for inclusion in any and all Live stories or ephemeral galleries that might be happening at locations where the user is eligible to post, e.g., being geographically proximate to the current location of the user as indicated by the associated client device 102. In this manner, the user can specify snaps for inclusion in place stories, event stories, or other location-based ephemeral social media galleries as discussed above.

FIGS. 7B and 7C show an example embodiment of a destination selection interface 707 that provides a mechanism for such destination selection alternative to the example embodiment previously described with reference to FIG. 7A. The destination selection interface 707 of FIG. 7B is displayed on the client device 102 responsive to the user initiating a snap submission flow, e.g., by capturing a snap.

The destination selection interface 707 of FIG. 7B is similar to the example embodiment of FIG. 7A in that two different user-selectable user interface elements in the form of respective radio buttons 714, 721 are presented for posting a snap to snap to a user-specific My Story (radio button 714) or to a publicly viewable Our Story (radio button 721). A distinction between the user interfaces 707 of FIGS. 7A and 7B is that the Our Story cell of FIG. 7B automatically expands upon selection of button 721 to show subtitles of local place stories and/or event stories to which the snap could be submitted based on device location or the geotag of the associated snap.

FIG. 7C shows additional options presented as a result of selecting the Our Story radio button 721, which opens up a list showing the respective local stories for which the snap is eligible. In this example embodiment, all suboptions are selected by default via respective radio buttons 750. In other embodiments, separate selection of individual suboptions may be required. If the user chooses to submit the snap with all of the options selected, that snap is automatically associated with each of the selected suboptions as well as being made available for geographically based viewing as part of Our Story, separate from any curated location-based place or event gallery/story, as described above.

The user can deselect any particular suboptions by clicking or tapping on the corresponding default-selected radio button 750, as shown in FIG. 7C, in which the lowermost one of the suboptions has been deselected. If all suboptions are deselected, the snap is not posted to any curated location-based story, but is posted only to Our Story to be publicly viewable via the map GUI 612, as described elsewhere herein.

Heatmap Considerations

As shown in FIG. 6A, the social media application map GUI 612 in this example embodiment includes a heat map layer overlaid on the geographical map 618, thus providing the heatmap 625 that indicates geographical distribution of one or more attributes of user activity within the social media application. As discussed previously, the heatmap 625 indicates user activity levels with respect to posting geo-tagged content that is publicly viewable (e.g., Live Stories/Our Story). Instead, or in addition, the heatmap 625 can in some embodiments be based on snaps that are available for viewing by the particular user on whose client device 102 the map GUI 612 is displayed, in which case the heatmap 625 may differ from person to person depending on who gave the viewer permission to see their snaps.

In this example embodiment, the map 618 is color-coded, with warmer colors corresponding to higher levels of unusualness, as indicated by higher anomality metric values. Thus, in the map 618 illustrated in FIG. 6A, the red areas of the heatmap 625 indicate those geographic areas with snap clusters corresponding to the highest anomality metric values. Again, different metrics or attributes for generation of the heatmap 625 may be used in other embodiments, for example being based on snap density (e.g., raw snap volume per unit area of the map 618).

In some embodiments, the map GUI 612 displays information pertaining to the heatmap 625 differently at different magnification levels. For example, calculation of anomality metrics and consequent rendering of the heatmap 625 based thereon is in some embodiments performed separately for each of a plurality of zoom levels. In addition, different sets of spike icons 633 may be surfaced at different magnification levels. In one example embodiment, the heatmap 625 may be displayed at a first zoom level without individual spike icons 633 surfaced in the map GUI 612, while multiple gallery or story icons 631, 633 are automatically surfaced responsive to user-controlled zooming in on a particular portion of the map 618 shown at the first zoom level.

Anomality Metric Calculation

Some features of the map GUI 612 in this example embodiment provide for calculating with respect to social media content an anomality metric that quantifies geospatial anomaly or unusualness of the social media content, and for surfacing the social media content in the map GUI 612 based on respective values for the anomality metric. In this example embodiment, respective collections of snaps associated with different geographical locations are ranked based at least in part on corresponding anomality metric values, and a predetermined number of the connections are automatically selected based on their anomality rankings for surfacing on the map GUI 612 with respective spike icons 633. Instead, or in addition, all spike stories with an anomality metric value higher than a predefined threshold value can automatically be surfaced by the display of a corresponding spike icon 633. As described elsewhere herein, the calculation and display of heatmap information is in some embodiments based at least in part on an anomality metric calculation.

Anomality metrics may in some embodiments be counted for individual social media items. In this example embodiment, however, anomality metrics are calculated for collective user behavior. In particular, anomality metrics are calculated for multiple snaps (in this example being respective geo-tagged social media submissions) based on comparison between geo-temporal distribution of the multiple snaps compared to historic geo-temporal social media behavior in or around the relevant geographic location.

Note that the calculation of the anomality metric is, in this example embodiment, time sensitive. Thus, the same volume of snaps in a particular location may be identified as being anomalous at one time of the day but not at another time. For example, a certain level of social media activity (here, posting of snaps to Our Story) at the Empire State Building would be flagged as above-threshold anomalous at 4 AM in the morning, but would not be thus identified as anomalous during the daytime.

An aspect of the disclosure provides for determining one or more geo-temporal attributes of social media activity by a process comprising, for each of multiple social media postings, representing the posting as having a distribution in time and/or in space. In some embodiments, representing respective postings as having a geotemporal distribution comprises treating respective social media items as a probability cloud, for example having a Gaussian distribution. Instead, or in addition, the method may comprise generating or extrapolating a historical model or historical representation of social media activity based at least in part on a resampling procedure executed with respect to a multiplicity of historical geotagged social media items. In one example embodiment, the resampling procedure comprises a bootstrapping operation.

In some embodiments, the representation of social media postings as having respective distributions in time and/or space is performed as part of an operation to represent a geo-temporal reference profile or model for historical social media activity for a particular geographical area. Instead, or in addition, the representation of social media postings as having respective distributions in time and/or space may be performed as part of a procedure to represent recent or near-live social media activity in the particular geographical area. In such cases, the geo-temporal reference profile and the representation of the recent or near-live social media activity may be used in combination to identify within the geographic area one or more regions of interesting or anomalous social media activity, e.g., by calculating geographical distribution of a quantified anomaly metric based on differences between the geo-temporal reference profile and the corresponding representation of recent or near-live social media activity.

Dynamic Variation of Icon Size

Turning briefly to FIG. 6B, it will be seen that the map GUI 612 illustrated therein provides an example embodiment of an aspect of the disclosure that provides for automated variation in one or more visual attributes of user interface elements associated with respective social media content based at least in part on a quantified attribute of underlying social media activity. In particular, the example embodiment of FIG. 6B provides for dynamic variation in the on-screen size of respective spike icons 633 based on respective anomaly metric values for the corresponding clusters all spike galleries. On-screen size of the respective spike icons 633 thus indicate a level of unusualness or anomaly of the underlying social media activity. Worded differently, the size of a spike icon 633 represents how unusual it is for there to be the relevant amount of activity in that spot, with a larger spike icon 633 indicating a greater level of unusualness.

Instead, or in addition, a visual attribute (such as on-screen size) of the place icons 631 may likewise be variable based on a corresponding anomaly value. In the example embodiment of FIG. 6B, however, the on-screen size of the place icons 631 is variable based on snap volume, with a greater number of snaps included in any place story corresponding to a larger on-screen size of the associated place icon 631. Thus, it is intuitively intelligible from the example screenshot shown in FIG. 6B that the Universal Studios story has a greater number of snaps than the Venice Boardwalk story.

Search Functionalities

In addition to viewing clustered stories by selection of the story icons 631, 633, the user can access snaps by use of one or more search functionalities provided by the map GUI 612. In this example embodiment, the map GUI 612 provides two separate search mechanisms, namely a search box 665 (FIG. 6A) and a location-based search by clicking or tapping at a target location on the map 618.

Responsive to entry of a text search query in the search box 665, search results are, in this example embodiment, displayed in a search box drop-down in which individual cells correspond to individual snaps, stories, places, and/or users returned in the search. When the user clicks on a selected cell in the search box drop-down, the map GUI 612 in this example automatically navigates with a fly-over to the point on the map, after which the selected story or spike cluster starts playing, or a friend bubble pops up, as the case may be. In some embodiments, at least some aspects of the text-based query are limited to the geographical area currently displayed in the map viewport 621. Instead, or in addition, some aspects of the text-based query may be location-agnostic, returning search results from any location.

As an alternative to entering a text-based search query, the user can initiate a location-based search by clicking or tapping on a particular location on the map viewport 621, responsive to which a search is conducted for social media items within a predefined radius from the click or tap location. In this example embodiment, such a location-based search does not return a list of graphical user interface elements that are selectable to play respective items, but instead automatically triggers automated sequential replay returned as a result of the search. Thus, clicking or tapping on a non-thumbnail place on the map 618 will radiate out a search around the tap location. Such a location-based search can have a predefined search radius from the tap location. If any snaps are found, they are automatically played back in sequence, as described before. If there are no snaps in that area, the search bounces back to show no results found.

In embodiments in which the map GUI 612 is displayed on a touchscreen 606 (as is the case in the example embodiments of FIGS. 6A and 6B), a geo-temporal search is triggered by haptic contact at a particular location within the map 618, with the search being geographically centered on the location of the haptic contact. An input interval indicated by the time period for which the haptic contact is maintained with the touchscreen automatically determines the preceding time period with respect to which the search is carried out. In such a case, for example, a tap on the screen triggers a geo-temporal search for material within the default time period, while a press and hold automatically triggers a geo-temporal search for material within an extended time period which is longer than the default time period. Instead, or in addition, the search radius may be variable based on the length of the input interval, with longer input intervals (i.e., a longer hold period) corresponding to a larger search radius.

Overview of Map GUI Functionality

In use, the map GUI 612 thus surfaces different types of location-based stories, which the user can view from the map 618. In the example embodiments of FIGS. 6A and 6B, the user can access via the map GUI 612 snaps posted to Our Story from anywhere in the world. This can be achieved by navigating to different geographical areas displayed within the map viewport 621. In particular, the displayed geographical area can be changed by zooming in or zooming out, and by moving the focus area of the map viewport 621. In the example embodiments of FIGS. 6A and 6B, in which the map GUI 612 is provided on a touchscreen 606, zooming in and zooming out can be achieved by haptic gestures in the form of a pinch-out or a pinch-in haptic input. Movement of the map 618 within the map viewport 621, so as to change the displayed geographical area, is achieved by a haptic dragging gesture at any point on the map 618.

In this example embodiment, the map 618 is not selectively rotatable by the user, having a fixed default orientation relative to the touchscreen 606. In other embodiments, the map 618 may have a fixed orientation relative to the Earth. In some embodiments, the map 618 is selectively rotatable, e.g., with all map content rotating around a fixed anchor.

As discussed at length above, in any particular map viewport 621, the displayed information can include:
  the color-coded heatmap 625, visually displaying the geographical distribution of snap uploading activity within a preceding window (for example the default snap lifetime, in this example 24 hours), allowing the user to readily identify places with more or less activity. This enables the user more effectively to target location-based searches via the map GUI 612. In some embodiments, the color-coded heatmap 625 is shown at only at a highest level of magnification. In this example embodiment, however, the map 618 is rendered at all zoom levels.

Thumbnail icons 631, 633 for surfaced content forming part of ephemeral galleries or Stories. As described previously, these include, in this example embodiment, place icons 631 for geo-anchored stories associated with particular labeled locations, and spike icons 633 for location-based stories surfaced based on anomalous levels of geo-spatial activity.

Friend bitmojis 640 of friend users most frequently contacted by the user who is logged in to the social media client application 104 executing on the client device 102 and by whom the map GUI 612 is generated.

In some embodiments, no spike icons 633 are shown at some levels of magnification. In a particular example embodiment, no spike icons 633 are shown at the original zoom level at which the map GUI 612 loads by default. In such an example, only the heatmap 625, friend bitmojis 640, and a number of place icons 631 are displayed on the map 618 at the original zoom level. As the user zooms in, spike icons 633 are surfaced, representing respective clusters of activity.

It will be appreciated that different icons 631, 633 are surfaced at different zoom levels. In this example embodiment, the map GUI 612 displays no more than a predefined maximum number of place icons 631 and no more than a predefined maximum number of spike icons 633 in any particular view. For example, at any zoom level, the top three place stories (ranked by snap volume) are surfaced by displaying respective place icons 631 in the map viewport 621. Likewise, at any zoom level, the top three spike stories (ranked by anomality or unusualness metric value) are surfaced by displaying respective spike icons 633 in the map viewport 621.

In addition to viewing stories surfaced in the map 618 by respective story icons 631, 633, the user can use one or more of the search functionalities described above to access any snap uploaded to Our Story and whose gallery participation timer or availability lifetime has not yet expired.

It will be appreciated that the map GUI 612 is dynamic, in that the information displayed therein changes dynamically with time. New snaps may continually be uploaded to Our Story, while the underlying social media items upon which surfacing of the story icons 631, 633 and generation of the heatmap 625 is based further continually change due to the expiration of the availability of snaps. In this example embodiment, however, the information displayed in the map viewport 621 is not dynamically updated during display of any particular geographical area. Instead, changing of the focus of the map viewport 621 is associated with receiving updated information with respect to the story icons 631, 633 and heatmap 625 from the application server 112.

It is a benefit of the map GUI 612 as described with the example embodiments that it provides for user-friendly and intuitive interaction with geographically distributed social media content. The provision of different types of social media galleries (e.g., represented respectively by spike icons 633 and place icons 631) provides a system that automatically surfaces most relevant content for user-selection in such a manner that the very large number of individual social media items that may be available via a social media platform is reduced in complexity and allows selection of targeted content in which the user might be interested.

Example System

Figure 8:
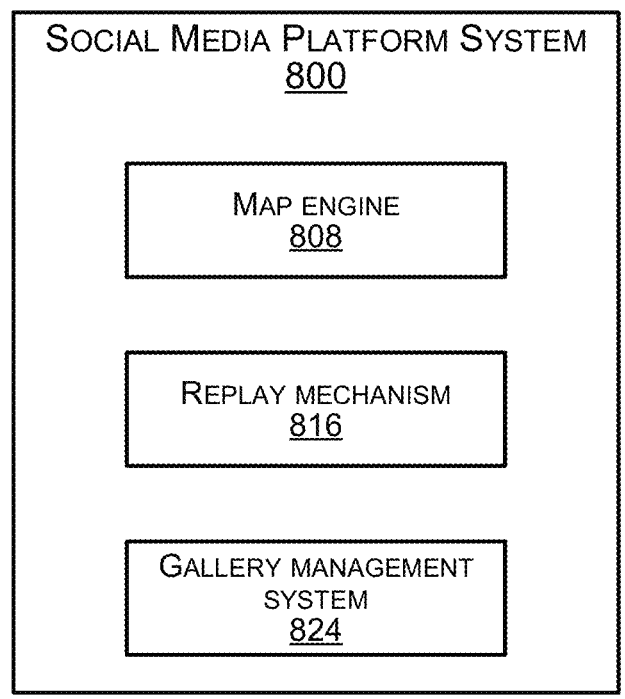
FIG. 8 is a schematic view of a social media platform system for providing a map-based graphical user interface for a social media application, according to one example embodiment

FIG. 8 shows an example embodiment of a social media platform system 800 configured to provide a map-based graphical user interface for a social media application, such as the map GUI 612 described with reference to FIGS. 1-7C. The system 800 and its associated components can in some embodiments be provided server-side, for example by the social media application server system 108 (FIG. 1). In such instances, the respective components of the system 800 can be provided by execution of the social media server application 114 on the application server 112. In other embodiments, one or more components of the system 800 is provided client-side, for example by execution of the social media client application 104 executing on a respective client device 102 (FIG. 1). In yet further embodiments, the system 800 is provided collaboratively server-side and client-side, the application server 112 a client device 102 in communication therewith being configured to provide the respective system components by execution of the social media client application 104 on the client device 102 and by execution of the social media server application 114 on the application server 112.

The system 800 includes a map engine 808 to generate the map GUI 612, including the location-based social media information displayed fire the map GUI 612. Thus, the map engine 808 is configured to generate or to facilitate generation of the map 618 (FIG. 6) in the map viewport 621 of the client device 102. To this end, the map engine 808 can be configured to surface and cause display of particular story icons 631, 633, to identify and cause display of respective friend bitmojis 640, to generate heatmap information and display or cause display of a heatmap 625 overlaid on the map 618, and to perform operations that provide other related functionalities of the map GUI 612 described with reference to FIGS. 1-7C.

The system 800 further includes a replay mechanism 816 configured to cause automated sequential replay of the content of a set of social media items or snaps on the client device 102. The replay mechanism 816 can thus call sequential display of all of the snaps in a selected place story or spike story, as described previously herein. In some embodiments, the replay mechanism may provide for transmission of the set of snaps to the client device 102 responsive to selection of a corresponding story icon 631/633. In some such embodiments, information automatically transmitted by the application server 112 to the client device 102 upon initial rendering of a map view in the map GUI 612 can include a first few (e.g., two or three) snaps for each of the story icons 631, 633 surfaced in the map viewport 621. Upon selection of a particular story icon 631/633, the first few snaps in the story are immediately available for replay, with the subsequent snaps in the story being pulled from the application server 112 during presentation of the first few snaps.

The system 800 also includes a gallery management system 824. In this example embodiment, the gallery management system 824 is provided by the collection management system 204 (FIG. 2) as previously described. The gallery management system 824 is configured for the automated and/or semi-automated compilation of the respective social media galleries or stories as previously described. This may include duration or moderation of respective stories by use of a server-side curation interface 208 provided by the gallery management system 824.

Example Method

Figure 9A:
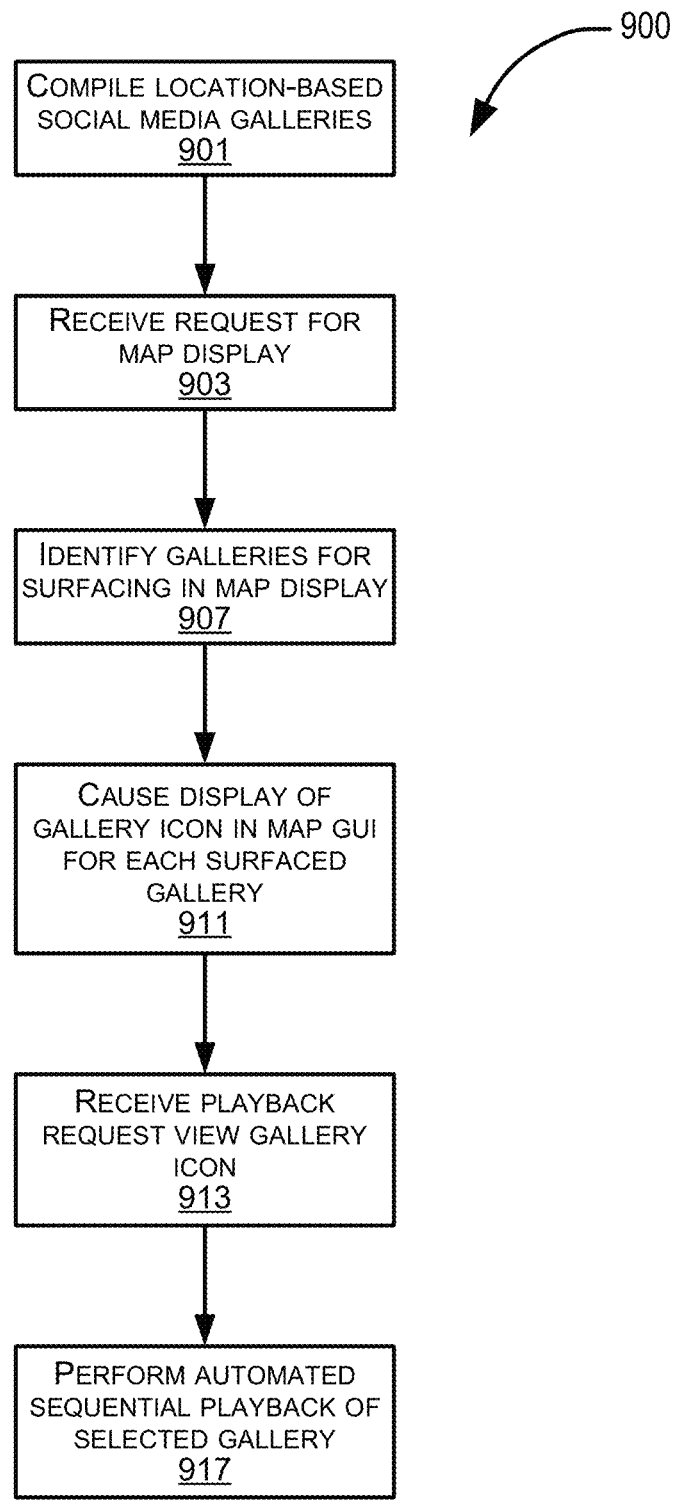
FIG. 9A is a schematic flow chart illustrating an example embodiment of a method of providing a map-based graphical user interface for a social media application, according to an example embodiment.

FIG. 9A is a schematic flow chart illustrating a method 900 of providing a map-based GUI for a social media application, according to an example embodiment. The method 900 is, in this example embodiment, executed by the system 800 as described with reference to FIG. 8, using the system architecture and environment described with reference to FIGS. 1-5. Moreover, the example method 900 in this example embodiment provides the various map-based functionalities described with reference to FIGS. 6 and 7, and the various operations that provide the respective functionalities described with reference to the example map GUI 612 of FIGS. 6 and 7 are to be read as forming part of the method 900, even though all of the different operations previously described are, for avoidance of repetition, not repeated in the high-level overview of the method 900 described below.

In operation 901, location-based social media galleries are compiled by identifying the respective set of snaps that are included in each of multiple stories or galleries viewable via the map GUI 612. Note that in this description, the superset of snaps or social media items that are publicly viewable via the map GUI 612 (e.g., all of the snaps uploaded to Our Story) is used as an overarching gallery; operations performed by the gallery management system 824 (such as managing respective gallery participation timers for the multiple snaps) in some instances apply also to snaps that are not included in any story replayable by user-selection of a corresponding story icon 631/633.

Compilation of stories, at operation 901, in some instances comprises fully automated inclusion in a respective story of all publicly viewable snaps having geo-tag data indicating a location corresponding to a defined geographic area associated with the story. In the example embodiment of FIG. 6A, spike stories or clusters are compiled in a fully automatic procedure. In other instances, story compilation can be semi-automated, in that the set of snaps associated with a particular story is directed by a human operator. In such instances, the gallery management system 824 can generate a set of candidate messages or snaps based at least in part on the geotag data of the respective snaps. An operator administrator can then curate the story based on the set of candidate snaps, for example by deleting unsuitable, low-quality, offensive, and/or redundant snaps.

At operation 903, the system 800 receives a request for map display via the map GUI 612. Thus, for example, an initial loading of the social media client application 104 on the client device 102 in some embodiments automatically requests map information for a geographical area centered on the user's current location at a default magnification level. Likewise, when the user changes the geographical area to be displayed in the map viewport 621 (e.g., by changing the magnification level and/or by changing the centerpoint of the map 618), a request for corresponding map information is issued.

Responsive to the request for map display information, the map engine 808, in an automated operation, identifies, at operation 907, the particular social media galleries that are to be surfaced in the requested map view by displaying respective story icons 631, 633 on the map 618. In this example embodiment, as described previously, a number of spike stories are identified for surfacing based on previously calculated respective anomaly metric values, and a number of place stories are identified for surfacing based on snap volume.

At operation 911, the map engine 808 causes display in the map GUI 612 of respective story icons 631, 633 for each gallery or story identified for surfacing. In this example embodiment, the application server 112 communicates to the client device 102 gallery information in the form of respective story manifests (also referred to in this description as gallery manifests) that provide information necessary for displaying the respective story icons 631, 633.

For example, the application server 112 can provide, for each of the surface stories, a location of the corresponding story icon 631/633, an indicator of the type of story icon (e.g., whether it is a place icon 631 or a spike icon 633), a name or label of the story (if any), a thumbnail image for inclusion in the respective story icon 631/633, and a list of snaps forming part of the corresponding story. In some embodiments, as discussed previously, such gallery information may include the payload of a first few of the snaps, to enable immediate commencement of story playback responsive to user selection. Based on the gallery information thus received, the client device 102 generates the requested map view in the map GUI 612, in some instances including display of a plurality of place icons 631 and a plurality of spike icons 633 at different respective locations on the map 618.

Figure 9B:
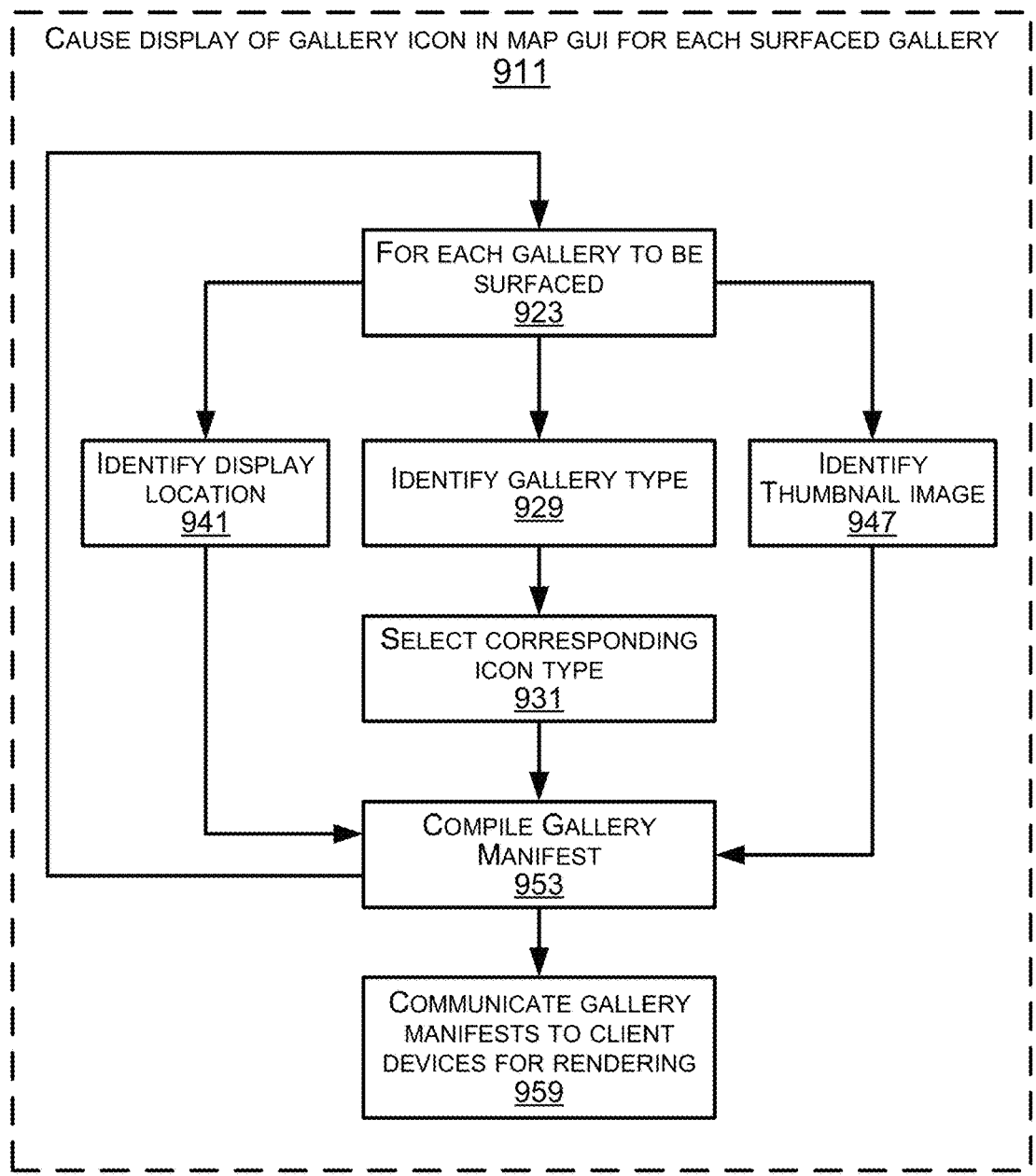
FIG. 9B is a schematic flow chart illustrating an automated procedure that forms part of a method according to the example embodiment of FIG. 9A, and that provides for displaying a plurality of gallery icons in a map-based graphical user interface such that different, visually distinct types of gallery icons represent different types of social media galleries at respective geographical locations on a map of the map-based graphical user interface.

Turning briefly to FIG. 9B, therein is shown a flowchart that schematically illustrates one example embodiment of causing display of a respective gallery icon on the map 618 for each surfaced gallery/story, according to one example embodiment. The procedure is performed, at operation 923, for each story identified for surfacing.

At operation 941, a respective display location is identified for the story icon 631/633, and a corresponding location indicator (e.g., longitude and latitude information) is included in the gallery manifest, at operation 953. At operation 947, a thumbnail image for use in the relevant icon 631/633 is identified, and data indicative of the thumbnail image is included in the story/gallery manifest, at operation 953. In some embodiments, the thumbnail information is an image reference identifying a particular image in an image database or file.

At operation 929, the particular gallery type or story type is identified, e.g., whether the relevant story is a place story, a spike story, an event story, or any other type of story for which the particular map GUI 612 makes provision. At operation 931, an icon type corresponding to the identified story type is selected, and a corresponding indicator is included in the gallery manifest, at operation 953. In the example embodiment of FIG. 6A, the story type indicator in the gallery manifest thus indicates whether the respective story is to be represented by a place icon 631 or by a spike icon 633.

After compilation of the respective story manifests, at operation 953, for all of the stories to be surfaced, the manifests are communicated to the client device 102, at operation 959. The client device 102 thereafter renders the requested map view in the map viewport 621 based at least in part on the received story manifests, representing the different types of stories in the map 618 by different types of icons 631, 633 at their respective geographic locations.

Returning to FIG. 9A, at operation 913, user input is received via the map GUI 612 indicating a request for playback of a particular story by selection of the corresponding story icon 631/633. In response to such a request, automated sequential playback of the story corresponding to the selected story icon 631/633 is performed at operation 917. As described previously, such automated sequential playback comprises displaying the payload of each of the plurality of snaps in the selected story in sequence, each of the snaps being displayed for no more than predefined display duration. In some embodiments, the user can skip a remainder of the playback of any particular snap, e.g., by tapping on the touchscreen 606 for the end of the corresponding display duration.

Machine and Software Architecture

These systems, system components, methods, applications and so forth described in conjunction with FIGS. 1-9 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines configured for particular purposes. For example, a particular hardware architecture coupled with a particular software architecture will create a mobile device, such as a mobile phone, tablet device, or so forth. A slightly different hardware and software architecture may yield a smart device for use in the "internet of things", while yet another combination produces a server computer for use within a cloud computing architecture. The software and hardware architectures presented here are example architecture for implementing the disclosure, and are not exhaustive as to possible architectures that can be employed for implementing the disclosure.

Software Architecture

FIG. 10 is a block diagram illustrating an example software architecture 1006, which may be used in conjunction with various hardware architectures herein described. FIG. 10 is a non-limiting example of a software architecture and it will be appreciated that many other architectures may be implemented to facilitate the functionality described herein. The software architecture 1006 may execute on hardware such as machine 1100 of FIG. 11 that includes, among other things, processors 1104, memory 1114, and I/O components 1118. A representative hardware layer 1052 is illustrated and can represent, for example, the machine 1100 of FIG. 11. The representative hardware layer 1052 includes a processing unit 1054 having associated executable instructions 1004. Executable instructions 1004 represent the executable instructions of the software architecture 1006, including implementation of the methods, components and so forth described herein. The hardware layer 1052 also includes memory and/or storage modules, which also have executable instructions 1004. The hardware layer 1052 may also comprise other hardware 1058.

In the example architecture of FIG. 10, the software architecture 1006 may be conceptualized as a stack of layers where each layer provides particular functionality. For example, the software architecture 1006 may include layers such as an operating system 1002, libraries 1020, applications 1016, and a presentation layer 1014. Operationally, the applications 1016 and/or other components within the layers may invoke application programming interface (API) calls 1008 through the software stack and receive a response as in messages 1012 to the API calls 1008. The layers illustrated are representative in nature and not all software architectures have all layers. For example, some mobile or special purpose operating systems may not provide a frameworks/middleware 1018, while others may provide such a layer. Other software architectures may include additional or different layers.

The operating system 1002 may manage hardware resources and provide common services. The operating system 1002 may include, for example, a kernel 1022, services 1024, and drivers 1026. The kernel 1022 may act as an abstraction layer between the hardware and the other software layers. For example, the kernel 1022 may be responsible for memory management, processor management (e.g., scheduling), component management, networking, security settings, and so on. The services 1024 may provide other common services for the other software layers. The drivers 1026 are responsible for controlling or interfacing with the underlying hardware. For instance, the drivers 1026 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1020 provide a common infrastructure that is used by the applications 1016 and/or other components and/or layers. The libraries 1020 provide functionality that allows other software components to perform tasks in an easier fashion than to interface directly with the underlying operating system 1002 functionality (e.g., kernel 1022, services 1024, and/or drivers 1026). The libraries 1020 may include system libraries 1044 (e.g., C standard library) that may provide functions such as memory allocation functions, string manipulation functions, mathematical functions, and the like. In addition, the libraries 1020 may include API libraries 1046 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1020 may also include a wide variety of other libraries 1048 to provide many other APIs to the applications 1016 and other software components/modules.

The frameworks/middleware 1018 (also sometimes referred to as middleware) provide a higher-level common infrastructure that may be used by the applications 1016 and/or other software components/modules. For example, the frameworks/middleware 1018 may provide various graphic user interface (GUI) functions, high-level resource management, high-level location services, and so forth. The frameworks/middleware 1018 may provide a broad spectrum of other APIs that may be utilized by the applications 1016 and/or other software components/modules, some of which may be specific to a particular operating system 1002 or platform.

The applications 1016 include built-in applications 1038 and/or third-party applications 1040. Examples of representative built-in applications 1038 may include, but are not limited to, a contacts application, a browser application, a book reader application, a location application, a media application, a messaging application, and/or a game application. Third-party applications 1040 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1040 may invoke the API calls 1008 provided by the mobile operating system (such as operating system 1002) to facilitate functionality described herein.

The applications 1016 may use built-in operating system functions (e.g., kernel 1022, services 1024, and/or drivers 1026), libraries 1020, and frameworks/middleware 1018 to create user interfaces to interact with users of the system. Alternatively, or additionally, in some systems interactions with a user may occur through a presentation layer, such as presentation layer 1014. In these systems, the application/ component "logic" can be separated from the aspects of the application/component that interact with a user.

Hardware Architecture

FIG. 11 is a block diagram illustrating components of a machine 1100, according to some example embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1110 (e.g., software, a program, an application, an applet, an app, or other executable code) for causing the machine 1100 to perform any one or more of the methodologies discussed herein may be executed. As such, the instructions 1110 may be used to implement modules or components described herein. The instructions 1110 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1110, sequentially or otherwise, that specify actions to be taken by machine 1100. Further, while only a single machine 1100 is illustrated, the term "machine" shall also be taken to include a collection of machines that individually or jointly execute the instructions 1110 to perform any one or more of the methodologies discussed herein.

The machine 1100 may include processors 1104, memory/storage 1106, and I/O components 1118, which may be configured to communicate with each other such as via a bus 1102. The memory/storage 1106 may include a memory 1114, such as a main memory, or other memory storage, and a storage unit 1116, both accessible to the processors 1104 such as via the bus 1102. The storage unit 1116 and memory 1114 store the instructions 1110 embodying any one or more of the methodologies or functions described herein. The instructions 1110 may also reside, completely or partially, within the memory 1114, within the storage unit 1116, within at least one of the processors 1104 (e.g., within the processor's cache memory), or any suitable combination thereof, during execution thereof by the machine 1100. Accordingly, the memory 1114, the storage unit 1116, and the memory of processors 1104 are examples of machine-readable media. Note that some embodiments provide for execution of the instructions 1110 by a single processor, but that other embodiments utilize distributed computing, in which the instructions 1110 are executed by a number of distributed or otherwise cooperatively coupled processors 1108-1112.

The I/O components 1118 may include a wide variety of components to receive input, provide output, produce output, transmit information, exchange information, capture measurements, and so on. The specific I/O components 1118 that are included in a particular machine 1100 will depend on the type of machine. For example, portable machines such as mobile phones will likely include a touch input device or other such input mechanisms, while a headless server machine will likely not include such a touch input device. It will be appreciated that the I/O components 1118 may include many other components that are not shown in FIG. 11. The I/O components 1118 are grouped according to functionality merely for simplifying the following discussion and the grouping is in no way limiting. In various example embodiments, the I/O components 1118 may include output components 1126 and input components 1128. The output components 1126 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1128 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1118 may include biometric components 1130, motion components 1134, environment components 1136, or position components 1138 among a wide array of other components. For example, the biometric components 1130 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1134 may include acceleration sensor components (e.g., accelerometer), gravitation sensor components, rotation sensor components (e.g., gyroscope), and so forth. The environment components 1136 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1138 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1118 may include communication components 1140 operable to couple the machine 1100 to a network 1132 or devices 1120 via coupling 1124 and coupling 1122, respectively. For example, the communication components 1140 may include a network interface component or other suitable device to interface with the network 1132. In further examples, the communication components 1140 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1120 may be another machine or any of a wide variety of peripheral devices (e.g., a peripheral device coupled via a Universal Serial Bus (USB)).

Moreover, the communication components 1140 may detect identifiers or include components operable to detect identifiers. For example, the communication components 1140 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1140, such as location via Internet Protocol (IP) geo-location, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory. "Snaps" as referenced in the description are ephemeral messages.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner In various example embodiments, one or more computer systems (e.g., a standalone computer system, a client computer system, or a server computer system) or one or more hardware components of a computer system (e.g., a processor or a group of processors) may be configured by software (e.g., an application or application portion)

as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated, unless the context and/or logic clearly indicates otherwise. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the disclosed subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. The specification and drawings are, accordingly, to be regarded in an illustrative rather than a restrictive sense.

What is claimed is:

1. A method comprising:
  causing generation on a user device of a map-based graphical user interface (GUI) for a social media application, the map-based GUI including a map representing a geographical area;
  causing display of a plurality of gallery icons at different respective locations on the map to represent a corresponding plurality of location-based social media galleries, each of which comprises a respective set of social media items, the plurality of social media galleries including two or more different types of gallery represented on the map by different respective types of gallery icon, the different types of gallery icons being visually distinct from one another, wherein the two or more different types of social media gallery include:
    an event gallery type, being a type of gallery that is associated with an underlying geographically located, time-limited event, each gallery icon for the event gallery type including a label indicating the corresponding event; and
    a spike gallery type, being a type of gallery that is automatically surfaced in the map-based GUI at a respective location based on unusualness of underlying social media activity associated with the respective location, wherein causing display of the plurality of gallery icons comprises determining the unusualness of the underlying social media activity associated with the respective location in an automated procedure comprising:
      accessing historical data indicating one or more metrics of historical social media activity at the respective location;
      based on the historical data, calculating an anomaly metric for social media activity in the respective location in a current time window;
      determining that the anomaly metric transgresses a predefined threshold value; and
      responsive to and conditional upon the anomaly metric transgressing the predefined threshold value, causing display in the map-based GUI of a spike gallery icon for the respective location; and
  responsive to receiving user input selecting one of the plurality of gallery icons via the map-based GUI, causing automated sequential reproduction on the user device of the set of social media items of the social media gallery corresponding to the selected gallery icon.

2. The method of claim 1 further comprising, for each of the plurality of social media galleries:
  identifying the gallery type of the social media gallery; and
  determining the type of gallery icon for the social media gallery based on the identified gallery type.

3. The method of claim 1, wherein each gallery icon comprises a thumbnail image based on media content of at least one of the social media items of the corresponding social media gallery.

4. The method of claim 3, further comprising, in an automated operation performed using one or more computer processors configured therefor, automatically compiling one or more of the plurality of social media galleries based at least in part on respective geotag data of ephemeral messages submitted for publicly accessible display via the social media application.

5. The method of claim 1, wherein the respective types of gallery icons include labeled icons and unlabeled icons.

6. The method of claim 5, wherein each labeled icon includes a label displaying a place name associated with the respective geographical location at which that labeled icon is displayed on the map.

7. The method of claim 1, wherein the two or more types of gallery icons are differently shaped.

8. The method of claim 7, wherein each gallery icon comprises a user-selectable user interface element, the user interface elements of the two or more different types of gallery icons having different respective shapes in outline.

9. The method of claim 1, wherein each of the social media items has a respective display duration, and the automated sequential reproduction of the set of social media items comprises:
  displaying media content of a first one of the set of the social media items for the corresponding display duration;
  at expiry of the display duration, automatically displaying media content of a next one of the set of social media items; and
  repeating the operation of displaying a next social media item in sequence until the entire set of social media items has been displayed or until a user input indicating dismissal of the automated sequential reproduction is received.

10. The method of claim 1, wherein:
  each set of social media items comprises a plurality of ephemeral messages, each ephemeral message having a corresponding gallery participation timer determining a remaining time for continued availability of the ephemeral message as part of the corresponding social media gallery; and
  wherein the method further comprises, for each ephemeral message, removing the ephemeral message from the corresponding social media gallery at expiry of the corresponding gallery participation timer.

11. The method of claim 1, wherein each of the social media galleries comprises ephemeral messages submitted for display via the social media application by multiple different users.

12. The method of claim 1, wherein the two or more different types of social media gallery further include:
  a place gallery type, being a type of gallery associated with an operator-defined geographical area.

13. The method of claim 1, wherein the two or more different types of social media gallery further include:
one or more curated gallery types, for which the respective associated sets of social media items are subject to curation by a human operator, the one or more curated gallery types including the event gallery type; and
one or more uncurated gallery types, for which the respective associated sets of social media items are compiled in a fully automated procedure without being subject to curation by a human operator, the one or more gallery types including the spike gallery type.

14. A system comprising:
a map engine comprising one or more computer processor devices configured to perform operations comprising:
causing display on a user device of a map-based GUI for a social media application, the map-based GUI including a map representing a geographical area; and
causing display of a plurality of gallery icons at different respective locations on the map to represent a corresponding plurality of location-based social media galleries, each of which comprises a respective set of social media items, the plurality of social media galleries including two or more different types of gallery represented on the map by different respective types of gallery icon, the different types of gallery icons being visually distinct from one another, wherein the two or more different types of social media gallery include:
an event gallery type, being a type of gallery that is associated with an underlying geographically located, time-limited event, each gallery icon for the event gallery type including a label indicating the corresponding event; and
a spike gallery type, being a type of gallery that is automatically surfaced in the map-based GUI at a respective location based on unusualness of underlying social media activity associated with the respective location, wherein the one or more computer processor devices is further configured to determining the unusualness of the underlying social media activity associated with the respective location in an automated procedure comprising:
accessing historical data indicating one or more metrics of historical social media activity at the respective location;
based on the historical data, calculating an anomality metric for social media activity in the respective location in a current time window;
determining that the anomality metric transgresses a predefined threshold value; and
responsive to and conditional upon the anomality metric transgressing the predefined threshold value, causing display in the map-based GUI of a spike gallery icon for the respective location; and
a replay mechanism comprising one or more computer processor devices configured to, responsive to receiving user input selecting one of the plurality of gallery icons via the map-based GUI, cause automated sequential reproduction on the user device of the set of social media items of the social media gallery corresponding to the selected gallery icon.

15. The system of claim 14, wherein the two or more types of gallery icons include labeled icons and unlabeled icons.

16. The system of claim 14, wherein the two or more types of gallery icons have differently shaped user-selectable interface elements.

17. A non-transitory computer-readable storage medium having stored thereon instructions for causing a machine, when executing the instructions, to perform operations comprising:
causing generation on a user device of a map-based graphical user interface (GUI) for a social media application, the map-based GUI including a map representing a geographical area;
causing display of a plurality of gallery icons at different respective locations on the map to represent a corresponding plurality of location-based social media galleries, each of which comprises a respective set of social media items, the plurality of social media galleries including two or more different types of gallery represented on the map by different respective types of gallery icon, the different types of gallery icons being visually distinct from one another, wherein the two or more different types of social media gallery include:
an event gallery type, being a type of gallery that is associated with an underlying geographically located, time-limited event, each gallery icon for the event gallery type including a label indicating the corresponding event; and
a spike gallery type, being a type of gallery that is automatically surfaced in the map-based GUI at a respective location based on unusualness of underlying social media activity associated with the respective location, wherein causing display of the plurality of gallery icons comprises determining the unusualness of the underlying social media activity associated with the respective location in an automated procedure comprising:
accessing historical data indicating one or more metrics of historical social media activity at the respective location;
based on the historical data, calculating an anomality metric for social media activity in the respective location in a current time window;
determining that the anomality metric transgresses a predefined threshold value; and
responsive to and conditional upon the anomality metric transgressing the predefined threshold value, causing display in the map-based GUI of a spike gallery icon for the respective location; and
responsive to receiving user input selecting one of the plurality of gallery icons via the map-based GUI, causing automated sequential reproduction on the user device of the set of social media items of the social media gallery corresponding to the selected gallery icon.

* * * * *